(12) United States Patent
Guttmann

(10) Patent No.: US 10,817,259 B2
(45) Date of Patent: Oct. 27, 2020

(54) SYSTEM AND METHOD FOR CAUSING ACTIONS IN A DATASET MANAGEMENT SYSTEM

(71) Applicant: Moshe Guttmann, Tel Aviv (IL)

(72) Inventor: Moshe Guttmann, Tel Aviv (IL)

(73) Assignee: Allegro Artificial Intelligence LTD, Tel Aviv (IL)

( * ) Notice: Subject to any disclaimer, the term of this patent is extended or adjusted under 35 U.S.C. 154(b) by 196 days.

(21) Appl. No.: 16/048,388

(22) Filed: Jul. 30, 2018

(65) Prior Publication Data

US 2018/0365243 A1  Dec. 20, 2018

Related U.S. Application Data

(60) Provisional application No. 62/539,334, filed on Jul. 31, 2017, provisional application No. 62/562,398, (Continued)

(51) Int. Cl.
| | |
|---|---|
| *G06F 7/00* | (2006.01) |
| *G06F 7/14* | (2006.01) |
| *G06F 21/62* | (2013.01) |
| *H04L 29/06* | (2006.01) |
| *G06N 20/00* | (2019.01) |
| *G06F 16/23* | (2019.01) |
| *G06F 16/2455* | (2019.01) |
| *G06N 3/08* | (2006.01) |
| *G06N 5/04* | (2006.01) |

(Continued)

(52) U.S. Cl.
CPC ............... *G06F 7/14* (2013.01); *G06F 9/505* (2013.01); *G06F 16/2379* (2019.01); *G06F 16/24565* (2019.01); *G06F 21/6218* (2013.01); *G06K 9/6256* (2013.01); *G06K 9/6262* (2013.01); *G06N 3/0454* (2013.01); *G06N 3/08* (2013.01); *G06N 3/084* (2013.01); *G06N 5/022* (2013.01); *G06N 5/04* (2013.01); *G06N 5/046* (2013.01); *G06N 7/005* (2013.01); *G06N 20/00* (2019.01); *G06Q 10/06311* (2013.01); *H04L 63/102* (2013.01); *G06F 16/285* (2019.01); *G06N 3/0445* (2013.01); *G06N 3/0481* (2013.01); *G06N 3/082* (2013.01); *G06N 20/10* (2019.01); *H04L 63/0823* (2013.01); *H04N 5/23206* (2013.01)

(58) Field of Classification Search
CPC .. G06F 7/14; G06F 16/2379; G06F 16/24565; G06F 9/505; G06F 21/6218; G06N 20/00; G06N 5/04
USPC .................................................. 707/600–899
See application file for complete search history.

(56) References Cited

U.S. PATENT DOCUMENTS

2017/0249435 A1\*  8/2017  Lancelot ............. G06F 19/3418

\* cited by examiner

*Primary Examiner* — Isaac M Woo

(57) ABSTRACT

Systems and methods for causing actions in a dataset management system are provided. For example, a change to data maintained by the dataset management system may be detected, and a rule associated with the data and with an action may be obtained. Further, it may be determined if the change is a trigger according to the rule. In some examples, when the change is determined to be a trigger according to the rule, the action associated with the rule may be performed, for example with the data associated with the change. In some examples, when the change is determined not to be a trigger according to the rule, the system may forgo the performance of the action, for example for the data associated with the change.

20 Claims, 21 Drawing Sheets

Related U.S. Application Data filed on Sep. 23, 2017, provisional application No. 62/562,401, filed on Sep. 23, 2017, provisional application No. 62/581,744, filed on Nov. 5, 2017, provisional application No. 62/610,290, filed on Dec. 26, 2017.

(51) Int. Cl.

| | |
|---|---|
| *G06N 7/00* | (2006.01) |
| *G06Q 10/06* | (2012.01) |
| *G06N 5/02* | (2006.01) |
| *G06F 9/50* | (2006.01) |
| *G06K 9/62* | (2006.01) |
| *G06N 3/04* | (2006.01) |
| G06F 16/28 | (2019.01) |
| G06N 20/10 | (2019.01) |
| H04N 5/232 | (2006.01) |

SYSTEM AND METHOD FOR CAUSING ACTIONS IN A DATASET MANAGEMENT SYSTEM

CROSS REFERENCES TO RELATED APPLICATIONS

This application claims the benefit of priority of U.S. Provisional Patent Application No. 62/539,334, filed on Jul. 31, 2017, U.S. Provisional Patent Application No. 62/562,398, filed on Sep. 23, 2017, U.S. Provisional Patent Application No. 62/562,401, filed on Sep. 23, 2017, U.S. Provisional Patent Application No. 62/581,744, filed on Nov. 5, 2017, and U.S. Provisional Patent Application No. 62/610,290, filed on Dec. 26, 2017. The entire contents of all of the above-identified applications are herein incorporated by reference.

BACKGROUND

Technological Field

The disclosed embodiments generally relate to systems and methods for dataset management. More particularly, the disclosed embodiments relate to systems and methods for causing actions in a dataset management system.

Background Information

Computerized devices are now prevalent, and data produced and maintained by those devices is increasing.

Audio sensors are now part of numerous devices, and the availability of audio data produced by those devices is increasing.

Image sensors are now part of numerous devices, from security systems to mobile phones, and the availability of images and videos produced by those devices is increasing.

Machine learning algorithms, that use data to generate insights, rules and algorithms, are widely used.

SUMMARY

In some embodiments, systems and methods for the creation, maintenance, and usage of datasets and annotations are provided.

In some embodiments, examples may be used selectively. For example, information associated with external devices may be obtained, weights may be assigned to examples using the obtained information, and inference models may be generated using the assignment of weights. In some examples, update information associated with the external devices may be obtained, the assignment of weights may be updated using the update information, and updated inference models may be generated using the updated assignment of weights.

In some embodiments, actions may be triggered automatically in a dataset management system. For example, a change to data maintained by the dataset management system may be detected, and a rule associated with the data and with an action may be obtained. Further, it may be determined if the change is a trigger according to the rule. In some examples, when the change is determined to be a trigger according to the rule, the action associated with the rule may be performed, for example with the data associated with the change. In some examples, when the change is determined not to be a trigger according to the rule, the system may forgo the performance of the action, for example for the data associated with the change.

In some embodiments, inference models may be employed based on available processing resources. For example, available processing resources information may be received, inference model may be selected (for example, based on the received information), and the selected inference model may be utilized. In some cases, an update to the available processing resources information may be received, the selected inference model may be updated (for example, based on the received update), and the updated inference model may be utilized.

In some embodiments, personalized quality assurance of inference models may be performed. For example, data items associated with a group of devices may be obtained, results of applying the data items to inference models may be obtained, the results of applying the data items to a first inference model may be compared with the results of applying the data items to a second inference model, and the compatibility of the second inference model to the group of devices may be assessed, for example based on the comparison results. In some examples, when the second inference model is found compatible, the second inference model may be utilized in tasks associated with the group of devices. In some examples, when the second inference model is found incompatible, the system may forgo the usage of the second inference model in one or more tasks associated with the group of devices.

In some embodiments, descriptors of artificial neural networks may be generated and/or used. For example, an artificial neural network may be obtained, the artificial neural network may be obtained, descriptors of the segments may be calculated, and a descriptor of the artificial neural network may be compiled. In some examples, a match score for a pair of artificial neural networks may be calculated (for example using the descriptors compiled for the two artificial neural networks), and actions may be selected based on the matching score.

In some embodiments, required processing resources for machine learning tasks may be estimated. For example, properties of a machine learning training task may be obtained, properties of external devices may be obtained, and the processing resources requirements of the machine learning training task may be estimated (for example using the properties of the external devices). In some examples, the estimation may be provided to a user. In some examples, a group of devices may be selected, and the selected group of devices may be triggered to perform the machine learning training task.

In some embodiments, datasets may be enriched while learning. For example, intermediate results of training machine learning algorithms may be obtained. Additional training examples may be selected based on the intermediate results. In some cases, synthetic examples may be generated based on the intermediate results. The machine learning algorithms may be further trained using the selected additional training examples and/or the generated synthetic examples.

In some embodiments, datasets may be incrementally annotated. For example, a group of labeled examples and a group of unlabeled examples may be obtained, a first inference model may be generated using the group of labeled examples, labels may be assigned to at least part of the group of unlabeled examples using the first inference model, confidence levels may be assigned to the assigned labels, a subset of the group of unlabeled examples may be selected using the confidence levels, and in some cases a second inference model may be generated using the selected subset and/or the corresponding assigned labels.

In some embodiments, annotations of datasets may be merged. For example, assignments of labels to data-points may be obtained, confidence levels associated with the assignments of labels may be obtained. Further, the assignments of labels may be merged, for example based on the confidence levels. In some cases, inference models may be generated using the merged assignment of labels. In some examples, an update to the assignments of labels to data-points and/or the confidence levels may be obtained, and the merged assignment of labels may be updated.

In some embodiments, access to a dataset management system may be controlled using permission records. For example, a request to access information in a dataset management system may be obtained from an entity, and a permission record associated with the entity may be selected. Further, it may be determined if the entity has permission to access the information. In some examples, when the entity has permission to access the information, the access to the information may be allowed. In some examples, when the entity has no permission to access the information, the access to the information may be denied.

In some embodiments, access to a dataset management system may be controlled using quotas. For example, a request to perform an action in a dataset management system may be obtained from an entity, and a quota record associated with the entity may be selected. Further, it may be determined if the entity has sufficient quota to perform the action. In some examples, when the entity has sufficient quota to perform the action, the request may be allowed. In some examples, when the entity has insufficient quota to perform the action, the request may be denied.

In some embodiments, a project schedule may be maintained in a dataset management system. For example, a progress update and a project schedule record may be obtained. The project schedule record may be updated, for example according to the progress update. In some examples, a delay may be predicted, and a corresponding indication may be provided.

DESCRIPTION

Figure 1A:
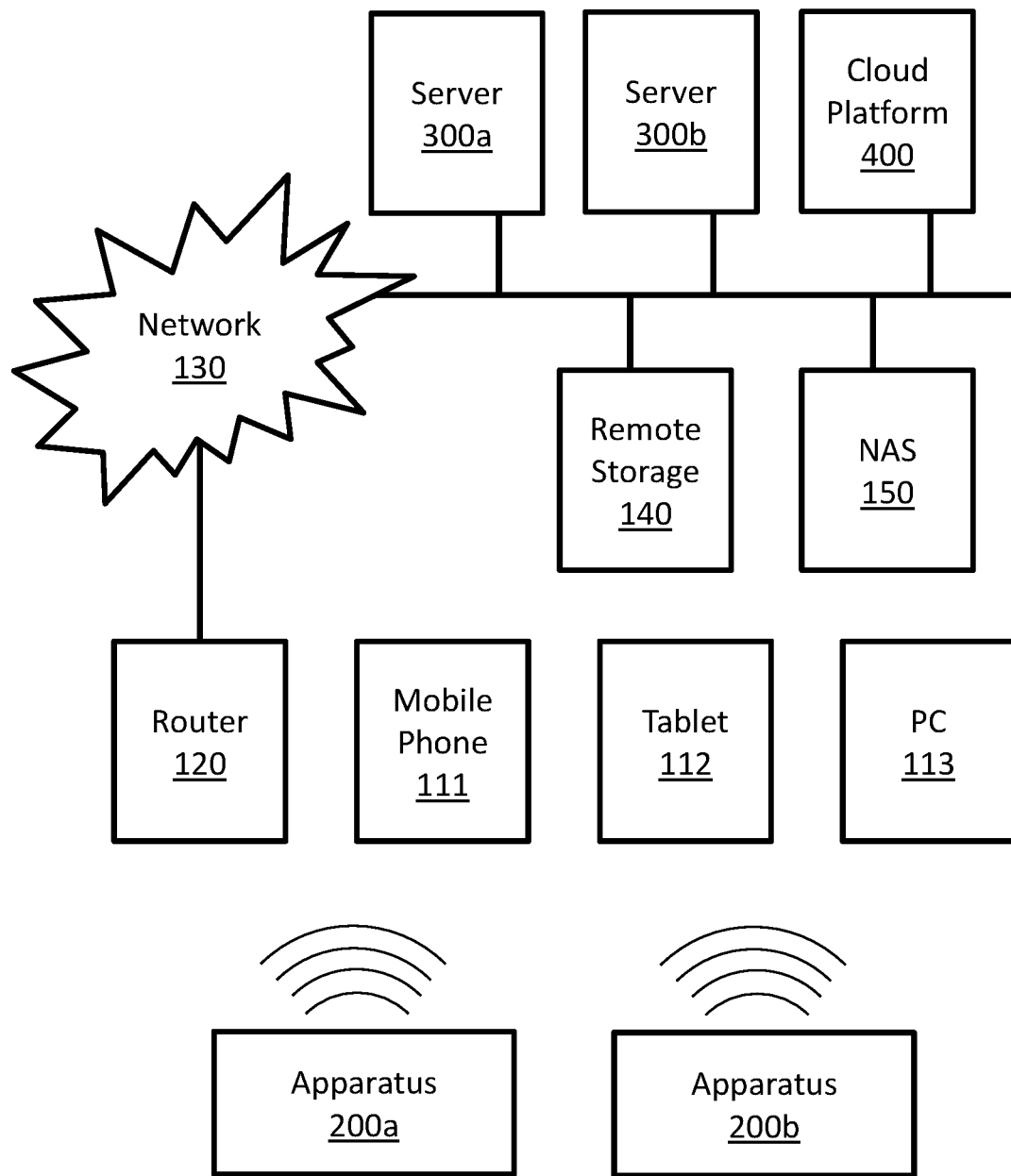
FIGS. 1A and 1B are block diagrams illustrating some possible implementations of a communicating system.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like, include action and/or processes of a computer that manipulate and/or transform data into other data, said data represented as physical quantities, for example such as electronic quantities, and/or said data representing the physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus the appearance of the phrase "one case", "some cases", "other cases" or variants thereof does not necessarily refer to the same embodiment(s). As used herein, the term "and/or" includes any and all combinations of one or more of the associated listed items.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The term "image sensor" is recognized by those skilled in the art and refers to any device configured to capture images, a sequence of images, videos, and so forth. This includes sensors that convert optical input into images, where optical input can be visible light (like in a camera), radio waves, microwaves, terahertz waves, ultraviolet light, infrared light, x-rays, gamma rays, and/or any other light spectrum. This also includes both 2D and 3D sensors. Examples of image sensor technologies may include: CCD, CMOS, NMOS, and so forth. 3D sensors may be implemented using different technologies, including: stereo camera, active stereo camera, time of flight camera, structured light camera, radar, range image camera, and so forth.

The term "audio sensor" is recognized by those skilled in the art and refers to any device configured to capture audio data. This includes sensors that convert audio and sounds into digital audio data.

The term "electrical impedance sensor" is recognized by those skilled in the art and refers to any sensor configured to measure the electrical connectivity and/or permittivity between two or more points. This include but not limited to: sensors configured to measuring changes in connectivity and/or permittivity over time; sensors configured to measure the connectivity and/or permittivity of biological tissues; sensors configured to measure the connectivity and/or permittivity of parts of body based, at least in part, on the connectivity and/or permittivity between surface electrodes; sensors configured to provide Electrical Impedance Tomography images, and so forth. Such sensors may include but not limited to: sensors that apply alternating currents at a single frequency; sensors that apply alternating currents at multiple frequencies; and so forth. Additionally, this may also include sensors that measure the electrical resistance between two or more points, which are sometimes referred to as ohmmeter.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

FIG. 1A is a block diagram illustrating a possible implementation of a communicating system. In this example, apparatuses 200a and 200b may communicate with server 300a, with server 300b, with cloud platform 400, with each other, and so forth. Possible implementations of apparatuses 200a and 200b may include apparatus 200 as described in FIGS. 2A and 2B. Possible implementations of servers 300a and 300b may include server 300 as described in FIG. 3. Some possible implementations of cloud platform 400 are described in FIGS. 4A, 4B and 5. In this example apparatuses 200a and 200b may communicate directly with mobile phone 111, tablet 112, and personal computer (PC) 113. Apparatuses 200a and 200b may communicate with local router 120 directly, and/or through at least one of mobile phone 111, tablet 112, and personal computer (PC) 113. In this example, local router 120 may be connected with a communication network 130. Examples of communication network 130 may include the Internet, phone networks, cellular networks, satellite communication networks, private communication networks, virtual private networks (VPN), and so forth. Apparatuses 200a and 200b may connect to communication network 130 through local router 120 and/or directly. Apparatuses 200a and 200b may communicate with other devices, such as servers 300a, server 300b, cloud platform 400, remote storage 140 and network attached storage (NAS) 150, through communication network 130 and/or directly.

Figure 1B:
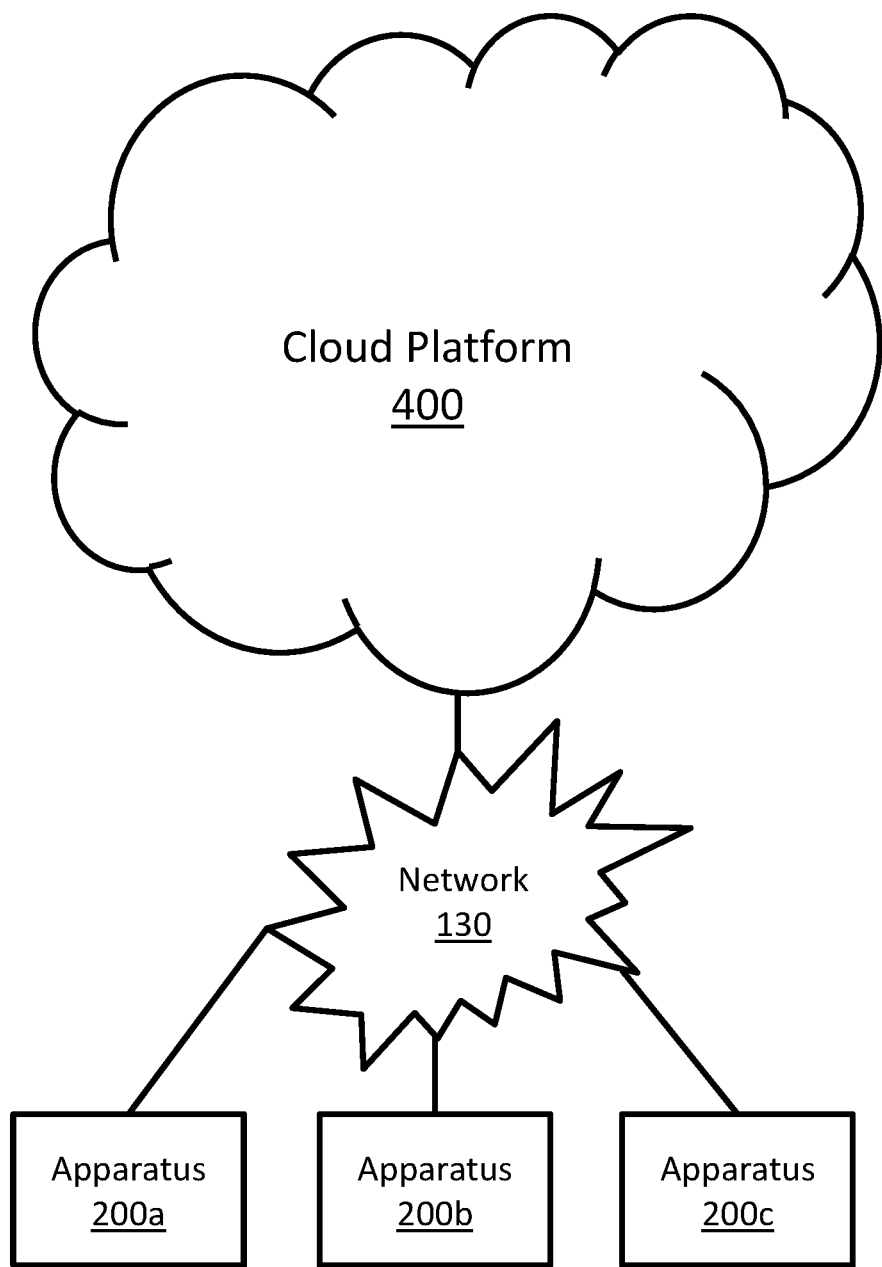

FIG. 1B is a block diagram illustrating a possible implementation of a communicating system. In this example, apparatuses 200a, 200b and 200c may communicate with cloud platform 400 and/or with each other through communication network 130. Possible implementations of apparatuses 200a, 200b and 200c may include apparatus 200 as described in FIGS. 2A and 2B. Some possible implementations of cloud platform 400 are described in FIGS. 4A, 4B and 5.

FIGS. 1A and 1B illustrate some possible implementations of a communication system. In some embodiments, other communication systems that enable communication between apparatus 200 and server 300 may be used. In some embodiments, other communication systems that enable communication between apparatus 200 and cloud platform 400 may be used. In some embodiments, other communication systems that enable communication among a plurality of apparatuses 200 may be used.

Figure 2A:
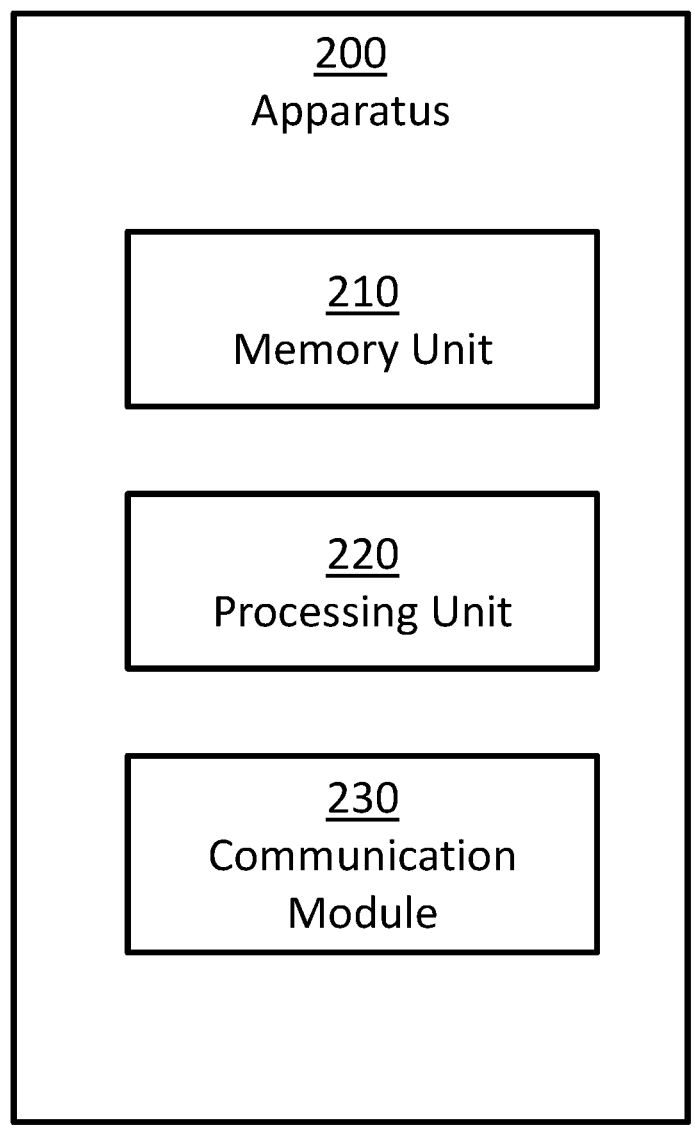
FIGS. 2A and 2B are block diagrams illustrating some possible implementations of an apparatus.

FIG. 2A is a block diagram illustrating a possible implementation of apparatus 200. In this example, apparatus 200 may comprise: one or more memory units 210, one or more processing units 220, and one or more communication modules 230. In some implementations, apparatus 200 may comprise additional components, while some components listed above may be excluded.

Figure 2B:
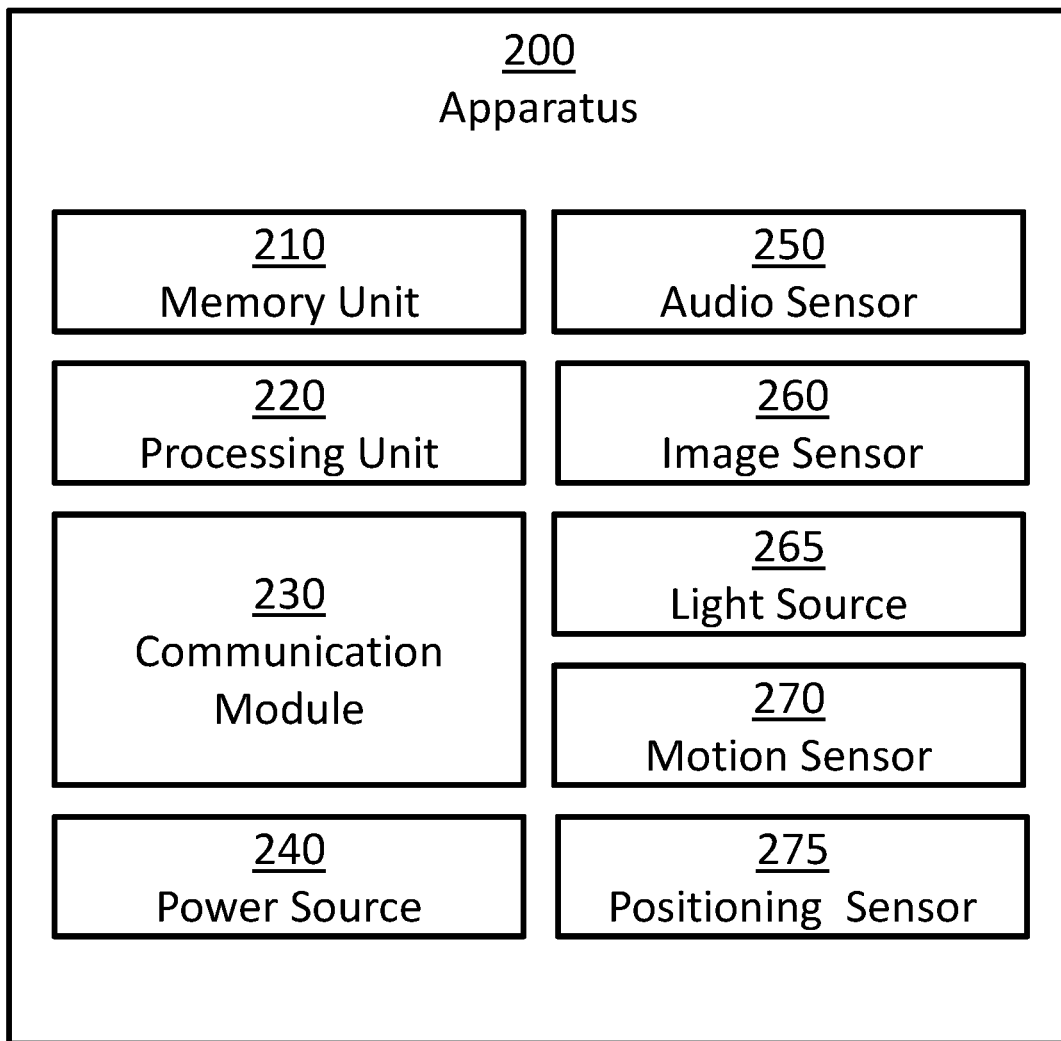

FIG. 2B is a block diagram illustrating a possible implementation of apparatus 200. In this example, apparatus 200 may comprise: one or more memory units 210, one or more processing units 220, one or more communication modules 230, one or more power sources 240, one or more audio sensors 250, one or more image sensors 260, one or more light sources 265, one or more motion sensors 270, and one or more positioning sensors 275. In some implementations, apparatus 200 may comprise additional components, while some components listed above may be excluded. For example, in some implementations apparatus 200 may also comprise at least one of the following: one or more barometers; one or more pressure sensors; one or more proximity sensors; one or more electrical impedance sensors; one or more electrical voltage sensors; one or more electrical current sensors; one or more user input devices; one or more output devices; and so forth. In another example, in some implementations at least one of the following may be excluded from apparatus 200: memory units 210, communication modules 230, power sources 240, audio sensors 250, image sensors 260, light sources 265, motion sensors 270, and positioning sensors 275.

In some embodiments, one or more power sources 240 may be configured to: power apparatus 200; power server 300; power cloud platform 400; and/or power computational node 500. Possible implementation examples of power sources 240 may include: one or more electric batteries; one or more capacitors; one or more connections to external power sources; one or more power converters; any combination of the above; and so forth.

In some embodiments, the one or more processing units 220 may be configured to execute software programs. For example, processing units 220 may be configured to execute software programs stored on the memory units 210. In some cases, the executed software programs may store information in memory units 210. In some cases, the executed software programs may retrieve information from the memory units 210. Possible implementation examples of the processing units 220 may include: one or more single core processors, one or more multicore processors; one or more controllers; one or more application processors; one or more system on a chip processors; one or more central processing units; one or more graphical processing units; one or more neural processing units; any combination of the above; and so forth.

In some embodiments, the one or more communication modules 230 may be configured to receive and transmit information. For example, control signals may be transmitted and/or received through communication modules 230. In another example, information received though communication modules 230 may be stored in memory units 210. In an additional example, information retrieved from memory units 210 may be transmitted using communication modules 230. In another example, input data may be transmitted and/or received using communication modules 230. Examples of such input data may include: input data inputted by a user using user input devices; information captured using one or more sensors; and so forth. Examples of such sensors may include: audio sensors 250; image sensors 260; motion sensors 270; positioning sensors 275; chemical sensors; temperature sensors; barometers; pressure sensors; proximity sensors; electrical impedance sensors; electrical voltage sensors; electrical current sensors; and so forth.

In some embodiments, the one or more audio sensors 250 may be configured to capture audio by converting sounds to digital information. Some examples of audio sensors 250 may include: microphones, unidirectional microphones, bidirectional microphones, cardioid microphones, omnidirectional microphones, onboard microphones, wired microphones, wireless microphones, any combination of the above, and so forth. In some examples, the captured audio may be stored in memory units 210. In some additional examples, the captured audio may be transmitted using communication modules 230, for example to other computerized devices, such as server 300, cloud platform 400, computational node 500, and so forth. In some examples, processing units 220 may control the above processes. For example, processing units 220 may control at least one of: capturing of the audio; storing the captured audio; transmitting of the captured audio; and so forth. In some cases, the captured audio may be processed by processing units 220. For example, the captured audio may be compressed by processing units 220; possibly followed: by storing the compressed captured audio in memory units 210; by transmitted the compressed captured audio using communication modules 230; and so forth. In another example, the captured audio may be processed using speech recognition algorithms. In another example, the captured audio may be processed using speaker recognition algorithms.

In some embodiments, the one or more image sensors 260 may be configured to capture visual information by converting light to: images; sequence of images; videos; and so forth. In some examples, the captured visual information may be stored in memory units 210. In some additional examples, the captured visual information may be transmitted using communication modules 230, for example to other computerized devices, such as server 300, cloud platform 400, computational node 500, and so forth. In some examples, processing units 220 may control the above processes. For example, processing units 220 may control at least one of: capturing of the visual information; storing the captured visual information; transmitting of the captured visual information; and so forth. In some cases, the captured visual information may be processed by processing units 220. For example, the captured visual information may be compressed by processing units 220; possibly followed: by storing the compressed captured visual information in memory units 210; by transmitted the compressed captured visual information using communication modules 230; and so forth. In another example, the captured visual information may be processed in order to: detect objects, detect events, detect action, detect face, detect people, recognize person, and so forth.

In some embodiments, the one or more light sources 265 may be configured to emit light, for example in order to enable better image capturing by image sensors 260. In some examples, the emission of light may be coordinated with the capturing operation of image sensors 260. In some examples, the emission of light may be continuous. In some examples, the emission of light may be performed at selected times. The emitted light may be visible light, infrared light, x-rays, gamma rays, and/or in any other light spectrum.

In some embodiments, the one or more motion sensors 270 may be configured to perform at least one of the following: detect motion of objects in the environment of apparatus 200; measure the velocity of objects in the environment of apparatus 200; measure the acceleration of objects in the environment of apparatus 200; detect motion of apparatus 200; measure the velocity of apparatus 200; measure the acceleration of apparatus 200; and so forth. In some implementations, the one or more motion sensors 270 may comprise one or more accelerometers configured to detect changes in proper acceleration and/or to measure proper acceleration of apparatus 200. In some implementations, the one or more motion sensors 270 may comprise one or more gyroscopes configured to detect changes in the orientation of apparatus 200 and/or to measure information related to the orientation of apparatus 200. In some implementations, motion sensors 270 may be implemented using image sensors 260, for example by analyzing images captured by image sensors 260 to perform at least one of the following tasks: track objects in the environment of apparatus 200; detect moving objects in the environment of apparatus 200; measure the velocity of objects in the environment of apparatus 200; measure the acceleration of objects in the environment of apparatus 200; measure the velocity of apparatus 200, for example by calculating the egomotion of image sensors 260; measure the acceleration of apparatus 200, for example by calculating the egomotion of image sensors 260; and so forth. In some implementations, motion sensors 270 may be implemented using image sensors 260 and light sources 265, for example by implementing a LIDAR using image sensors 260 and light sources 265. In some implementations, motion sensors 270 may be implemented using one or more RADARs. In some examples, information captured using motion sensors 270: may be stored in memory units 210, may be processed by processing units 220, may be transmitted and/or received using communication modules 230, and so forth.

In some embodiments, the one or more positioning sensors 275 may be configured to obtain positioning information of apparatus 200, to detect changes in the position of apparatus 200, and/or to measure the position of apparatus 200. In some examples, positioning sensors 275 may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. In some examples, information captured using positioning sensors 275 may be stored in memory units 210, may be processed by processing units 220, may be transmitted and/or received using communication modules 230, and so forth.

In some embodiments, the one or more chemical sensors may be configured to perform at least one of the following: measure chemical properties in the environment of apparatus 200; measure changes in the chemical properties in the environment of apparatus 200; detect the present of chemicals in the environment of apparatus 200; measure the concentration of chemicals in the environment of apparatus 200. Examples of such chemical properties may include: pH level, toxicity, temperature, and so forth. Examples of such chemicals may include: electrolytes, particular enzymes, particular hormones, particular proteins, smoke, carbon dioxide, carbon monoxide, oxygen, ozone, hydrogen, hydrogen sulfide, and so forth. In some examples, information captured using chemical sensors may be stored in memory units 210, may be processed by processing units 220, may be transmitted and/or received using communication modules 230, and so forth.

In some embodiments, the one or more temperature sensors may be configured to detect changes in the temperature of the environment of apparatus 200 and/or to measure the temperature of the environment of apparatus 200. In some examples, information captured using temperature sensors may be stored in memory units 210, may be processed by processing units 220, may be transmitted and/or received using communication modules 230, and so forth.

In some embodiments, the one or more barometers may be configured to detect changes in the atmospheric pressure in the environment of apparatus 200 and/or to measure the atmospheric pressure in the environment of apparatus 200. In some examples, information captured using the barometers may be stored in memory units 210, may be processed by processing units 220, may be transmitted and/or received using communication modules 230, and so forth.

In some embodiments, the one or more pressure sensors may be configured to perform at least one of the following: detect pressure in the environment of apparatus 200; measure pressure in the environment of apparatus 200; detect change in the pressure in the environment of apparatus 200; measure change in pressure in the environment of apparatus 200; detect pressure at a specific point and/or region of the surface area of apparatus 200; measure pressure at a specific point and/or region of the surface area of apparatus 200; detect change in pressure at a specific point and/or area; measure change in pressure at a specific point and/or region of the surface area of apparatus 200; measure the pressure differences between two specific points and/or regions of the surface area of apparatus 200; measure changes in relative pressure between two specific points and/or regions of the surface area of apparatus 200. In some examples, information captured using the pressure sensors may be stored in memory units 210, may be processed by processing units 220, may be transmitted and/or received using communication modules 230, and so forth.

In some embodiments, the one or more proximity sensors may be configured to perform at least one of the following: detect contact of a solid object with the surface of apparatus 200; detect contact of a solid object with a specific point and/or region of the surface area of apparatus 200; detect a proximity of apparatus 200 to an object. In some implementations, proximity sensors may be implemented using image sensors 260 and light sources 265, for example by emitting light using light sources 265, such as ultraviolet light, visible light, infrared light and/or microwave light, and detecting the light reflected from nearby objects using image sensors 260 to detect the present of nearby objects. In some examples, information captured using the proximity sensors may be stored in memory units 210, may be processed by processing units 220, may be transmitted and/or received using communication modules 230, and so forth.

In some embodiments, the one or more electrical impedance sensors may be configured to perform at least one of the following: detect change over time in the connectivity and/or permittivity between two electrodes; measure changes over time in the connectivity and/or permittivity between two electrodes; capture Electrical Impedance Tomography (EIT) images. In some examples, information captured using the electrical impedance sensors may be stored in memory units 210, may be processed by processing units 220, may be transmitted and/or received using communication modules 230, and so forth.

In some embodiments, the one or more electrical voltage sensors may be configured to perform at least one of the following: detect and/or measure voltage between two electrodes; detect and/or measure changes over time in the voltage between two electrodes. In some examples, information captured using the electrical voltage sensors may be stored in memory units 210, may be processed by processing units 220, may be transmitted and/or received using communication modules 230, and so forth.

In some embodiments, the one or more electrical current sensors may be configured to perform at least one of the following: detect and/or measure electrical current flowing between two electrodes; detect and/or measure changes over time in the electrical current flowing between two electrodes. In some examples, information captured using the electrical current sensors may be stored in memory units 210, may be processed by processing units 220, may be transmitted and/or received using communication modules 230, and so forth.

In some embodiments, the one or more user input devices may be configured to allow one or more users to input information. In some examples, user input devices may comprise at least one of the following: a keyboard, a mouse, a touch pad, a touch screen, a joystick, a microphone, an image sensor, and so forth. In some examples, the user input may be in the form of at least one of: text, sounds, speech, hand gestures, body gestures, tactile information, and so forth. In some examples, the user input may be stored in memory units 210, may be processed by processing units 220, may be transmitted and/or received using communication modules 230, and so forth.

In some embodiments, the one or more user output devices may be configured to provide output information to one or more users. In some examples, such output information may comprise of at least one of: notifications, feedbacks, reports, and so forth. In some examples, user output devices may comprise at least one of: one or more audio output devices; one or more textual output devices; one or more visual output devices; one or more tactile output devices; and so forth. In some examples, the one or more audio output devices may be configured to output audio to a user, for example through: a headset, a set of speakers, and so forth. In some examples, the one or more visual output devices may be configured to output visual information to a user, for example through: a display screen, an augmented reality display system, a printer, a LED indicator, and so forth. In some examples, the one or more tactile output devices may be configured to output tactile feedbacks to a user, for example through vibrations, through motions, by applying forces, and so forth. In some examples, the output may be provided: in real time, offline, automatically, upon request, and so forth. In some examples, the output information may be read from memory units 210, may be provided by a software executed by processing units 220, may be transmitted and/or received using communication modules 230, and so forth.

Figure 3:
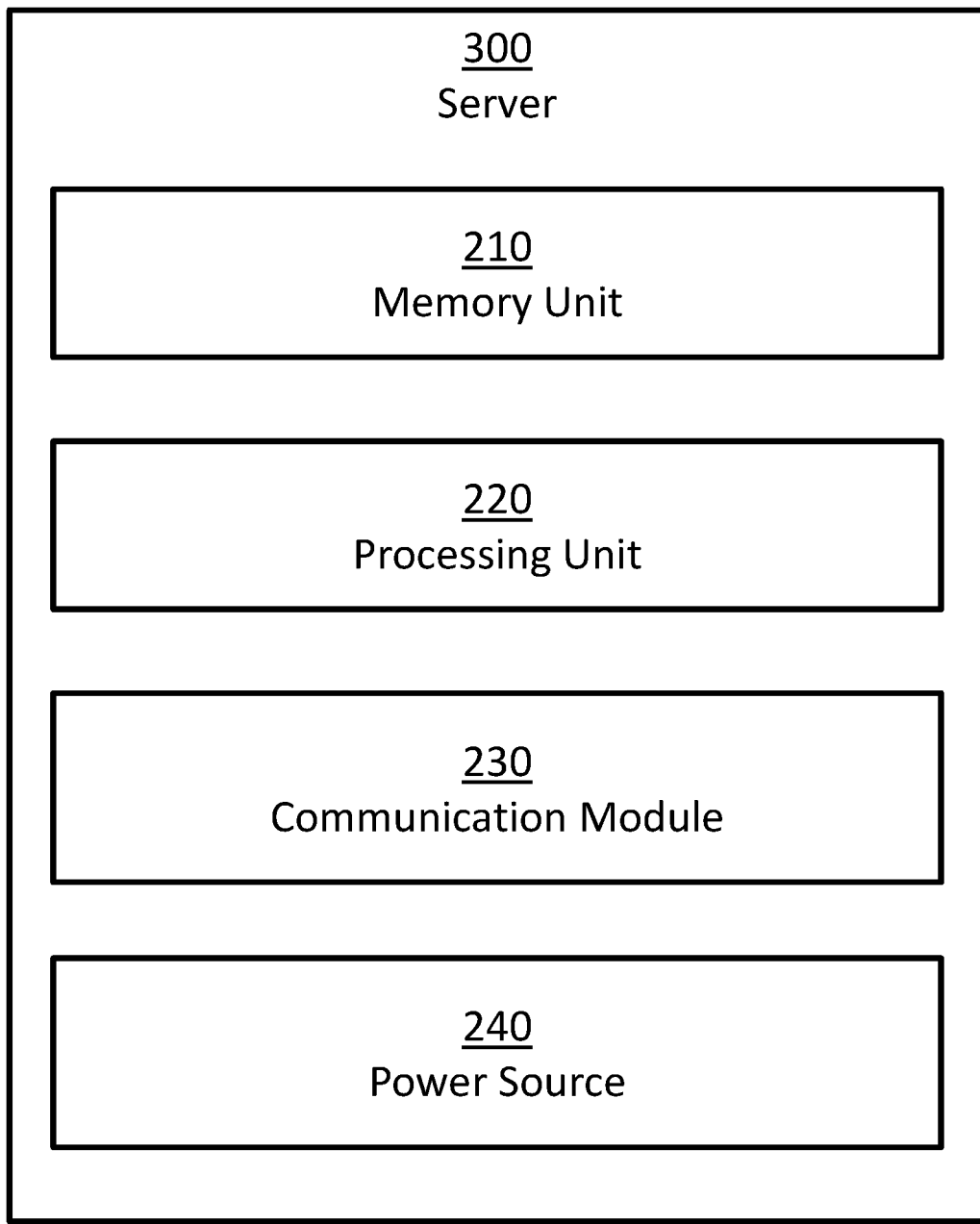
FIG. 3 is a block diagram illustrating a possible implementation of a server.

FIG. 3 is a block diagram illustrating a possible implementation of server 300. In this example, server 300 may comprise: one or more memory units 210, one or more processing units 220, one or more communication modules 230, and one or more power sources 240. In some implementations, server 300 may comprise additional components, while some components listed above may be excluded. For example, in some implementations server 300 may also comprise at least one of the following: one or more user input devices; one or more output devices; and so forth. In another example, in some implementations at least one of the following may be excluded from server 300: memory units 210, communication modules 230, and power sources 240.

Figure 4A:
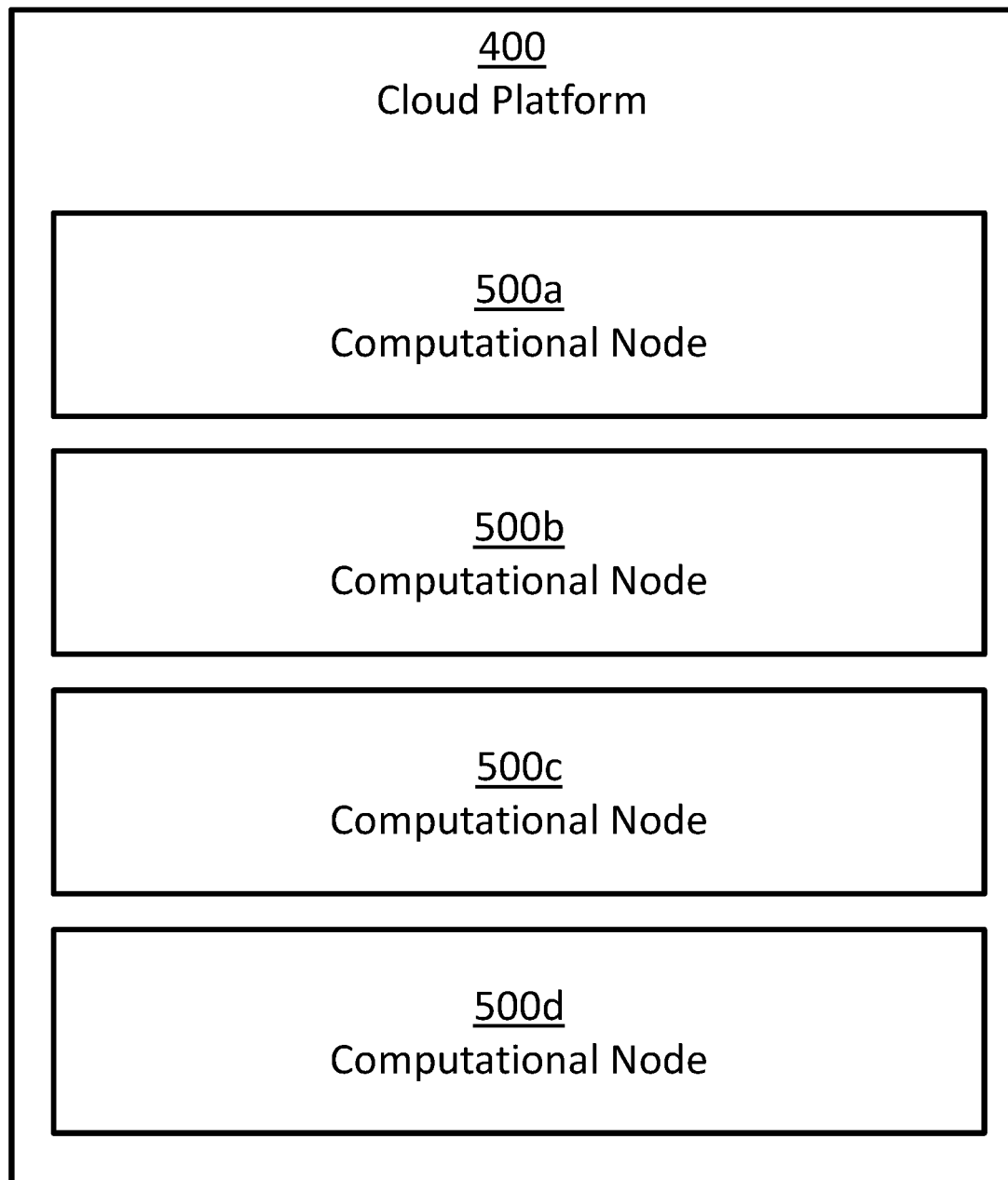
FIGS. 4A and 4B are block diagrams illustrating some possible implementations of a cloud platform.

FIG. 4A is a block diagram illustrating a possible implementation of cloud platform 400. In this example, cloud platform 400 may comprise computational node 500a, computational node 500b, computational node 500c and computational node 500d. In some examples, a possible implementation of computational nodes 500a, 500b, 500c and 500d may comprise server 300 as described in FIG. 3. In some examples, a possible implementation of computational nodes 500a, 500b, 500c and 500d may comprise computational node 500 as described in FIG. 5.

Figure 4B:
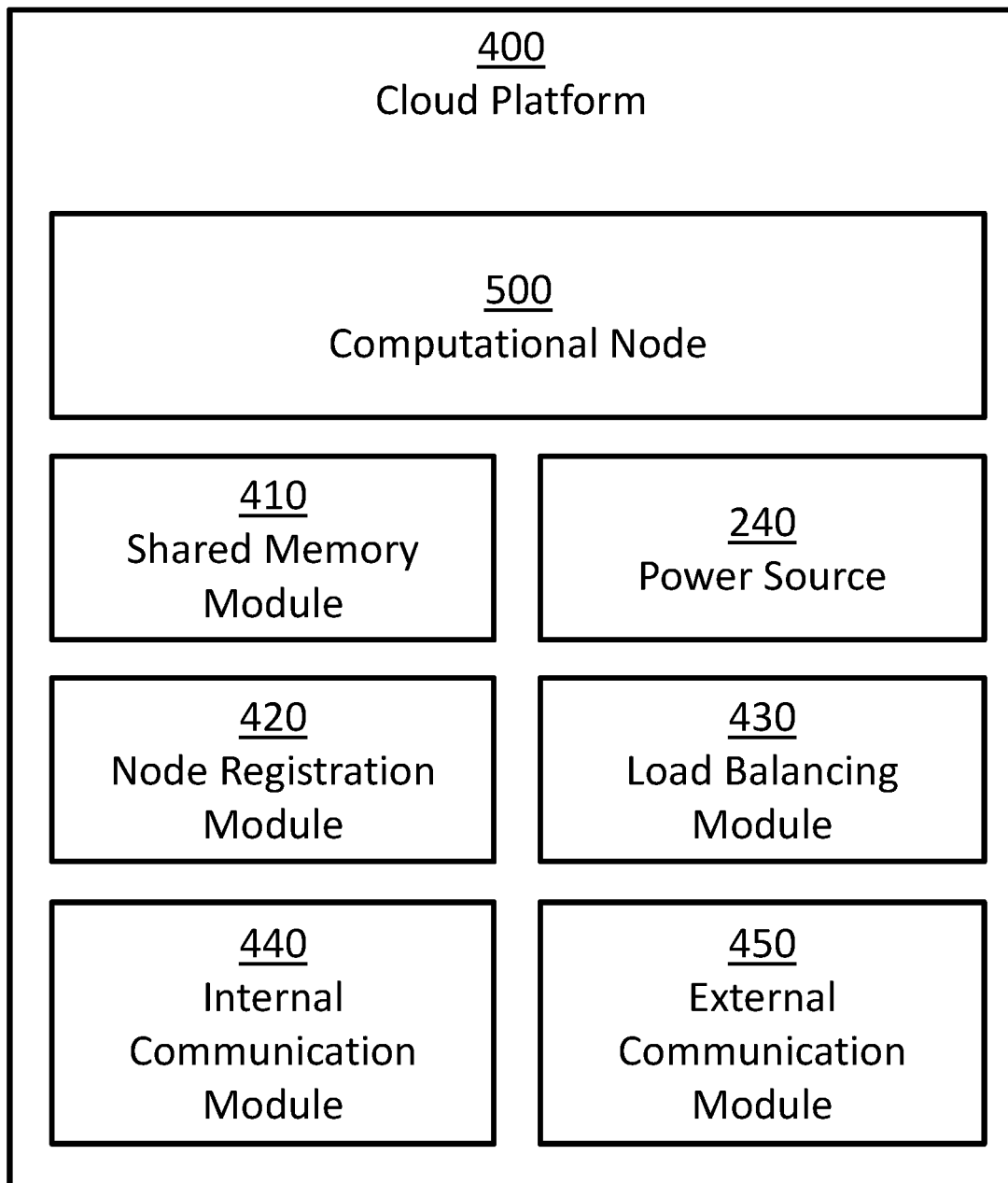

FIG. 4B is a block diagram illustrating a possible implementation of cloud platform 400. In this example, cloud platform 400 may comprise: one or more computational nodes 500, one or more shared memory modules 410, one or more power sources 240, one or more node registration modules 420, one or more load balancing modules 430, one or more internal communication modules 440, and one or more external communication modules 450. In some implementations, cloud platform 400 may comprise additional components, while some components listed above may be excluded. For example, in some implementations cloud platform 400 may also comprise at least one of the following: one or more user input devices; one or more output devices; and so forth. In another example, in some implementations at least one of the following may be excluded from cloud platform 400: shared memory modules 410, power sources 240, node registration modules 420, load balancing modules 430, internal communication modules 440, and external communication modules 450.

Figure 5:
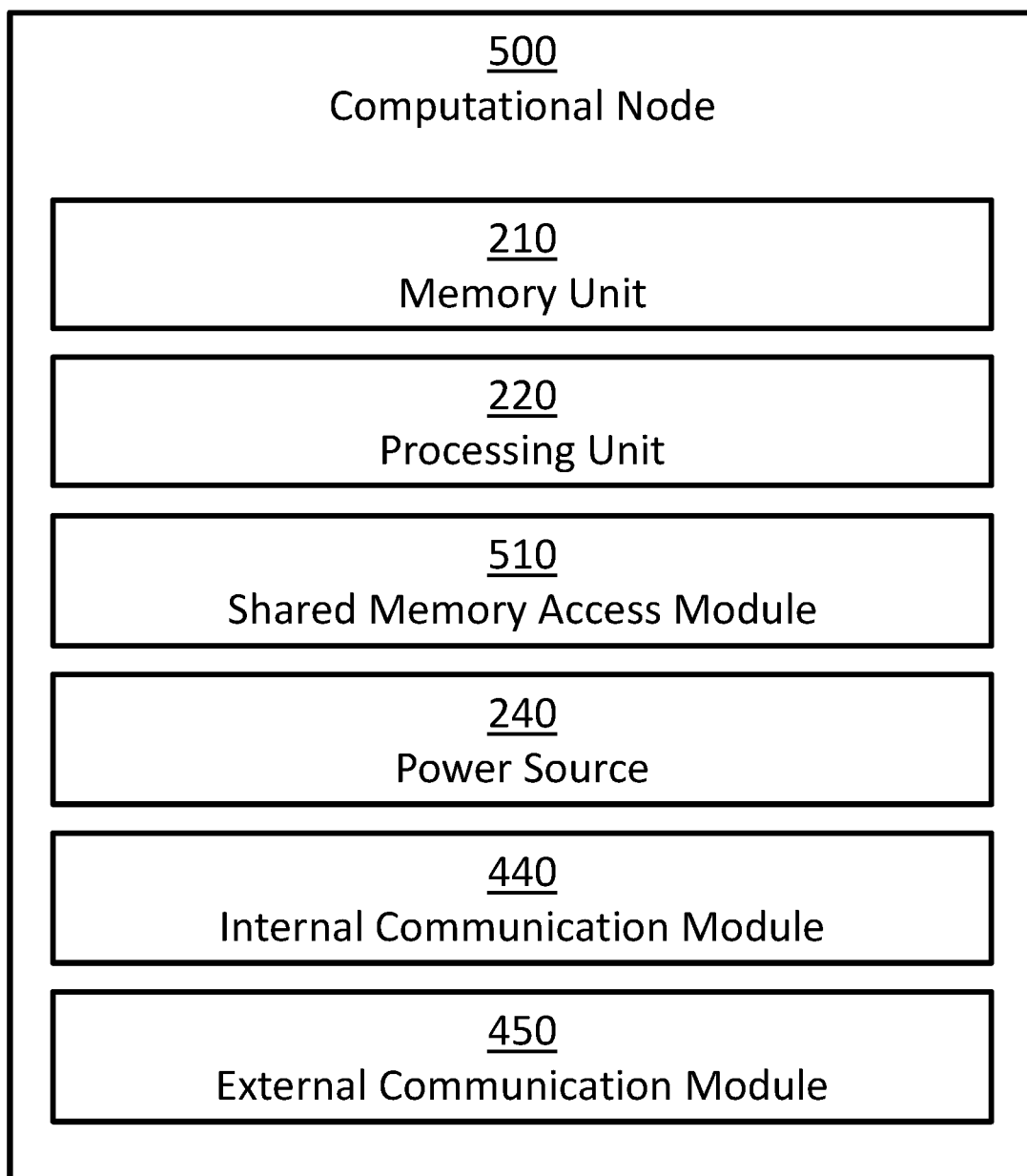
FIG. 5 is a block diagram illustrating a possible implementation of a computational node.

FIG. 5 is a block diagram illustrating a possible implementation of computational node 500. In this example, computational node 500 may comprise: one or more memory units 210, one or more processing units 220, one or more shared memory access modules 510, one or more power sources 240, one or more internal communication modules 440, and one or more external communication modules 450. In some implementations, computational node 500 may comprise additional components, while some components listed above may be excluded. For example, in some implementations computational node 500 may also comprise at least one of the following: one or more user input devices; one or more output devices; and so forth. In another example, in some implementations at least one of the following may be excluded from computational node 500: memory units 210, shared memory access modules 510, power sources 240, internal communication modules 440, and external communication modules 450.

In some embodiments, internal communication modules 440 and external communication modules 450 may be implemented as a combined communication module, such as communication modules 230. In some embodiments, one possible implementation of cloud platform 400 may comprise server 300. In some embodiments, one possible implementation of computational node 500 may comprise server 300. In some embodiments, one possible implementation of shared memory access modules 510 may comprise using internal communication modules 440 to send information to shared memory modules 410 and/or receive information from shared memory modules 410. In some embodiments, node registration modules 420 and load balancing modules 430 may be implemented as a combined module.

In some embodiments, the one or more shared memory modules 410 may be accessed by more than one computational node. Therefore, shared memory modules 410 may allow information sharing among two or more computational nodes 500. In some embodiments, the one or more shared memory access modules 510 may be configured to enable access of computational nodes 500 and/or the one or more processing units 220 of computational nodes 500 to shared memory modules 410. In some examples, computational nodes 500 and/or the one or more processing units 220 of computational nodes 500, may access shared memory modules 410, for example using shared memory access modules 510, in order to perform at least one of: executing software programs stored on shared memory modules 410, store information in shared memory modules 410, retrieve information from the shared memory modules 410.

In some embodiments, the one or more node registration modules 420 may be configured to track the availability of the computational nodes 500. In some examples, node registration modules 420 may be implemented as: a software program, such as a software program executed by one or more of the computational nodes 500; a hardware solution; a combined software and hardware solution; and so forth. In some implementations, node registration modules 420 may communicate with computational nodes 500, for example using internal communication modules 440. In some examples, computational nodes 500 may notify node registration modules 420 of their status, for example by sending messages: at computational node 500 startup; at computational node 500 shutdowns; at constant intervals; at selected times; in response to queries received from node registration modules 420; and so forth. In some examples, node registration modules 420 may query about computational nodes 500 status, for example by sending messages: at node registration module 420 startup; at constant intervals; at selected times; and so forth.

In some embodiments, the one or more load balancing modules 430 may be configured to divide the work load among computational nodes 500. In some examples, load balancing modules 430 may be implemented as: a software program, such as a software program executed by one or more of the computational nodes 500; a hardware solution; a combined software and hardware solution; and so forth. In some implementations, load balancing modules 430 may interact with node registration modules 420 in order to obtain information regarding the availability of the computational nodes 500. In some implementations, load balancing modules 430 may communicate with computational nodes 500, for example using internal communication modules 440. In some examples, computational nodes 500 may notify load balancing modules 430 of their status, for example by sending messages: at computational node 500 startup; at computational node 500 shutdowns; at constant intervals; at selected times; in response to queries received from load balancing modules 430; and so forth. In some examples, load balancing modules 430 may query about computational nodes 500 status, for example by sending messages: at load balancing module 430 startup; at constant intervals; at selected times; and so forth.

In some embodiments, the one or more internal communication modules 440 may be configured to receive information from one or more components of cloud platform 400, and/or to transmit information to one or more components of cloud platform 400. For example, control signals and/or synchronization signals may be sent and/or received through internal communication modules 440. In another example, input information for computer programs, output information of computer programs, and/or intermediate information of computer programs, may be sent and/or received through internal communication modules 440. In another example, information received though internal communication modules 440 may be stored in memory units 210, in shared memory units 410, and so forth. In an additional example, information retrieved from memory units 210 and/or shared memory units 410 may be transmitted using internal communication modules 440. In another example, input data may be transmitted and/or received using internal communication modules 440. Examples of such input data may include input data inputted by a user using user input devices.

In some embodiments, the one or more external communication modules 450 may be configured to receive and/or to transmit information. For example, control signals may be sent and/or received through external communication modules 450. In another example, information received though external communication modules 450 may be stored in memory units 210, in shared memory units 410, and so forth. In an additional example, information retrieved from memory units 210 and/or shared memory units 410 may be transmitted using external communication modules 450. In another example, input data may be transmitted and/or received using external communication modules 450. Examples of such input data may include: input data inputted by a user using user input devices; information captured from the environment of apparatus 200 using one or more sensors; and so forth. Examples of such sensors may include: audio sensors 250; image sensors 260; motion sensors 270; positioning sensors 275; chemical sensors; temperature sensors; barometers; pressure sensors; proximity sensors; electrical impedance sensors; electrical voltage sensors; electrical current sensors; and so forth.

Figure 6:
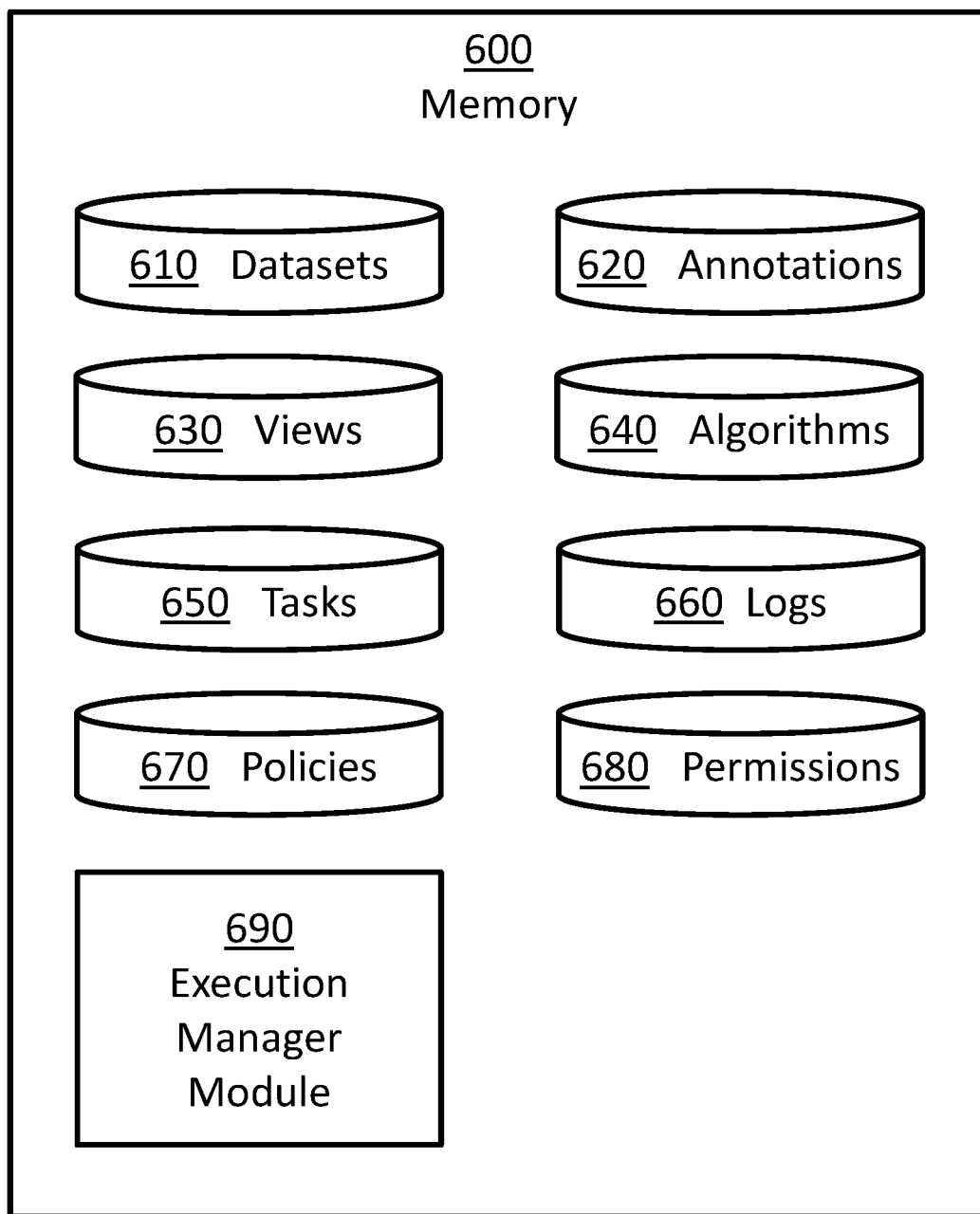
FIG. 6 illustrates an exemplary embodiment of a memory storing a plurality of modules.

FIG. 6 illustrates an exemplary embodiment of memory 600 storing a plurality of modules. In some examples, memory 600 may be separate from and/or integrated with memory units 210, separate from and/or integrated with memory units 410, and so forth. In some examples, memory 600 may be included in a single device, for example in apparatus 200, in server 300, in cloud platform 400, in computational node 500, and so forth. In some examples, memory 600 may be distributed across several devices. Memory 600 may store more or fewer modules than those shown in FIG. 6. In this example, memory 600 may comprise: one or more datasets 610, one or more annotations 620, one or more views 630, one or more algorithms 640, one or more tasks 650, one or more logs 660, one or more policies 670, one or more permissions 680, and an execution manager module 690. Execution manager module 690 may be implemented in software, hardware, firmware, a mix of any of those, or the like. For example, if the modules are implemented in software, they may contain software instructions for execution by at least one processing device, such as processing unit 220, by apparatus 200, by server 300, by cloud platform 400, by computational node 500, and so forth. In some examples, execution manager module 690 may be configured to perform at least one of processes 700, 800, 900, 1000, 1100, 1200, 1300, 1400, 1500, 1600, 1700 and 1800, and so forth.

In some embodiments, dataset 610 may comprise data and information. For example, dataset 610 may comprise information pertinent to a subject, an issue, a topic, a problem, a task, and so forth. In some embodiments, dataset 610 may comprise one or more tables, such as database tables, spreadsheets, matrixes, and so forth. In some examples, dataset 610 may comprise one or more n-dimensional tables, such as tensors. In some embodiments, dataset 610 may comprise information about relations among items, for example in a form of graphs, hyper-graphs, lists of connections, matrices holding similarities, n-dimensional tables holding similarities, matrices holding distances, n-dimensional tables holding dissimilarities, and so forth. In some embodiments, dataset 610 may comprise hierarchical information, for example in the form a tree, hierarchical database, and so forth. In some embodiments, dataset 610 may comprise textual information, for example in the form of strings of characters, textual documents, documents in a markup language (such as HTML and XML), and so forth. In some embodiments, dataset 610 may comprise visual information, such as images, videos, graphical content, and so forth. In some embodiments, dataset 610 may comprise audio data, such as sound recordings, audio recordings, synthesized audio, and so forth.

In some embodiments, dataset 610 may comprise sensor readings, such as audio captured using audio sensors 250, images captured using image sensors 260, motion information captured using motion sensors 270, positioning information captured using positioning sensors 275, atmospheric pressure information captured using barometers, pressure information captured using pressure sensors, proximity information captured using proximity sensors, electrical impedance information captured using electrical impedance sensors, electrical voltage information captured using electrical voltage sensors, electrical current information captured using electrical current sensors, user input obtained using user input devices, and so forth.

In some embodiments, dataset 610 may comprise data and information arranged in data-points. For example, a data-point may correspond to an individual, to an object, to a geographical location, to a geographical region, to a species, and so forth. For example, dataset 610 may comprise a table, and each row or slice may represent a data-point. For example, dataset 610 may comprise several tables, and each data-point may correspond to entries in one or more tables. For example, a data-point may comprise a text document, a portion of a text document, a corpus of text documents, and so forth. For example, a data-point may comprise an image, a portion of an image, a video clip, a portion of a video clip, a group of images, a group of video clips, a time span within a video recording, a sound recording, a time span within a sound recording, and so forth. For example, a data-point may comprise to a group of sensor readings. In some examples, dataset 610 may further comprise information about relations among data-points, for example a data-point may correspond to a node in a graph or in a hypergraph, and an edge or a hyperedge may correspond to a relation among data-points and may be labeled with properties of the relation. In some examples, data-points may be arranged in hierarchies, for example a data-point may correspond to a node in a tree.

In some embodiments, a dataset 610 may be produced and/or maintain by a single user, by multiple users collaborating to produce and/or maintain dataset 610, by an automatic process, by multiple automatic processes collaborating to produce and/or maintain dataset 610, by one or more users and one or more automatic processes collaborating to produce and/or maintain dataset 610, and so forth. In some examples, a user and/or an automatic process may produce and/or maintain no dataset 610, a single dataset 610, multiple datasets 610, and so forth.

In some embodiments, annotations 620 may comprise information related to datasets 610 and/or to elements within datasets 610. In some examples, a single annotation 620 may comprise information related to one dataset or to multiple datasets, and a single dataset 610 may have no, a single, or multiple annotations related to it. For example, dataset 610 may have multiple annotations 620 that complement each other, multiple annotations 620 that are inconsistent or contradict each other, and so forth.

In some embodiments, annotation 620 may be produced and/or maintain by a single user, by multiple users collaborating to produce and/or maintain annotation 620, by an automatic process, by multiple automatic processes collaborating to produce and/or maintain annotation 620, by one or more users and one or more automatic processes collaborating to produce and/or maintain annotation 620, and so forth. In some examples, a user and/or an automatic process may produce and/or maintain no annotation 620, a single annotation 620, multiple annotations 620, and so forth.

In some examples, annotation 620 may comprise auxiliary information related to datasets 610. In some examples, annotation 620 may comprise historic information related to dataset 610. Such historic information may include information related to the source of the dataset and/or of parts of the dataset, historic usages of the dataset and/or of parts of the dataset, and so forth. In some examples, annotation 620 may comprise information about the dataset and/or about items (such as data-points) in the dataset that is not included in the dataset.

In some embodiments, annotation 620 may comprise labels and/or tags corresponding to data-points of dataset 610. In some examples, a label may comprise an assignment of one value from a list of possible values to a data-point. In some examples, a tag may comprise an assignment of any number of values (including zero, one, two, three, etc.) from a list of possible values to a data-point. For example, the list of possible values may contain types (such as mammal, fish, amphibian, reptile and bird), and a label may assign a single type to a data-point (for example, fish label may indicate that the data-point describes an animal that is a fish), while a tag may assign multiple types to a data-point (for example, bird and mammal tags may indicate that the data-point comprise a picture of two animals, one bird and one mammal). In some examples, a label may comprise an assignment of a value from a range of possible values to a data-point. For example, a label with a value of 195.3 may indicate that the data-point describes a subject weighing 195.3 pounds. In some examples, a tag may comprise an assignment of any number of values (including zero, one, two, three, etc.) from a range of possible values to a data-point. For example, tags with values of 74, 73.8 and 74.6 may indicate varying results produced by repeated measurements.

In some embodiments, annotation 620 may comprise desired output corresponding to data-points of dataset 610. In some examples, the desired output may include a picture and/or a video clip. For example, a data-point may include a picture and/or a video clip, and the desired output may include the picture and/or video clip after some processing, such as noise removal, super-resolution, and so forth. In some examples, the desired output may include a mapping. For example, a data-point may include a picture and/or a video clip, and the desired output may include a mapping of pixels and/or regions of the picture and/or video clip to desired segments. In another example, a data-point may include audio data, and the desired output may include a mapping of portions of the audio data to segments. In some examples, the desired output may include audio data. For example, a data-point may include audio data, and the desired output may include the audio data after some processing, such as noise removal, source separation, and so forth. In some examples, the desired output may include processed data. For example, a data-point may include data captured using one or more sensors, and the desired output may include the data after some processing, such as noise removal, convolution, down-sampling, interpolation, and so forth. In some examples, the desired output may include textual information. For example, a data-point may include a picture and/or a video clip, and the desired output may comprise a textual description of the picture and/or video clip. In another example, a data-point may include audio data, and the desired output may comprise a transcription of the audio data. In yet another example, a data-point may include textual information, and the desired output may comprise a synopsis of the textual information.

In some examples, annotation 620 may comprise information arranged in vectors and/or tables. For example, each entry in the vector and/or row in a table and/or column in the table may correspond to a data-point of dataset 610, and the entry may comprise annotation related to that data-point. In some examples, annotation 620 may comprise information arranged in one or more matrixes. For example, each entry in the matrix may correspond to two data-points of dataset 610 according to the row and column of the entry, and the entry may comprise information related to these data-points. In some examples, annotation 620 may comprise information arranged in one or more tensors. For example, each entry in the tensor may correspond to a number of data-points of dataset 610 according to the indices of the entry, and the entry may comprise information related to these data-points. In some examples, annotation 620 may comprise information arranged in one or more graphs and/or one or more hypergraphs. For example, each node in the graph may correspond to a data-point of dataset 610, and an edge of the graph and/or hyperedge of the hypergraph may comprise information related to the data-points connected by the edges and/or hyperedge.

In some embodiments, view 630 may comprise data and information related to datasets 610 and/or annotations 620. In some examples, view 630 may comprise modified versions of one or more datasets of datasets 610 and/or modify versions of one or more annotations of annotations 620. Unless otherwise stated, it is appreciated that any operation discussed with reference to datasets 610 and/or annotations 620, may also be implemented in a similar manner with respect to views 630.

In some examples, view 630 may comprise a unification of one or more datasets of datasets 610. For example, view 630 may comprise a merging rule for merging two or more datasets. In another example, datasets 610 may comprise database tables, and view 630 may comprise SQL expressions for generating a new table out of the original tables and/or generated table. In yet another example, datasets 610 may comprise data-points, and view 630 may comprise a rule for merging data-points, a rule for selecting a subset of the data-points, and so forth.

In some embodiments, view 630 may comprise a unification of one or more annotations of annotations 620. For example, view 630 may comprise a merging rule for merging two or more annotations. In another example, annotations 620 may comprise database tables containing annotation information, and view 630 may comprise SQL expressions for generating a new annotation table out of the original tables and/or generated table. In yet another example, annotations 620 may comprise information corresponding to data-points, and view 630 may comprise a rule for merging the information corresponding to a data-point to obtain new annotation information. Such rule may prioritize information from one annotation source over others, may include a decision mechanism to produce new annotation and/or select an annotation out of the original annotations, and so forth. In another example, annotation 620 may comprise information corresponding to data-points, and view 630 may comprise a rule for selecting information corresponding to a subset of the data-points.

In some embodiments, view 630 may comprise a selection of one or more datasets of datasets 610 and one or more annotations of annotations 620. In some examples, view 630 may comprise a selection of one or more datasets 610 and of a unification of one or more annotations 620, as described above. In some examples, view 630 may comprise a selection of a unification of one or more datasets of datasets 610 (as described above) and of one or more annotations of annotations 620. In some examples, view 630 may comprise a selection of a unification of one or more datasets of datasets 610 and of a unification of one or more annotations of annotations 620. In some examples, view 630 may comprise a selection of one or more other views of views 630.

In some embodiments, algorithms 640 may comprise algorithms for processing information, such as the information contained in datasets 610 and/or annotations 620 and/or views 630 and/or tasks 650 and/or logs 660 and/or policies 670 and/or permissions 680. In some cases, algorithms 640 may further comprise parameters and/or hyper-parameters of the algorithms. For example, algorithms 640 may comprise a plurality of versions of the same core algorithm with different sets of parameters and/or hyper-parameters.

In some embodiments, algorithm 640 may comprise one or more decision rules. For example, a decision rule may compare a computed value to a threshold, and in some cases the threshold may be set based on a parameter and/or a hyper-parameter. In some embodiments, algorithm 640 may be preprogrammed manually. For example, a manually preprogrammed algorithm may implement a heuristic algorithm that has zero or more parameters and/or hyper-parameters. In some embodiments, algorithm 640 may comprise a machine learning algorithm configured to train on training examples, such as training examples included in datasets 610 and/or views 630, to estimate labels and/or tags and/or desired results, such as labels and/or tags and/or desired results included in annotations 620 and/or views 630. For example, algorithm 640 may comprise a kernel based algorithm, such as support vector machine and/or kernel principal component analysis, and the selection of a kernel may be according to a hyper-parameter. For example, algorithm 640 may comprise an artificial neural network, and the structure and/or other characteristics of the artificial neural network may be selected according to hyper-parameters. For example, algorithm 640 may comprise a clustering and/or a segmentation algorithm, and the number of desired clusters and/or segments may be selected according to a hyper-parameter. For example, algorithm 640 may comprise a factorization algorithm, and the number of desired factors may be determined according to a hyper-parameter. For example, a stopping condition of algorithm 640 may be based on hyper-parameters. In some examples, algorithm 640 may comprise a regression algorithm, a classification algorithm, a clustering algorithm, a segmentation algorithm, a factorization algorithm, a source separation algorithm, a dimensional reduction algorithm, a feature selection algorithm, and so forth. In some examples, algorithms 640 may comprise an algorithm that combines two or more other algorithms into a single algorithm.

In some embodiments, algorithms 640 may comprise algorithms for processing information and data from an external source. In some examples, the external data source may include a sensor (such as audio sensor, image sensor, motion sensor, positioning sensor, etc.), a user, an external device, an automatic process, external data repository, and so forth. Some examples of external data repositories may include a public database, a blockchain, a web crawler, and so forth.

In some embodiments, algorithms 640 may process information and data from an external source to update datasets 610 and/or annotations 620 and/or views 630 and/or algorithms 640 and/or tasks 650 and/or logs 660 and/or policies 670 and/or permissions 680. In some examples, based on the data from the external source, the algorithm may add information to one or more datasets, remove information from one or more datasets, modify information of one or more datasets, and so forth. For example, the algorithm may add new data-points containing the data from the external source to a dataset, update existing data-points according to the data from the external source, remove data-points that were made obsolete according to data from the external source, and so forth. In some examples, based on the data from the external source, the algorithm may add information to one or more annotations, remove information from one or more annotations, modify information of one or more annotations, and so forth. For example, the algorithm may add new labels and/or tags and/or desired results containing data from the external source to an annotation, update existing labels and/or tags and/or desired results according to the data from the external source, remove labels and/or tags and/or desired results that were made obsolete according to data from the external source, and so forth. In some examples, algorithms 640 may process information and data from an external source to update one or more data-points of datasets 610 and one or more corresponding labels and/or tags and/or desired results of annotations 620. In some examples, based on the data from the external source, the algorithm may create a new view, delete a view, modify a view, and so forth. In some examples, the algorithm may create a new view to match an observed phenomenon and/or environment. In some examples, the algorithm may maintain views of items relevant to an environment, device, user, problem, and so forth. Some examples of such items may include objects, people, faces, gestures, voices, sounds, and so forth. For example, observing an environment with some types of objects may cause the algorithm to create a view containing examples of the observed types, which may later be used to train an object detector. Furthermore, detecting a change in said environment, such as an introduction of a new type of objects to the environment or removal of a certain type of objects from the environment, may cause the algorithm to modify the view to match the change. Furthermore, when a situation change in a way that makes the environment expendable, the algorithm may delete the corresponding view. For example, observing a conversation of two speakers may cause the algorithm to create a view containing voice samples of the two speakers. Furthermore, detecting a change in the conversation, for example an introduction of a new speaker to the conversation, may cause the algorithm to add voice samples of the new speaker to the view. Furthermore, end of the conversation may cause the algorithm to delete the corresponding view. In another example, when the data from the external source describes a household containing a child and a dog, the algorithm may create a view containing image examples of children and of dogs by merging datasets and/or annotations of image examples of children with datasets and/or annotations of image examples of dogs. When the data from the external source indicates an addition of a cat to the household, image examples of cats may be added to the view by merging additional datasets and/or annotations of image examples of cats into the view. Furthermore, when the data from the external source indicates that the dog left the household, information related to the image examples of dogs may be removed from the view.

In some embodiments, algorithms 640 may process information and data from datasets 610 and/or annotations 620 and/or views 630 and/or algorithms 640 and/or tasks 650 and/or logs 660 and/or policies 670 and/or permissions 680 to update datasets 610 and/or annotations 620 and/or views 630 and/or algorithms 640 and/or tasks 650 and/or logs 660 and/or policies 670 and/or permissions 680. For example, based on data from some source datasets of datasets 610, the algorithm may update the source datasets, update other datasets, update annotations associated with the source datasets, update other annotations, update views based on the source datasets, update other views, and so forth. Similarly, based on data from some source annotations of annotations 620, the algorithm may update the source annotations, update other annotations, update datasets associated with the source annotations, update other datasets, update views based on the source annotations, update other views, and so forth. Furthermore, based on data from some source views of views 630, the algorithm may update the source views, update other views, update datasets and/or annotations that the source views are based on, update other datasets and/or annotations, and so forth.

In some examples, updating datasets 610, for example by an algorithm processing data from datasets 610 and/or annotations 620 and/or views 630 as described above, may comprise adding new datasets to datasets 610 (for example where a new dataset comprises data-points containing results of calculations based on the processed information, data-points selected from other datasets based on the results of the calculations, etc.), removing datasets from datasets 610 (for example removing datasets that were made obsolete according to a calculation based on the processed information), modifying some of the datasets of datasets 610, and so forth. In some examples, modifying a dataset, for example by an algorithm processing data from datasets 610 and/or annotations 620 and/or views 630 as described above, may comprise adding new data-points to the dataset (for example where a new data-point contains a result of a calculation based on the processed information), modifying data-points of the dataset (for example changing a value of a data-point according to a calculation based on the processed information), removing data-points from the dataset (for example removing data-points that were made obsolete according to a calculation based on the processed information), and so forth.

In some examples, updating an annotation, for example by an algorithm processing data from datasets 610 and/or annotations 620 and/or views 630 as described above, may comprise adding new annotations to annotations 620 (for example where a new annotation comprises tags and/or labels and/or desired results containing results of calculations based on the processed information, tags and/or labels and/or desired results selected from other annotations based on the results of the calculations, etc.), removing annotations from annotations 620 (for example removing annotations that were made obsolete according to a calculation based on the processed information), modifying some of the annotations of annotations 620, and so forth. In some examples, modifying an annotation may comprise adding tags and/or labels and/or desired results to the annotation (for example where the value of the label and/or tag and/or desired result is according to a result of a calculation based on the processed information), removing tags and/or labels and/or desired results from the annotation (for example removing labels and/or tags and/or desired results that were made obsolete according to the calculation's result), modifying tags and/or labels and/or desired results in the annotation (for example according to the calculation's result), and so forth. For example, the algorithm may add and/or modify and/or remove labels and/or tags and/or desired results of the annotation that corresponds to data-points of datasets 610 based on a result of a calculation that is based on values of said data-points. In another example, the algorithm may produce a new annotation based on several other source annotations that deal with the same dataset, for example using a voting mechanism. In some examples, the algorithm may update the produced annotation in response to a change in the source annotations, may delete the produced annotation in response a deletion of one of the source annotations, and so forth.

In some examples, updating a view, for example by an algorithm processing data from datasets 610 and/or annotations 620 and/or views 630 as described above, may comprise adding new views to views 630, removing views from views 630, modifying some of the views of views 630, and so forth. For example, observing a dataset and/or an annotation with some distribution of elements may cause the algorithm to create a view containing a sample of the elements with a different distribution. Furthermore, detecting a change of the dataset and/or annotation that caused a change of said distribution may lead the algorithm to modify the view to match the change. Furthermore, when changes to the dataset and/or the annotation cause the said distribution to reach a certain desired property, the algorithm may remove the view.

In some embodiments, algorithms 640 may process information and data from datasets 610 and/or one or more annotations 620 and/or one or more views 630 and/or algorithms 640 and/or tasks 650 and/or logs 660 and/or policies 670 and/or permissions 680 to update one or more algorithms 640. In some examples, based on the processed information, the algorithm may create a new algorithm, delete an algorithm, modify an algorithm, and so forth. For example, observing a dataset and/or an annotation and/or a view with some distribution of elements may cause the algorithm to create a new algorithm with a set of hyper-parameters matching the distribution. Furthermore, detecting a change to the dataset and/or annotation and/or view that caused a change in said distribution may cause the algorithm to modify the set of hyper-parameters to match the changed distribution. Furthermore, when changes to the dataset and/or the annotation and/or the view cause the said distribution to reach a certain desired property, the algorithm may delete the created algorithm.

In some embodiments, tasks 650 may comprise one or more tasks waiting for execution. In some examples, a task may comprise a selection of one or more datasets of datasets 610, of one or more annotations of annotations 620, of one or more views of views 630, of one or more algorithms of algorithms 640, and so forth. For example, a task may comprise a selection of a dataset and an algorithm, and the execution of the task may comprise applying the selected algorithm to the data of the selected dataset. In another example, a task may comprise a selection of a dataset, an annotation and an algorithm, and the execution of the task may comprise applying the selected algorithm to the data of the selected dataset and the selected annotation. In yet another example, a task may comprise a selection of an annotation and an algorithm, and the execution of the task may comprise applying the selected algorithm to information included in the selected annotation. In another example, a task may comprise a selection of a view and an algorithm, and execution of the task may comprise applying the selected algorithm to the selected view.

In some embodiments, tasks 650 may comprise scheduling information. For example, the scheduling information may specify priorities assigned to the tasks, in the form of a priority values assigned to the tasks (such as high, medium, low, numerical priority values, etc.), in the form of an ordering of the tasks according to ascending or descending priority, and so forth. In some examples, the scheduling information may specify preferred execution times, constraints on execution times, preferred execution frequencies, constraints on execution frequencies, and so forth.

In some embodiments, tasks 650 may comprise execution requirements. In some examples, the execution requirements may comprise details about preferred execution conditions and/or settings of the tasks. For example, execution requirements may comprise a specification of hardware requirements (such as memory size, processing power, etc.) of a task. In another example, execution requirements may comprise an indication of specific devices and/or specific device types required to execute the task (such as apparatus 200, server 300, cloud platform 400, computational node 500, and so forth). In yet another example, execution requirements may comprise a specification of software requirements of a task (such as operation system, software libraries, software modules, and so forth).

In some embodiments, tasks 650 may comprise tasks for manual execution. In some examples, tasks for manual execution may include indications of specific persons required to execute the task, of types of persons required to execute the task, of skills required to execute the task, and so forth.

In some embodiments, algorithms 640 may process information and data from an external source to update one or more tasks of tasks 650. In some examples, based on the data from the external source, the algorithm may create a new task, delete a task, modify a task, and so forth. For example, in response to an observed change in an environment, the algorithm may create a new task dealing with datasets and/or annotations and/or views related to the environment and/or the observed change, may update a task related to the environment and/or the observed change, may delete a task that became obsolete by the observed change, and so forth.

In some embodiments, algorithms 640 may process information and data from datasets 610 and/or annotations 620 and/or views 630 and/or algorithms 640 and/or tasks 650 and/or logs 660 and/or policies 670 and/or permissions 680 to update tasks 650. In some examples, based on the data from datasets 610 and/or annotations 620 and/or views 630 and/or algorithms 640 and/or tasks 650 and/or logs 660 and/or policies 670 and/or permissions 680, the algorithm may create a new task, delete a task, modify a task, and so forth. For example, observing an update to a dataset and/or to an annotation and/or to a view and/or to an algorithm may cause the algorithm to create a new task dealing with the updated items, may cause the algorithm to modify a task dealing with the updated items, may cause the algorithm to remove a task that was made obsolete by the update, and so forth.

In some embodiments, logs 660 may comprise historic information related to datasets 610, annotations 620, views 630, algorithms 640, tasks 650, logs 660, policies 670, permissions 680, and so forth. In some examples, a log may comprise historic information about creations and/or deletions and/or modifications of datasets 610, elements of a dataset, annotations 620, elements of an annotation, views 630, elements of a view, algorithms 640, core algorithms of an algorithm, parameters and/or hyper-parameters of an algorithm, tasks 650, details of a task, logs 660, a log, entries of a log, policies 670, a policy, an element of a policy, permissions 680, a permission record, and so forth.

In some examples, a log may comprise historic information about past execution details of algorithms 640 and/or tasks 650. For example, such execution details may include the execution time, the execution duration, the executing device, the executing person, the actual resource requirement, software versions of software used in the execution, and so forth. For example, such execution details may comprise errors and/or results of the execution and/or statistics based on the results of the execution. Furthermore, such execution details may comprise versions of datasets 610, annotations 620, views 630, algorithms 640, tasks 650, logs 660, policies 670, permissions 680, etc., used in the execution.

In some embodiments, policies 670 may comprise a specification of what actions need to be taken, for example periodically and/or in response to a change. In some examples, execution manager module 690 may act according to policies 670. In some examples, based on policies 670, execution manager module 690 may create and/or delete and/or modify datasets 610, a dataset, elements of a dataset, annotations 620, an annotation, elements of an annotation, views 630, a view, elements of a view, algorithms 640, an algorithm, core algorithms of an algorithm, parameters and/or hyper-parameters of an algorithm, tasks 650, a task, details of a task, logs 660, elements of a log, policies 670, a policy, a detail of a policy, permissions 680, a permission record, and so forth.

In some embodiments, permissions 680 may specify which user and/or automatic process and/or algorithm (such as an algorithm of algorithms 640) and/or task (such as a task of tasks 650) may access and/or create and/or modify and/or delete which item (such as datasets 610, a dataset, elements of a dataset, annotations 620, an annotation, elements of an annotation, views 630, a view, elements of a view, algorithms 640, an algorithm, core algorithms of an algorithm, parameters and/or hyper-parameters of an algorithm, tasks 650, a task, details of a task, logs 660, a log, elements of a log, policies 670, a policy, a detail of a policy, permissions 680, a permission record, details of a permission record, and so forth).

In some embodiments, datasets 610 and/or annotations 620 and/or views 630 and/or algorithms 640 and/or tasks 650 and/or logs 660 and/or policies 670 and/or permissions 680 may be created and/or deleted and/or modified manually and/or automatically.

In some embodiments, a process, such as processes 700, 800, 900, 1000, 1100, 1200, 1300, 1400, 1500, 1600, 1700 and 1800, may comprise of one or more steps. In some examples, a process, as well as all individual steps therein, may be performed by various aspects of apparatus 200, server 300, cloud platform 400, computational node 500, and so forth. For example, the process may be performed by processing units 220 executing software instructions stored within memory units 210 and/or within shared memory modules 410. In some examples, a process, as well as all individual steps therein, may be performed by a dedicated hardware. In some examples, computer readable medium (such as a non-transitory computer readable medium) may store data and/or computer implementable instructions for carrying out a process. Some examples of possible execution manners of a process may include continuous execution (for example, returning to the beginning of the process once the process normal execution ends), periodically execution, executing the process at selected times, execution upon the detection of a trigger (some examples of such trigger may include a trigger from a user, a trigger from another process, a trigger from an external device, etc.), and so forth.

Figure 7:
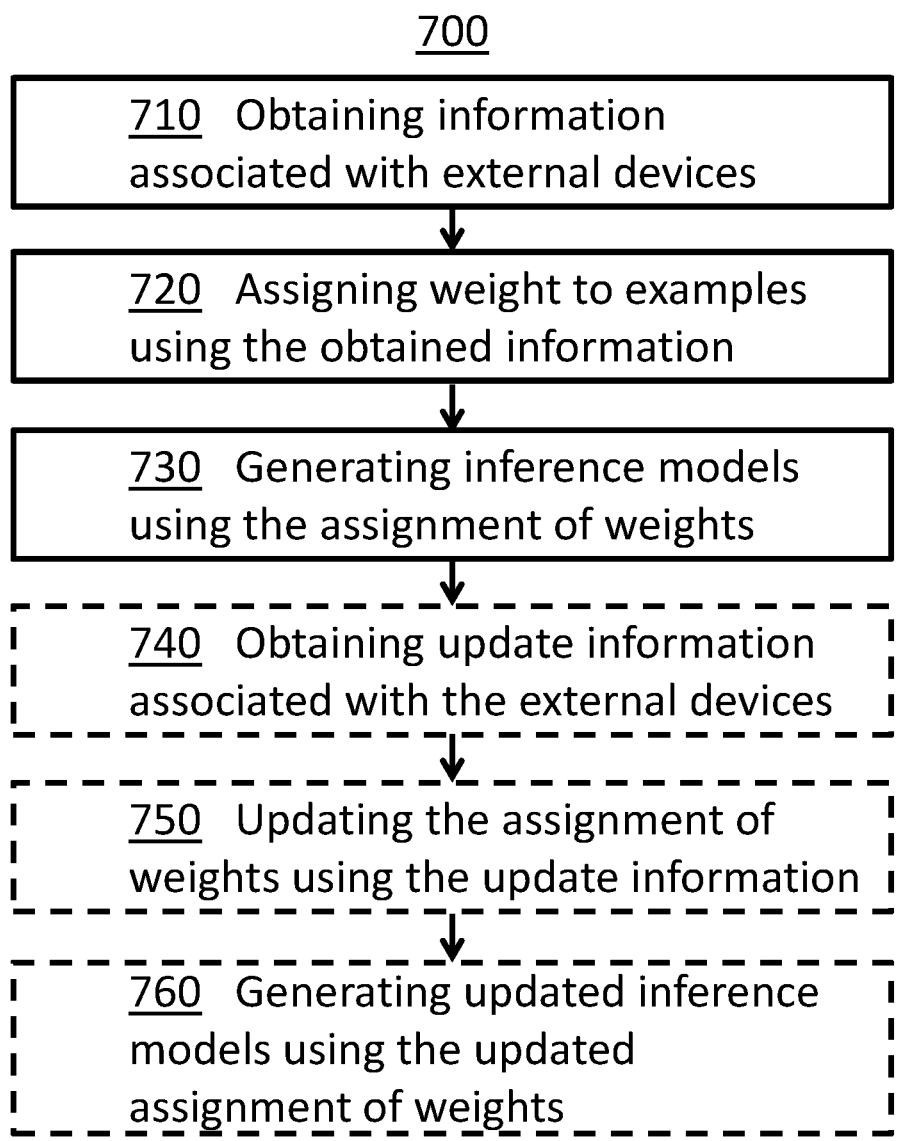
FIG. 7 illustrates an example of a process for selective use of examples.

FIG. 7 illustrates an example of a process 700 for selective use of examples. In this example, process 700 may comprise: obtaining information associated with external devices (Step 710); assigning weights to examples using the obtained information (Step 720); generating inference models using the assignment of weights (Step 730); obtaining update information associated with the external devices (Step 740); updating the assignment of weights using the update information (Step 750); and generating updated inference models using the updated assignment of weights (Step 760). In some implementations, process 700 may comprise one or more additional steps, while some of the steps listed above may be modified or excluded. For example, in some cases Step 740 and/or Step 750 and/or Step 760 may be excluded from process 700. In some implementations, one or more steps illustrated in FIG. 7 may be executed in a different order and/or one or more groups of steps may be executed simultaneously and vice versa.

In some embodiments, obtaining information associated with external devices (Step 710) may comprise obtaining information associated with one or more external devices, for example associated with external devices configured to utilize inference models. For example, at least part of the information may be read from memory (such as memory units 210, shared memory modules 410, and so forth). In another example, at least part of the information may be received from an external device (for example, from the device associated with the information), for example using communication devices (such as communication modules 230, internal communication modules 440, external communication modules 450, and so forth). In yet another example, at least part of the information associated with external devices may be generated, for example by using a computer network monitoring device and/or a computer network monitoring software program (for example, that monitor network 130 for available devices). For example, Step 710 may use Step 910 to obtain available processing resources information of the external devices, and the information associated with the external devices may comprise and/or be based on at least part of the available processing resources information. In another example, Step 710 may use Step 1220 to obtain properties of the external devices, and the information associated with the external devices may comprise and/or be based on at least part of the obtained properties of the external devices.

In some examples, at least part of the information associated with external devices may comprise settings information related to the external devices. For example, the settings information may comprise software and hardware properties of the external devices, such as manufacturer, type, version, configuration, and so forth. In another example, the external devices may comprise one or more sensors (such as audio sensors 250, image sensors 260, motion sensors 270, positioning sensors 275, barometers, pressure sensors, proximity sensors, electrical impedance sensors, electrical voltage sensors, electrical current sensors, and so forth), and the settings information may comprise settings information related to the at least some of the sensors. For example, the settings information may comprise settings information of audio sensors, such as sensor's type, number of channels, bit depth, sample rate, levels, boost, calibration data, software preprocessing and/or enhancement, and so forth. In another example, the settings information may comprise settings information of image sensors, such as sensor's type, aspect ratio, pixel resolution, color style, color depth, frame rate, zoom settings, position, orientation, field of view information, shutter speed, aperture, calibration data, software preprocessing and/or enhancement, and so forth. In some examples, at least part of the information associated with external devices may comprise geographical data related to the external devices and/or to parts of the external devices. For example, the geographical data may include locations of the external devices and/or of parts of the external devices.

In some examples, at least part of the information associated with external devices may comprise scene information, where the scene information may comprise information related to data captured using one or more sensors from an environment. For example, the scene information may comprise information related to the distribution of captured data (for example in the form of frequencies at which different types of information are captured, in the form of a histogram, etc.), minimal levels captured, maximal levels captured, aggregated and/or statistical measurements related to data captured over time, typical captured data instances, results of applying captured data to a clustering algorithm (such as k-means, spectral clustering, etc.), results of applying captured data to a dimensionality reduction algorithm (such as Principal Component Analysis, Canonical Correlation Analysis, etc.), and so forth. In another example, the scene information may comprise information related to items and/or objects present and/or detected in the captured data.

In some examples, the scene information may be a result of analyzing one or more images captured from an environment using at least one image sensor (such as image sensors 260) included in the external device. In some examples, the scene information may comprise one or more portions of the images. For example, a motion analysis of a video captured using stationary image sensor may be performed, and the portions of the video that has no or little movement may be selected. In another example, image gradients may be calculated, and the portions of the images that have high variance of gradients may be selected. In another example, face detector may be used to detect faces appearing in the images, and portions of the images containing faces may be selected. In some examples, the scene information may comprise information related to objects detected in the images, properties of the detected objects, information related to the detected objects, positions at which one or more objects were detected, frequencies at which different objects are detected, images of detected objects, and so forth. For example, the scene information may comprise properties of the detected object, such as type, size, color, condition, and so forth. In some cases, the scene information may comprise a mapping that specifies, for different pixels and/or image regions, the objects detected at those pixels and/or regions, the frequencies at which objects are detected at those pixels and/or regions, the frequencies at which specific objects are detected at those pixels and/or regions, and so forth. Some examples of object detection algorithms that may be used may include deep learning based object detection algorithms, appearance based object detection algorithms, image features based object detection algorithms, and so forth. In some examples, the scene information may comprise information related to faces detected and/or faces recognized in the images, such as identifying information of the detected and/or recognized faces, information related to the detected and/or recognized faces, positions at which one or more faces were detected, frequencies at which different faces are appearing, images of detected and/or recognized faces, and so forth. For example, the scene information may comprise identified properties of individuals appearing in the images, such as names, ages, gender, hair color, height, weight, and so forth. In some cases, the scene information may comprise information related to people appearing regularly in the images, for example to people appearing in more than a selected number of images, over a selected time span, and so forth. In some cases, the scene information may comprise a mapping that specifies, for different pixels and/or image regions, the faces and/or people detected at these pixels and/or regions, the frequencies at which faces and/or people are detected at these pixels and/or regions, the frequencies at which specific faces and/or people are detected at these pixels and/or regions, and so forth. Some examples of face detection algorithms that may be used may include deep learning based face detection algorithms, appearance based face detection algorithms, color based face detection algorithms, texture based face detection algorithms, shape based face detection algorithms, motion based face detection algorithms, boosting based face detection algorithms, and so forth. Some examples of face recognition algorithms that may be used may include deep learning based face recognition algorithms, appearance based face recognition algorithms, color based face recognition algorithms, texture based face recognition algorithms, shape based face recognition algorithms, motion based face recognition algorithms, boosting based face recognition algorithms, dimensionality reduction based face recognition algorithms (such as eigenfaces, Fisherfaces, etc.), 3D face recognition algorithms, and so forth. In some cases, the scene information may comprise information differentiating among types of scenes (such as indoor scenes and outdoor scenes), for example based on distribution of colors in captured images. In some examples, the scene information may comprise background of the environment extracted from a video (for example, from a video captured using image sensors 260), information related to the extracted background, and so forth. Examples of algorithms for background extraction that may be used may include, taking the median of the video, taking the median of the video after adjusting for ego motion, taking the mean of the video, taking the mean of the video after adjusting for ego motion, taking the mode of the video, taking the mode of the video after adjusting for ego motion, and so forth.

In some examples, the scene information may be a result of analyzing audio data captured from an environment using at least one audio sensor (such as audio sensors 250) included in the external device. In some examples, the scene information may comprise identified characteristics of the ambient noise, a model of the ambient noise, information related to the ambient noise, typical frequencies of ambient noise, and so forth. For example, the noise levels may be monitored over time, and the scene information may comprise information related to the noise levels, such as minimal noise level, maximal noise level, distribution of noise levels, histogram of noise levels, and so forth. In some examples, the scene information may comprise information related to the speakers in the audio data, such as voice models of speakers identified in captured audio. In another example, the scene information may comprise information related to the speaking time of the speakers in the audio data, such as the total speaking time of each speaker, the total speaking time for all speakers cumulatively, histogram of the speaking times with respect to time in day, and so forth.

In some embodiments, assigning weights to examples using the obtained information (Step 720) may comprise using the information associated with external devices (for example, the information obtained by Step 710) to assign weights to a plurality of examples. In some examples, assigning weights may comprise using the information associated with external devices to select one or more selected examples of a plurality of alternative examples (for example from datasets 610 and/or annotations 620 and/or views 630). Further, a weight of zero may be assigned to the non-selected examples, and non-zero weights (such as a constant weight, a weight of one, positive weights, weights calculated as described below, etc.) may be assigned to the selected examples. For example, the examples may be selected according to a rule. In another example, the information associated with external devices may comprise available processing resources information, and the examples may be selected as described for Step 920. In yet another example, the information associated with external devices may comprise settings information related to at least one sensor, and examples comprising data captured using similar settings and/or synthetic data associated with similar settings may be selected. In another example, the information associated with external devices may comprise location information (such as country, region, address, etc.), and examples associated with the location and/or the type of the location (such as office, residential building, street, etc.) may be selected, for example by selecting examples that comprise data captured from similar locations and/or similar types of locations. In some examples, the information associated with external devices may comprise scene information, and examples captured from similar scenes may be selected. For example, from scenes with similar distribution of captured data, with similar items and/or objects and/or people, with similar ambient noise, with similar noise levels, with similar speakers, and so forth.

In some examples, assigning weights may comprise using the information associated with external devices to calculate weights for examples. In some examples, using the information associated with external devices, a function that assigns weights to examples may be selected of a plurality of alternative functions. In some examples, the weights may be assigned according to a function that takes as inputs an example and at least part of the information associated with the external devices, and outputs a weight for the input example. Such function may comprise an inference model, an artificial neural network, an algorithm, and so forth. For example, the inference model may be a result of training a machine learning algorithm using training examples, where a training example may comprise weights assigned manually to examples. In another example, the information associated with external devices may comprise settings information, the examples may comprising data captured using some settings and/or synthetic data associated with some settings, and the function may assign weights to examples according to the similarity between the settings associated with an example and the settings associated with the external devices. In yet another example, the information associated with external devices may comprise location information, and the function may assign weights to examples according to a distance (and/or a similarity) between a location associated with an example and the location associated with the external devices.

In some examples, the information associated with external devices may comprise scene information, and the function may assign weights to examples according to the compatibility between an example and the scene information. For example, the scene information may comprise information related to the distribution of captured data, and weights may be assigned to examples to reflect the probability of capturing the example according to the distribution of captured data. In another example, the scene information may comprise information related to items and/or objects present and/or detected in the captured data, and examples associated with and/or comprising similar items and/or objects may be assigned higher weights than other examples. In yet another example, the scene information may comprise portions of the images, and examples associated with and/or comprising similar portions of images may be assigned higher weights than other examples. In another example, the scene information may comprise properties of items and/or objects and/or people detected in an environment, and examples associated with and/or comprising items and/or objects and/or people with similar properties may be assigned higher weights than other examples. In yet another example, the scene information may comprise a mapping associated with pixels and/or image regions, and examples that correspond to the mapping may be assigned higher weights than other examples. In another example, the scene information may comprise information differentiating among types of scenes (such as indoor scenes and outdoor scenes), and examples that correspond to the indicated type of scene may be assigned higher weights than other examples. In yet another example, the scene information may comprise background image of the environment, and examples with similar background may be assigned higher weights than other examples. In another example, the scene information may comprise information related to ambient noise, and examples with similar ambient noise may be assigned higher weights than other examples. In yet another example, the scene information may comprise information related to the distribution of noise levels, and examples with similar noise levels may be assigned higher weights than other examples. In another example, the scene information may comprise information related to the speakers in the audio data, and examples with speakers may be assigned higher weights than other examples.

In some examples, the scene information may comprise a distribution (such as a distribution of captured data, distribution of noise levels, etc.) and the examples may also comprise distributions. Further, a statistical distance (such as f-divergence, Kullback-Leibler divergence, Hellinger distance, Total variation distance, Rényi's divergence, Jensen-Shannon divergence, Lévy-Prokhorov metric, Bhattacharyya distance, Kantorovich metric, Tsallis divergence, etc.) between the distribution from the scene information and the distribution from an example may be used to quantify the distance from the scene information to the example, and higher weights may be assigned to examples corresponding to smaller distances. For example, for an example corresponding to a distance d a weight of $\exp(-d/c)$ may be assigned for a selected positive constant c.

Additionally or alternatively to Step 720, process 700 may generate synthetic examples using the information associated with external devices (for example, the information obtained by Step 710). For example, an artificial neural network trained to produce synthetic examples from information associated with external devices may be used. In another example, using the information associated with external devices, some examples may be selected as described above, and additional synthetic examples may be generated, for example using the Synthetic Minority Oversampling Technique (SMOTE).

In some embodiments, generating inference models using the assignment of weights (Step 730) may comprise generating inference models using weights assigned to a plurality of examples (for example, the weights assigned by Step 720) and/or the plurality of examples. In some examples, the plurality of examples and/or the corresponding assigned weights may be used as a training set and/or a validation set and/or a test set. In some examples, the plurality of examples and/or the corresponding assigned weights may be split into at least two of a training set and/or a validation set and/or a test set. In some examples, a machine learning algorithm that supports weights for the training examples and/or validation examples and/or test examples may be trained using the plurality of examples and the weights assigned to the plurality of examples to obtain an inference model. Some examples of machine learning algorithms that may be used may include support vector machine, gradient descent based algorithms, deep learning algorithms for artificial neural networks, AdaBoost, linear regression, and so forth. For example, process 1200 may be used to select hyper-parameters for the machine learning algorithm and/or to cause a selected device to train the machine learning algorithm. In another example, process 1300 may be used to select additional training examples and use the additional training examples together with the plurality of examples and the weights to train a machine learning algorithm. In some examples, the generated inference model may be utilized, for example using Step 930, using Step 1050, and so forth. In another example, the generated inference model may be compared with another inference model using data items associated with the external devices, for example using process 1000, which may further utilize the generated inference model based on the result of the comparison. In yet another example, the generated inference model may comprise an artificial neural network, and a descriptor of the inference model may be generated by process 1100.

Additionally or alternatively to Step 730, process 700 may generate inference models using the synthetic examples generated using the information associated with external devices (alone or in combination with the weights assigned to a plurality of examples and/or the plurality of examples). For example, the synthetic examples (alone or in combination with the plurality of examples and/or the corresponding assigned weights) may be used as a training set and/or a validation set and/or a test set. In some examples, the synthetic examples (alone or in combination with the plurality of examples and/or the corresponding assigned weights) may be split into at least two of a training set and/or a validation set and/or a test set. In some examples, a machine learning algorithm may be trained using the synthetic examples (alone or in combination with the plurality of examples and/or the corresponding assigned weights) to generate an inference model. The generated inference model may be utilized, for example using Step 930, using Step 1050, and so forth.

In some embodiments, obtaining update information associated with the external devices (Step 740) may comprise obtaining an update to the information associated with external devices obtained by Step 710. For example, Step 740 may use Step 710 to obtain updated information associated with the external devices. In another example, modified parts of the information associated with the external devices may be obtained. For example, at least part of the modified parts may be read from memory (such as memory units 210, shared memory modules 410, and so forth). In another example, at least part of the modified parts may be received from the external devices, for example using communication devices (such as communication modules 230, internal communication modules 440, external communication modules 450, and so forth). In yet another example, at least part of the modified parts may be generated, for example by using a computer network monitoring device and/or a computer network monitoring software program (for example, that monitor network 130 for additions of available devices and/or removal of devices).

In some embodiments, updating the assignment of weights using the update information (Step 750) may comprise updating the assignment of weights to examples of Step 720 according to the update information obtained by Step 740. For example, Step 720 may be used with the updated information associated with the external devices obtained by Step 740 to generate an updated assignment of weights. In some examples, Step 750 may compare the updated information associated with the external devices obtained by Step 740 with the original information associated with the external devices obtained by Step 710 to determine if the magnitude of the update is above a selected threshold. Further, in response to a magnitude of update that is above the selected threshold, Step 750 may update the assignment of weights to examples, and in response to a magnitude of update that is below the selected threshold, Step 750 may forgo updating the assignment of weights to examples (and in some cases, process 700 may forgo Step 760, may return to Step 740, may stop, and so forth).

In some embodiments, generating updated inference models using the updated assignment of weights (Step 760) may comprise generating an updated inference model based on the plurality of examples and the updated assignment of weights to examples obtained by Step 750. For example, the plurality of examples and the updated assignment of weights to examples may be applied to a machine learning algorithm to obtain an updated inference model. For example, Step 730 may be used with the updated assignment of weights to examples to obtain the updated inference model. In some examples, Step 760 may compare the updated assignment of weights to examples obtained by Step 750 with the original assignment of weights to examples obtained by Step 720 to determine if the magnitude of the update is above a selected threshold. Further, in response to a magnitude of update that is above the selected threshold, Step 760 may generate the updated inference models, and in response to a magnitude of update that is below the selected threshold, Step 760 may forgo generating the updated inference models. In some examples, the inference model generated by Step 760 may be utilized, for example using Step 930, using Step 1050, and so forth. In another example, the inference model generated by Step 730 and the updated inference model generated by Step 760 may be compared, for example using Process 1000, and in some cases the updated inference model may be utilized according to the result of the comparison, for example using Step 1050 and/or Step 1060.

Figure 8:
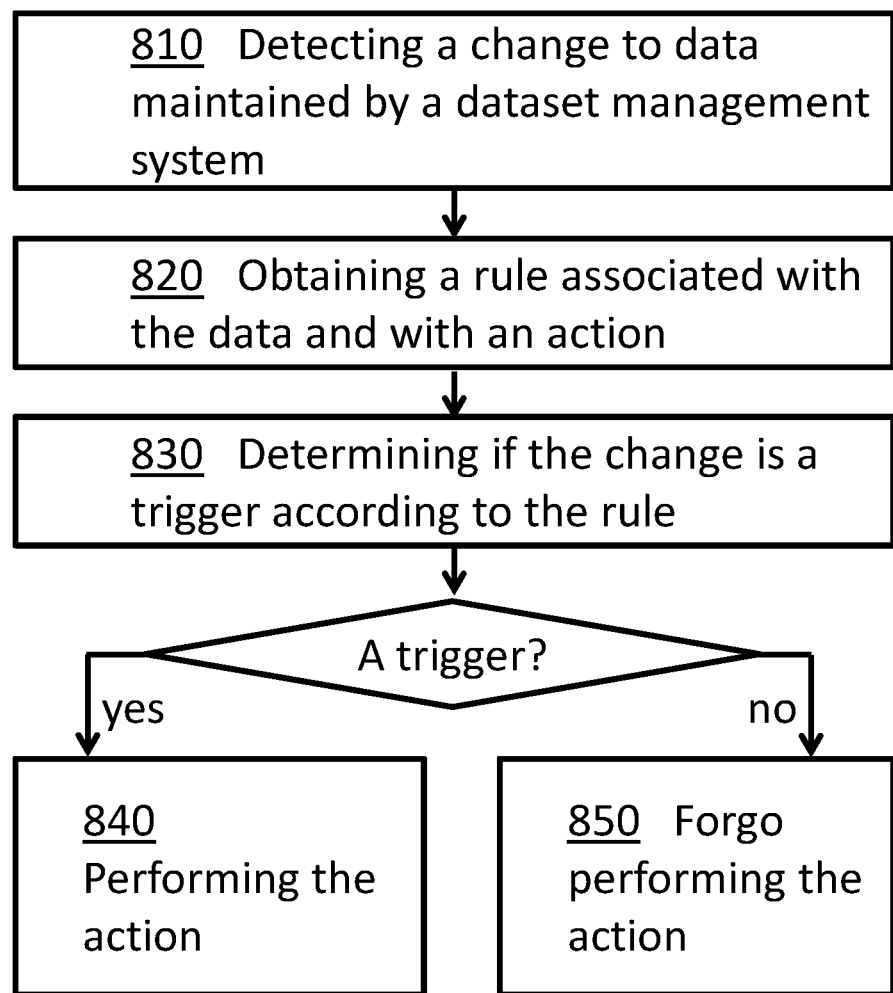
FIG. 8 illustrates an example of a process for causing actions in a dataset management system.

FIG. 8 illustrates an example of a process 800 for causing actions in a dataset management system. In this example, process 800 may comprise: detecting a change to data maintained by a dataset management system (Step 810); obtaining a rule associated with the data and with an action (Step 820); and determining if the change is a trigger according to the rule (Step 830). Optionally, based on the determination, process 800 may continue. In some examples, when the change is a trigger according to the rule, process 800 may perform the action (Step 840). In some examples, when the change is not a trigger according to the rule, process 800 may forgo performing the action (Step 850). In some implementations, process 800 may comprise one or more additional steps, while some of the steps listed above may be modified or excluded. In some implementations, one or more steps illustrated in FIG. 8 may be executed in a different order and/or one or more groups of steps may be executed simultaneously and vice versa.

In some embodiments, detecting a change to data maintained by a dataset management system (Step 810) may comprise obtaining an indication of a change to data maintained by a dataset management system, such as datasets 610, annotations 620, views 630, and so forth. For example, the change may comprise an addition and/or a removal and/or a modification of a dataset, of an annotation, of a view, and so forth. In another example, the change may comprise an addition and/or a removal and/or a modification of elements of a dataset, elements of an annotation, elements of a view, and so forth. In some examples, Step 810 may monitor logs 660 (for example, in a poll scheme, in a push scheme, etc.), and analyze new log entries to detect changes to data maintained by a dataset management system. In some examples, Step 810 may monitor datasets 610 and/or annotations 620 and/or views 630 (for example, in a poll scheme, in a push scheme, etc.) to detect changes to data maintained by a dataset management system. In some examples, Step 810 may be repeated to detect a plurality of changes.

In some embodiments, obtaining a rule associated with the data and with an action (Step 820) may comprise accessing rules associated with the data changed (for example, as detected by Step 810) and/or with the change detected by Step 810 and/or with one or more actions. In some examples, the rule may be configured to classify a change to the data (for example, the change detected by Step 810) as a change that is a trigger according to the rule or a change that is not a trigger according to the rule. In some examples, at least part of the rule may be read from memory (such as memory units 210, shared memory modules 410, and so forth). In another example, at least part of the rule may be received from external devices (for example, from the devices associated with the data and/or with the actions), for example using communication devices (such as communication modules 230, internal communication modules 440, external communication modules 450, and so forth). In yet another example, the rule may be selected of a plurality of alternative rules, for example based on the data changed and/or the change detected by Step 810 and/or the entities that caused the detected change. In some examples, at least part of the rule may be preprogrammed manually. In another example, at least part of the rule may be the result of training a machine learning algorithm and/or a deep learning algorithm using training examples. The training examples may include examples of changes together with a corresponding desired classification as a trigger or not as a trigger. In yet another example, the rule may be based on, at least in part, on the output of one or more artificial neural networks. In some examples, Step 820 may be repeated to obtain a plurality of rules.

In some embodiments, determining if the change is a trigger according to the rule (Step 830) may comprise determining if the change detected by Step 810 is a trigger according to the rule obtained by Step 820. For example, the rule may be configured to classify a change as a change that is a trigger according to the rule or a change that is not a trigger according to the rule, and the determination may be based on the classification of the change by the rule. In some examples, Step 830 may be repeated for a one or more changes and/or one or more rules. For example, Step 830 may determine if a first change detected by Step 810 is a trigger according to a first rule obtained by Step 820, determine if the first change detected by Step 810 is a trigger according to a second rule obtained by Step 820, determine if the first change detected by Step 810 is a trigger according to a third rule obtained by Step 820, determine if a second change detected by Step 810 is a trigger according to the first rule obtained by Step 820, determine if a third change detected by Step 810 is a trigger according to the first rule obtained by Step 820, and so forth.

In some examples, properties of the detected change may comprise a number of data-points added to selected datasets (denoted d1), and/or number of data-points removed from selected datasets (denoted d2), and/or number of data-points modified in selected datasets (denoted d3), and/or number of elements (such as labels, tags, desired outputs, etc.) added to selected annotations (denoted d4), and/or number of elements (such as labels, tags, desired outputs, etc.) removed from selected annotations (denoted d5), and/or number of elements (such as labels, tags, desired outputs, etc.) modified in selected annotations (denoted d6), and so forth. Further, the rule may classify the change according to a value of a function $f(\ )$ of d1 and/or d2 and/or d3 and/or d4 and/or d5 and/or d6 and/or other inputs. For example, the output of the function $f(\ )$ for the change detected by Step 810 may be compared with a selected threshold, and the detected change may be classified as a change that is a trigger or not a trigger according to the comparison result. Some examples for such function $f(\ )$ may include, $f(\ )=d1$, $f(\ )=d2$, $f(\ )=d3$, $f(d1, d2, d3, d4, d5, d6)=d4$, $f(\ )=d5$, $f(\ )=d6$, $f(\ )=\max(d1, d2, d3)$, $f(\ )=\max(d1, d2)$, $f(\ )=\max(d1, d2)+d3$, $f(\ )=\max(d4, d5, d6)$, $f(\ )=\max(d4, d5)$, $f(\ )=\max(d4, d5)+d6$, $f(\ )=\max(d1, d2, d3, d4, d5, d6)$, $f(\ )=\max(d1, d2, d4, d5)$, any combination of the above (for example, a linear combination of the above, a non-linear combination of the above, a maximum value of at least some of the above, etc.), and so forth. For example, for the function $f(\ )=d1$ the selected threshold may comprise a minimal number of data-points added to the selected datasets, for the function $f(\ )=d2$ the selected threshold may comprise a minimal number of data-points removed from the selected datasets, for the function $f(\ )=d3$ the selected threshold may comprise a minimal number of data-points modified in the selected datasets, for the function $f(\ )=d4$ the selected threshold may comprise a minimal number of elements (such as labels, tags, desired outputs, etc.) added to the selected annotations, for the function $f(\ )=d5$ the selected threshold may comprise a minimal number of elements (such as labels, tags, desired outputs, etc.) removed from the selected annotations, for the function $f(\ )=d6$ the selected threshold may comprise a minimal number of elements (such as labels, tags, desired outputs, etc.) modified in the selected annotations, and so forth. In some examples, the data changed after the change and/or the change detected may be associated with a plurality of annotations, and the rule may specifies a family of distributions of annotations for which the change is classified as a trigger. For example, the changed data may be associated with a plurality of annotations included in the data, the detected change may be associated with annotations added and/or deleted and/or modified by the change, and so forth. In some examples, a measure of the distribution may be calculated and compared with a threshold to determine the classification of the distribution. Some examples of such measure may include entropy, Tsallis entropy, dispersion, statistical distance (such as f-divergence, Kullback-Leibler divergence, Hellinger distance, Total variation distance, Rényi's divergence, Jensen-Shannon divergence, Lévy-Prokhorov metric, Bhattacharyya distance, Kantorovich metric, Tsallis divergence, etc.) to a selected distribution, and so forth.

In some examples, when the change detected by Step 810 is determined by Step 830 to be a trigger according to the rule, the flow of process 800 may continue to perform the action (Step 840). In some examples, when the change detected by Step 810 is determined by Step 830 not to be a trigger according to the rule, the flow of process 800 may continue to forgo performing the action (Step 850). For example, Step 830 may determine that a first change detected by Step 810 is a trigger according to a first rule obtained by Step 820, a second change detected by Step 810 is not a trigger according to the first rule, the first and second changes are triggers according to a second rule obtained by Step 820, the first and second changes are not triggers according to a third rule obtained by Step 820, and so forth. As a result, process 800 may perform a first action associated with the first rule with data associated with the first change (using Step 840), may forgo performing the first action with data associated with the second change (using Step 850), may perform a second action associated with the second rule with data associated with the first change and with data associated with the second change (using Step

840), may forgo performing a third action associated with the third rule with data associated with the first change and with data associated with the second change (using Step 850), and so forth. In some examples, process 800 may determine that the time elapsed since a previous performance of an action (for example, an action associated with a rule) is below a selected threshold, and withhold and/or forgo performing the action (for example, even when the change detected by Step 810 is determined by Step 830 to be a trigger according to the rule), for example using Step 850.

In some embodiments, performing the action (Step 840) may comprise performing the action associated with the rule obtained by Step 820, for example using data associated with the change detected by Step 810. In some examples, the action may comprise providing a notification, for example to a user, to a system manager, to another process, to an external device, to an entity associated with the data changed (for example, owner of the data, creator of the data, contributor to the data, user of the data, etc.), and so forth. For example, the notification may be provided visually (for example, using a graphical user interface, using a web site, using a display system, using an augmented reality system, using a virtual reality system, in a printed form, etc.), audibly (for example, using audio speakers, using headset, etc.), and so forth. In another example, the notification may be transmitted to an external device (for example, using communication devices, over network 130, etc.), provided to another process (for example, through a memory module), and so forth. In some examples, the notification may comprise information related to the changed data, such as description of the changed data, description of the change to the data, an amount associated with the change (for example, number of elements modified and/or created and/or deleted), a time associated with the change (for example, time of the change, time elapsed since last change, etc.), and so forth. In some examples, the notification may comprise a suggestion to train a machine learning algorithm, for example with data associated with the change (such as datasets and/or annotations added and/or modified). In some examples, the notification may comprise a suggestion to merge two or more annotations. For example, annotations that were added and/or modified may be compared with previous annotations (for example, previous annotations associated with the same dataset as the added and/or modified annotations), and a suggestion to merge the added and/or modified annotations with the previous annotations may be provided when the comparison result indicates that the change is above a selected threshold, is below a selected threshold, and so forth. In some examples, annotations that were added and/or modified may be compared with previous annotations (for example, previous annotations associated with the same dataset as the added and/or modified annotations), and the added and/or modified annotations may be merged with the previous annotations when the comparison result indicates that the change is above a selected threshold, is below a selected threshold, and so forth.

In some examples, the action may comprise executing selected automated processes, such as one or more of processes 700, 900, 1000, 1100, 1200, 1300, 1400, 1500, 1600, 1700 and 1800. For example, the detected change may comprise a change to an inference model in algorithms 640 and/or an addition of a new inference model to algorithms 640, and process 1000 may be used to compare the changed inference model and/or the new inference model with previous ones. For example, the detected change may comprise a change to an artificial neural network in algorithms 640 and/or an addition of a new artificial neural network to algorithms 640, and process 1100 may be used to compare the changed and/or new artificial neural network with previous ones. For example, the detected change may comprise an assignment of new annotations to data-points, and process 1400 may be executed to assign annotations to other data-points using the new annotations. In another example, the detected change may comprise a creation of new annotations to a dataset, and process 1500 may be executed to merge the new annotations with previous ones. In yet another example, process 1800 may be executed and a progress update detailing the change may be provided to Step 1810, for example to update a project schedule record.

In some examples, the action may comprise creating an inference model and/or updating an inference model by applying at least part of the changed data to a machine learning algorithm, for example using process 1200, using Step 1330 with the changed data as the additional training examples, and so forth. In some examples, the action may comprise updating datasets 610 and/or annotations 620 and/or views 630, for example using the Synthetic Minority Over-sampling Technique (SMOTE) to create new data-points in a dataset, using process 1400 to create new additional labels in an annotation, and so forth. In some examples, the action may comprise updating a quota record. For example, the remaining quota and/or the remaining budget of the quota record may be updated according to a quota requirement and/or a price associated with the change. For example, the change may be associated with an entity, a quota record associated with the entity may be selected (for example using Step 1720), and the selected quota record may be updated. In some examples, the action may comprise updating logs 660 with information related to the detected change.

In some embodiments, forgoing performing the action (Step 850) may comprise forgoing and/or withholding performing the action associated with the rule obtained by Step 820, forgoing and/or withholding performing the action associated with the rule obtained by Step 820 with data associated with the change detected by Step 810, and so forth.

Figure 9:
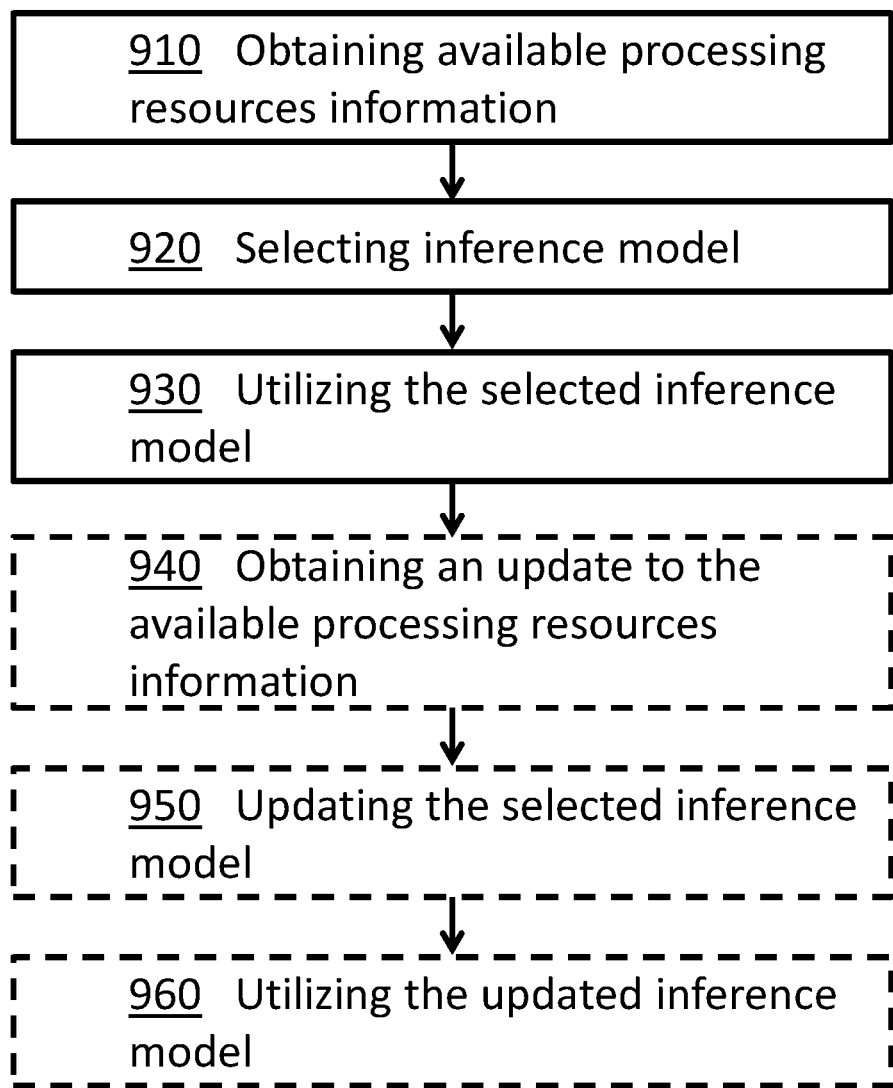
FIG. 9 illustrates an example of a process for employing inference models based on available processing resources.

FIG. 9 illustrates an example of a process 900 for employing inference models based on available processing resources. In this example, process 900 may comprise: obtaining available processing resources information (Step 910); selecting inference model (Step 920); utilizing the selected inference model (Step 930); obtaining an update to the available processing resources information (Step 940); updating the selected inference model (Step 950); and utilizing the updated inference model (Step 960). In some implementations, process 900 may comprise one or more additional steps, while some of the steps listed above may be modified or excluded. For example, in some cases Step 910 and/or Step 940 and/or Step 950 and/or Step 960 may be excluded from process 900. In some implementations, one or more steps illustrated in FIG. 9 may be executed in a different order and/or one or more groups of steps may be executed simultaneously and vice versa.

In some embodiments, obtaining available processing resources information (Step 910) may comprise obtaining information related to available processing resources associated with at least one device configured to utilize inference models. For example, at least part of the available processing resources information may be read from memory (such as memory units 210, shared memory modules 410, and so forth). In another example, at least part of the available processing resources information may be received from external devices (for example, from the devices configured to utilize inference models), for example using communication devices (such as communication modules 230, internal communication modules 440, external communication modules 450, and so forth). In yet another example, at least part of the available processing resources information may be generated, for example by using a processing resources measuring software program.

In some examples, the available processing resources information may comprise information related to available memory. For example, the information may comprise the size of available physical memory, the size of available physical memory of selected memory types (such as volatile memory, non-volatile Memory, Random-Access Memory, Dynamic Random-Access Memory, Static Random-Access Memory, flash memory, Solid-State Drives, magnetic storage memory, Hard Disk Drives, main memory, cache memory, external memory, etc.), the speed and/or latency of the available memory, the type of the available memory, the size and/or type and/or properties of memory that the operating system of the device and/or other resource management component of the device is willing to commit and/or allocate for the utilization of the inference models, and so forth. For example, memory size may be measured in bits, bytes, kilo-bytes, mega-bytes, giga-bytes, tera-bytes, and so forth. For example, memory speed may be measured as the amount of time it takes a memory module to deliver and/or store requested data (for example, in microseconds, nanoseconds, etc.), as memory bus speed (for example, in mega-hertz, giga-hertz, etc.) and memory bus width (for example, in bits, bytes, etc.), as memory bandwidth (for example, in mega-bytes per second, giga-bytes per second, tera-bytes per second, etc.), and so forth. For example, memory latency may be measured in bus clock cycles, microseconds, nanoseconds, and so forth. In some examples, the available processing resources information may comprise multiple records associated with multiple memory units.

In some examples, the available processing resources information may comprise information related to available processing units. For example, the information may comprise the types of available processing units, such as processor category (for example, processor core, Central Processing Unit, Graphics Processing Unit, virtual processing unit, etc.), processor manufacture, processor brand, processor type, and so forth. In another example, the information may comprise the clock speed of available processing units (for example, measured in mega-hertz, giga-hertz, tera-hertz, and so forth). In yet another example, the information may comprise the number of instructions per a time unit (for example instruction per second, millions of instructions per second, etc.) that the available processing units may perform according to some benchmarks. In some cases, the measurement of the number of instructions per a time unit may be repeated, and information related to the distribution of the repeated measurements of may be included in the available processing resources information. In another example, the information may comprise the number of artificial neurons evaluations (for example, of a selected type of artificial neurons, of a selected mix of types of artificial neurons, and so forth) the available processing devices may perform in a time unit (such as a millisecond, a second, and so forth). For example, the number may be measured by evaluating selected artificial neurons with selected inputs using the available processing devices, and measuring the elapsed time. In some cases, the measurement may be repeated (with the same selection of artificial neurons and inputs, or with a different selection), and information related to the distribution of the repeated measurements of the number of evaluated artificial neurons in a time unit may be included in the available processing resources information. In yet another example, the information may comprise properties of the available processing units, such as the number of stages in the processor pipeline, number of cores, size of cache memory, bus speed (for example, in mega-hertz, giga-hertz, etc.), bus width (for example, in bits, bytes, etc.), dedicated hardware cores, and so forth. In some examples, the available processing resources information may comprise multiple records associated with multiple processing units.

In some examples, the available processing resources information may comprise information related to available computer network resources and/or available communication devices. For example, the information may comprise the types of the available computer networks and/or available communication devices (such as point-to-point, broadcast, non-broadcast, Non-Broadcast Multi-Access, point to multipoint, Local Area Network, Wide Area Network, Wireless Local Area Network, personal network, private network, public network, Internet, phone network, cellular network, satellite communication network, Virtual Private Network, and so forth). In another example, the information may comprise the latency of the available computer networks (such as the latency between two devices connected to the network, one way latency, round trip latency, and so forth). The latency of the network may be measured in clock cycles, microseconds, nanoseconds, and so forth. In yet another example, the information may comprise the throughput of the available computer networks and/or available communication devices (such as the upload throughput, download throughput, and so forth). The throughput may be measured as amount of data (for example in number of packets, bits, kilo-bits, mega-bits, giga-bits, tera-bits, bytes, kilo-bytes, mega-bytes, giga-bytes, tera-bytes, and so forth) per time unit (for example second, millisecond, and so forth), in units such as bits per second, kilo-bits per second, mega-bits per second, giga-bits per second, tera-bits per second, bytes per second, kilo-bytes per second, mega-bytes per second, giga-bytes per second, tera-bytes per second, and so forth.

In another example, the information may comprise information about the reliability of the available computer networks, for example as a measurement of average error rate, mean time between errors, packet loss rate, and so forth. In another example, the information may comprise information about communication protocols supported by the available computer networks, such as IP, IPv4, IPv6, User Datagram Protocol, Transmission Control Protocol, and so forth. In some examples, the available processing resources information may comprise multiple records associated with multiple computer networks and/or multiple communication devices. In some embodiments, the available processing resources information may comprise a list of available devices. In some cases, the available processing resources information may further comprise records of the available processing resources of at least some of the devices in the list of available devices (for example, as described above).

In some embodiments, selecting inference model (Step 920) may comprise selecting inference models based on the information related to the available processing resources obtained by Step 910. Some examples of such inference models may include predictive models, classifiers, regression models, artificial neural networks, segmentation models, and so forth. In some examples, an inference model may be selected out of a plurality of alternative inference models based on the available processing resources, for example using a lookup-table, using a selection rule, and so forth. For example, minimal processing resources requirements may be specified for different inference models, and inference models with minimal processing resources requirements that exceed the available processing resources may be rejected. In another example, process 900 may not have permission to use some inference models (for example, as determined using process 1600), and these inference models may be rejected. In yet another example, process 900 may not have sufficient quota to use some inference models (for example, as determined using process 1700), and these inference models may be rejected. Further, out of the inference models that are not rejected, the inference model with the most desired characteristics may be selected (for example, the inference model with best performances, the inference model that can handle the largest number of classes, the inference model with the highest score, and so forth).

In some examples, the performances of inference models when utilized using the available processing resources may be estimated, and the inference model with the best estimated performances may be selected according to some rules. For example, the estimated performances may include estimated running time for a selected input examples, inference models with estimated running time that exceeds some selected threshold may be rejected from the selection of the inference model, and an inference model with the best estimated performances according to some criteria may be selected out of the non-rejected inference models. In another example, the estimated performances may include estimated memory usage for selected input examples, inference models with estimated memory usage that exceeds some selected threshold may be rejected from the selection of the inference model, and an inference model with the best estimated performances according to some criteria may be selected out of the non-rejected inference models. Some examples of rules for the selection of the inference model with the best estimated performances may include the selection of the inference model with the best estimated precision, with the best estimated recall, with the best estimated accuracy, with the largest number of supported classes, with the highest score, and so forth.

In some examples, the performances of an inference model when utilized using the available processing resources may be estimated by using a function that returns estimated performances for different processing resources and the inference model (for example, based on properties of the inference model), by retrieving past performance records of the inference model with different processing resources (for example from a database), by interpolating and/or extrapolating the performances of the inference model when utilized with other available processing resources from past records of the performances of the inference model when utilized using other processing resources, by using a machine learning model trained using training examples to estimate the performances of the inference model when utilized using different processing resources (for example, based on properties of the inference model), by using process 1200, and so forth.

In some embodiments, selecting inference model (Step 920) may comprise generating inference models based on the information related to the available processing resources obtained by Step 910. In some examples, at least one rule may be used to generate a new inference model and/or to modify at least one aspect of an existing inference model according to the available processing resources information. For example, the inference model may comprise an ensemble model (where a plurality of internal inference models are used, and the final result produced by the inference model is based on a function of the plurality of results obtained from the internal inference models), and the at least one rule may select the number of inference models in the ensemble and/or the types of the internal inference models according to the available processing resources information. In some examples, the inference model may be generated by training a machine learning algorithm using a plurality of training examples (for example, by using training data from datasets 610 and/or annotations 620 and/or views 630), and the plurality of training examples may be selected based on the available processing resources information (for example, by algorithms 640). For example, a set of training examples to be used by a k-nearest-neighbors algorithm may be sampled out of a group of alternative learning examples, and the number of samples in the set may be selected according to the available memory size. In some examples, training examples may be sampled (for example, according to the available processing resources information, to available memory size, etc.), weights may be assigned to the sampled training examples according to properties of devices associated with the available processing resources information, for example using process 700, which may further use the weights together with the training examples to generate the inference model. In some examples, the inference model may be generated by training a machine learning algorithm using a plurality of training examples (for example by using training data from datasets 610 and/or annotations 620 and/or views 630), and hyper-parameters of the machine learning algorithm may be selected based on the available processing resources information. For example, the number of artificial neurons in an artificial neural network may be selected according to the available memory size, according to the number of available processing cores, according to the number of instructions per a time unit the available processing units may perform, according to the available bus speed, and so forth. In another example, a batch size may be selected based on the cache memory size. In some examples, the available processing resources information may comprise a distribution of measurements of the number of instructions per a time unit, and an inference model that can be evaluated within selected time duration in a selected portion of the cases according to the distribution may be selected.

In some embodiments, the available processing resources information may comprise a number of artificial neurons evaluations in a time unit, and an inference model that comprises an artificial neural network that can be evaluated in selected time duration may be selected. For example, if the available processing resources information indicates that the processing devices can evaluate m1 artificial neurons per second, ant the selected time duration is t1 seconds, an artificial neural network that comprises m1*t1−c artificial neurons or less for a selected non-negative constant c may be selected. For example, m1 may be ten million, t1 may be ten milliseconds, c may be zero, and an artificial neural network that comprises one hundred thousand artificial neurons may be selected. In some examples, the available processing resources information may comprise a distribution of number of artificial neurons evaluations in a time unit (for example, a distribution of measured number of artificial neurons evaluations in a time unit), and an artificial neural network that can be evaluated within selected time duration in a selected portion of the cases according to the distribution may be selected.

In some embodiments, utilizing the selected inference model (Step 930) may comprise causing at least one device (such as the device associated with the available processing resources information obtained by Step 910) to utilize at least one inference model (such as the inference models selected by Step 920, the updated inference models of Step 950, and so forth). In some examples, a message may be transmitted to external devices, for example using communication devices (such as communication modules 230, internal communication modules 440, external communication modules 450, etc.), and the message may be configured to cause the external devices to utilize the inference models. For example, the message may comprise at least part of the inference models. In another example, the message may comprise an indication of the inference models to be utilized. In some examples, a similar message may be provided to another process (for example through a memory module, such as memory units 210, shared memory modules 410, etc.), and the message may be configured to cause the other process to utilize the inference models as described above. In some examples, utilizing the selected inference model may comprise updating a project schedule record, for example by adding a task to utilize the selected inference model.

In some examples, utilizing the at least one inference model may comprise applying input data to the at least one inference model to obtain at least one inferred value. For example, the input data may comprise information captured using at least one sensor, such as audio captured using audio sensors 250, images captured using image sensors 260, motion information captured using motion sensors 270, positioning information captured using positioning sensors 275, atmospheric pressure information captured using barometers, pressure information captured using pressure sensors, proximity information captured using proximity sensors, electrical impedance information captured using electrical impedance sensors, electrical voltage information captured using electrical voltage sensors, electrical current information captured using electrical current sensors, user input obtained using user input devices, and so forth.

In some examples, utilizing the at least one inference model may comprise generating the selected at least one inference model. For example, information specifying parts of a desired inference model may be received by the external devices (for example, information specifying parts selected by Step 920 may be provided and/or transmitted by Step 930), and the desired inference model may be assembled from the specified parts (for example, where the parts are obtained from algorithms 640).

In some examples, generating the selected at least one inference model may comprise training a machine learning algorithm using training examples to obtain at least part of the selected at least one inference model. For example, a machine learning algorithm may be trained (for example by algorithms 640) using training examples (for example by using training data from datasets 610 and/or annotations 620 and/or views 630), for example using training examples selected by Step 930 according to selection of Step 920. In some examples, the training examples may be selected from a plurality of alternative training examples (for example from datasets 610 and/or annotations 620 and/or views 630) according to selections of Step 920. For example, the training examples may be selected according to their size and according to rules chosen by Step 920 in response to the available processing resources information obtained by Step 910. Some examples of such rules may include the selection of training examples with size that is below a selected threshold, above a selected threshold, and so forth.

In some embodiments, obtaining an update to the available processing resources information (Step 940) may comprise obtaining an update to the information received by Step 910. For example, Step 940 may use Step 910 to obtain new available processing resources information which may be an update of the available processing resources information of Step 910. In another example, modified parts of the available processing resources information may be obtained. For example, at least part of the modified parts may be read from memory (such as memory units 210, shared memory modules 410, and so forth). In another example, at least part of the modified parts may be received from external devices (for example, from the device configured to utilize inference models), for example using communication devices (such as communication modules 230, internal communication modules 440, external communication modules 450, and so forth). In some examples, at least part of the modified parts may be generated, for example by using a processing resources measuring software program. For example, the processing resources measuring software program may monitor a device and report to Step 940 when the available processing resources changes and/or when the change to the available processing resources is greater than a selected threshold. In another example, the update to the available processing resources information may comprise an update to a list of available devices (such as addition of devices, removal of devices, and so forth). In yet another example, the number of artificial neurons evaluations in a time unit and/or the distribution of the number of artificial neurons evaluations in a time unit may be updated, for example based on actual usage data of the inference model selected by Step 920.

In some examples, Step 940 may analyze the update to the available processing resources information (for example, by analyzing the obtained update, by comparing the available processing resources information of Step 910 to the updated available processing resources information, etc.) to determine if the update to the information related to available processing resources is below a selected threshold. For example, the available processing resources may comprise a numerical value and/or an amount (such as available memory size, speed, bandwidth, latency, throughput, processor clock speed, number of available processing cores, number of instructions per second, number of artificial neurons evaluations per second, etc.), and Step 940 may determine if the change to the numerical value and/or the amount is below a selected threshold. In some examples, when Step 940 determines that the update is below the selected threshold, process 900 may withhold and/or forgo Step 950 and/or Step 960.

In some embodiments, updating the selected inference model (Step 950) may comprise updating at least one selection of inference models (such as the selection of inference model of Step 920) based on the update to the information related to available processing resources (for example as received by Step 940) to obtain at least one updated selection of inference model. In some examples, Step 950 may use Step 920 with the updated information related to available processing resources to select and/or generate new inference models which are updates to the original selection of inference models of Step 920. In some examples, an update to at least part of the inference model may be selected of a plurality of alternative updates based on the update to the information related to available processing resources (for example, in a similar fashion to Step 920). In some examples, an update to at least part of the inference model may be generated (for example, using rules and/or training examples in a similar fashion to Step 920). For example, the inference model selected by Step 920 may comprise a result of training a machine learning algorithm on a plurality of selected training examples, and Step 940 may update the selected plurality according to the update to the information related to available processing resources (for example, the amount of training examples may be increased and/or decreased in response to an update to the available memory size). Further, the training of the machine learning algorithm may be updated according to the updated plurality of selected training examples. In another example, at least one hyper-parameter of the machine learning algorithm used to generate the inference model may be updated (for example, a batch size may be updated in response to an update of available cache memory size, a sampling rate may be changed in response to change of available memory size, and so forth). In some examples, Step 950 may compare the updated inference model with the inference model of Step 920 to determine if the update to the inference model is below a selected threshold (for example, using process 1000, using process 1100, etc.). In some examples, when Step 950 determines that the update is below the selected threshold, process 900 may withhold and/or forgo Step 960.

In some embodiments, utilizing the updated inference model (Step 960) may comprise causing the at least one device (such as the devices associated with the available processing resources information received by Step 910 and/or the devices associated with the update obtained by Step 940) to utilize at least one updated inference model (such as the updated inference of Step 950). For example, Step 960 may use Step 930 to cause the devices to utilize the at least one updated inference model.

In some embodiments, information related to available processing resources associated with at least one device may be generated, for example by the at least one device, for example by using a processing resources measuring software program. The generated information may be provided to process 900, for example by transmitting the generated information to an external device that performs process 900, for example using communication devices (such as communication modules 230, internal communication modules 440, external communication modules 450, etc.), by writing the generated information to memory (such as memory units 210, shared memory modules 410, etc.), and so forth. In response, the at least one device may receive from process 900 an indication of an inference model (as described above), for example an indication of an inference model selected based on the generated information by Step 920 as described above. For example, the indication may be received as a message (for example using communication devices, such as communication modules 230, internal communication modules 440, external communication modules 450, etc.), by reading the indication of the inference model from memory (such as memory units 210, shared memory modules 410, etc.), and so forth. Further, the at least one device may utilize the indicated inference model, as described above.

Figure 10:
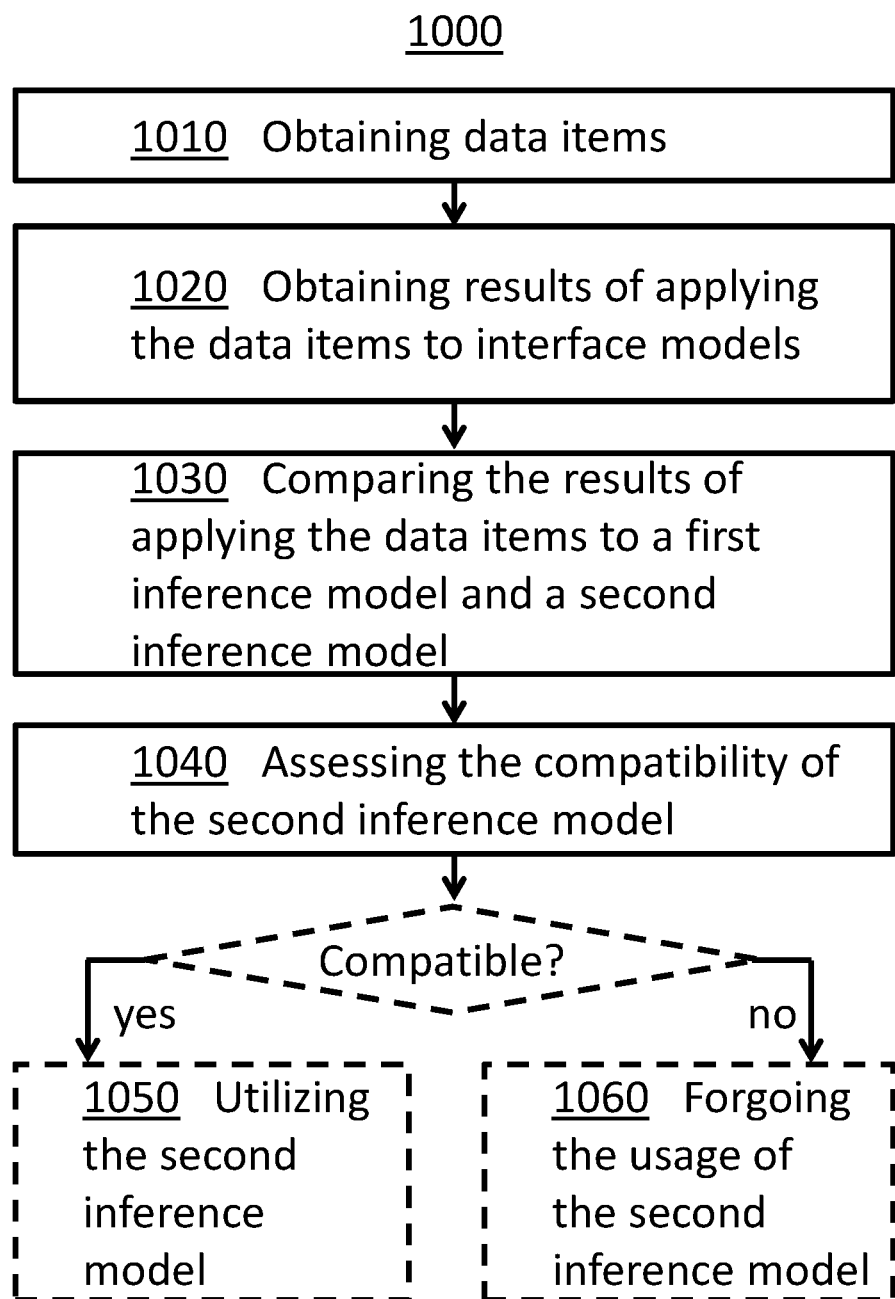
FIG. 10 illustrates an example of a process for personalizing quality assurance of inference models.

FIG. 10 illustrates an example of a process 1000 for personalizing quality assurance of inference models. In this example, process 1000 may comprise: obtaining data items (Step 1010); obtaining results of applying the data items to inference models (Step 1020); comparing the results of applying the data items to a first inference model with the results of applying the data items to a second inference model (Step 1030); and assessing the compatibility of the second inference model (Step 1040). Optionally, based on the assessment result, process 1000 may continue. In some examples, when the second inference model is found compatible, process 1000 may utilize the second inference model (Step 1050). In some examples, when the second inference model is found incompatible, process 1000 may forgo the usage of the second inference model (Step 1060). In some implementations, process 1000 may comprise one or more additional steps, while some of the steps listed above may be modified or excluded. For example, in some cases Step 1050 and/or Step 1060 may be excluded from process 1000. In some implementations, one or more steps illustrated in FIG. 10 may be executed in a different order and/or one or more groups of steps may be executed simultaneously and vice versa.

In some embodiments, obtaining data items (Step 1010) may comprise obtaining a plurality of data items associated with a group of one or more devices. In some examples, Step 1010 may be repeated for different groups of devices. For example, Step 1010 may obtain a first plurality of data items associated with a first group of devices, a second plurality of data items associated with a second group of devices, a third plurality of data items associated with a third group of devices, and so forth. In some examples, at least part of the obtained data items associated with the group of devices may be read from memory (such as memory units 210, shared memory modules 410, and so forth). In another example, at least part of the obtained data items associated with the group of devices may be obtained from datasets 610 and/or annotations 620 and/or views 630, for example from datasets and/or annotations and/or views associated with the group of devices. In yet another example, at least part of the obtained data items associated with the group of devices may be received from external devices (for example from the group of devices), for example using communication devices (such as communication modules 230, internal communication modules 440, external communication modules 450, and so forth). In another example, at least part of the obtained data items associated with the group of devices may comprise data items based on and/or comprising information captured by the group of devices (for example using at least one sensor, such as audio sensors 250, image sensors 260, motion sensors 270, positioning sensors 275, barometers, pressure sensors, proximity sensors, electrical impedance sensors, electrical voltage sensors, electrical current sensors, and so forth). In some examples, at least part of the obtained data items associated with the group of devices may be generated. For example, synthetic data items may be generated according to information about the group of devices, about the environment the group of devices function within, about data captured and/or processed by the group of devices, according to information obtained by Step 710, and so forth. In another example, some existing data items may be combined together to create more data items, for example using the Synthetic Minority Over-sampling Technique (SMOTE). In some examples, at least part of the obtained data items associated with the group of devices may be selected out of a plurality of alternative data items (for example, from datasets 610 and/or annotations 620 and/or views 630).

In some embodiments, obtaining results of applying the data items to inference models (Step 1020) may comprise obtaining results of applying the data items obtained by Step 1010 to one or more inference models, for example, to a first inference model and a second inference model, to inference models obtained from another process (such as process 700, process 900, process 1200, process 1300, process 1400, process 1500, etc.), and so forth. For example, the inference model may comprise a classification model, and the results may comprise an assignment of classes to the data items. In another example, the inference model may comprise a segmentation model, and the results may comprise an assignment of data items to segments. In yet another example, the inference model may comprise a regression model, and the results may comprise an assignment of values to data items. In some examples, the results obtained by Step 1020 may comprise a distribution of the results of applying the data items to an inference model and/or the distribution of errors of the results of applying the data items to an inference model with respect to ground truth values. Multiple distributions may be obtained for multiple inference models. In some cases, the results obtained by Step 1020 may comprise a distribution (of the results of applying the data items to an inference model and/or of errors of the results of applying the data items to an inference model with respect to ground truth values) with respect to the input data items and/or with respect to an input space.

In some examples, Step 1010 may obtain a first plurality of data items associated with a first group of devices, a second plurality of data items associated with a second group of devices, a third plurality of data items associated with a third group of devices, and so forth. Step 1020 may obtain results of applying the first plurality of data items to the first inference model, results of applying the second plurality of data items to the first inference model, results of applying the third plurality of data items to the first inference model, results of applying the first plurality of data items to the second inference model, results of applying the second plurality of data items to the second inference model, results of applying the third plurality of data items to the second inference model, and so forth.

In some examples, at least part of the results of applying a group of data items to an inference model may be read from memory (such as memory units 210, shared memory modules 410, and so forth). In another example, at least part of the results of applying a group of data items to an inference model may be received from external devices (for example from a group of devices associated with the group of data items), for example using communication devices (such as communication modules 230, internal communication modules 440, external communication modules 450, and so forth). In some examples, at least part of the results of applying a group of data items to an inference model may be obtained by applying the group of data items to the inference model.

In some embodiments, comparing the results of applying the data items to a first inference model with the results of applying the data items to a second inference model (Step 1030) may comprise comparing the results of applying a group of data items to different inference models, for example comparing results obtained by Step 1020. For example, Step 1030 may compare the results of applying a group of data items (for example, a group of data items associated with a group of devices) to a first inference model with the results of applying the same group of data items to a second inference model. Further, Step 1030 may be repeated for different groups of data items associated with different groups of devices, for example comparing the results of applying a first group of data items associated with a first group of devices to a first inference model with the results of applying the first group of data items to a second inference model, comparing the results of applying a second group of data items associated with a second group of devices to a first inference model with the results of applying the second group of data items to a second inference model, and so forth. In some examples, comparing the results may comprise comparing loss function values associated with the results, comparing values of a function that summarizes the results, comparing the distributions of the results, comparing the distributions of errors, comparing the distributions of the results where the distributions are with respect to an input space, comparing the distributions of errors where the distributions are with respect to an input space, and so forth. For example, comparing distributions may comprise comparing histograms, comparing density estimators, comparing kernel density estimators, comparing properties of the distributions, comparing parameters of distribution models fitted to the data, and so forth. In another example, comparing the distributions may comprise calculating a statistical distance (such as f-divergence, Kullback-Leibler divergence, Hellinger distance, Total variation distance, Rényi's divergence, Jensen-Shannon divergence, Lévy-Prokhorov metric, Bhattacharyya distance, Kantorovich metric, Tsallis divergence, etc.) between the distributions.

In some examples, the inference models may comprise classification models, and comparing the results may comprise comparing the assignments of data items to classes by the different classification models. In some examples, the inference models may comprise classification models, and comparing the results may comprise comparing ground truth assignment of data items to classes with the assignments of data items to classes produced by the different classification models. In some examples, the inference models may comprise classification models, and comparing the results may comprise comparing measurements of the quality of the classification, such as precision, recall, accuracy, specificity, F1 score, confusion matrices, number and/or ratio of true positives, number and/or ratio of false positives, number and/or ratio of false negative, number and/or ratio of true negatives, and so forth.

In some examples, the inference models may comprise regression models, and comparing the results may comprise comparing the values assigned to data items by the different regression models. In some examples, the inference models may comprise regression models, and comparing the results may comprise comparing ground truth values to values assigned to data items by the different regression models. In some examples, the inference models may comprise regression models, and comparing the results may comprise comparing measurements of the quality of the regression, such as R-squared, adjusted R-squared, F-test, Root Mean Square Error (RMSE), mean of squares errors, mean of absolute errors, and so forth. In some examples, the inference models may comprise regression models, and comparing the results may comprise comparing the distribution of errors of the results (for example by comparing histograms of the errors), comparing values of any function that summarizes the errors, and so forth.

In some examples, Step 1030 may compare the results of applying a group of data items to different inference models, where at least part of the different inference models are the results of training machine learning algorithms using a plurality of training examples. For example, Step 1030 may compare the results of applying a group of data items to a first inference model and a second inference model, where the first inference model is a result of training a machine learning algorithm using a plurality of training examples, and the second inference model is a result of training a machine learning algorithm (which may be the same or different from the first machine learning algorithm) using an update to the plurality of training examples.

In some examples, the first inference model and the second inference model of Step 1030 may be obtained from process 700 (for example, using the inference model generated by Step 730 as the first inference model, and the inference model generated by Step 760 as the second inference model), from process 1300 (for example, using the inference model generated by Step 1310 as the first inference model and the inference model generated by Step 1330 as the second inference model), from process 1400 (for example, obtaining the first inference model from Step 1420 and the second inference model from Step 1460), from process 1500 as described below, and so forth.

In some embodiments, assessing the compatibility of the second inference model (Step 1040) may comprise assessing the compatibility of the second inference model to the group of data items and/or to a group of devices associated with the group of data items based on a comparison performed by Step 1030, for example the comparison of the results of applying the group of data items (which in some cases may be associated with the group of devices) to a first inference model with the results of applying the group of data items to the second inference model. In some examples, Step 1040 may be repeated for different groups of data items, which may be associated with different groups of devices. For example, Step 1040 may assess an inference model using a first comparison based on a first group of data items (which may be associated with a first group of devices), using a second comparison based on a second group of data items (which may be associated with a second group of devices), using a third comparison based on a third group of data items (which may be associated with a third group of devices), and so forth. In some examples, Step 1040 may assess the compatibility of the second inference model with respect to the first inference model used by Step 1030. For example, the second inference model may be assessed as better, equivalent, or worse in comparison to the first inference model. In some examples, Step 1040 may assign a score to the second inference model, such as a numerical score (for example, a score from zero to ten). For example, taking a score of the first inference model as a baseline, and based on the comparison of the results of the first inference model and the second inference model, a score for the second inference model may be calculated, for example as a function of the baseline score and the comparison result. In some examples, Step 1040 may assess the compatibility of the second inference model, to the group of data items and/or to the group of devices associated with the group of data items, as compatible or as incompatible. For example, a function may be used to convert the comparison results to compatible or incompatible assessment. The function may use a threshold to decide which comparison results are considered compatible and which are considered incompatible.

In some examples, when the second inference model is found compatible by Step 1040, the flow of process 1000 may continue to utilize the second inference model (Step 1050). In some examples, when the second inference model is found incompatible by Step 1040, the flow of process 1000 may continue to forgo the usage of the second inference model (Step 1060). For example, Step 1040 may assess the second inference model as compatible with a first group of data items and/or a first group of devices, and as incompatible with a second group of data items and/or a second group of devices. As a result, process 1000 may utilize the second inference model for tasks associated with the first group of data items and/or with the first group of devices (for example using Step 1050), and may forgo the usage of the second inference model for tasks associated with the second group of data items and/or the second group of devices (for example using Step 1060).

In some embodiments, utilizing the second inference model (Step 1050) may comprise utilizing the second inference model assessed by Step 1040 in tasks associated with the group of data items and/or with a group of devices associated with the group of data items. In some examples, Step 1050 may be repeated for different inference models and/or for different groups of data items and/or different groups of devices. For example, Step 1050 may utilize one inference model in a first group of tasks associated with a first group of data items and/or a first group of devices, utilize the one inference model in a second group of tasks associated with a second group of data items and/or a second group of devices, utilize another inference model in a third group of tasks associated with the first group of data items and/or the first group of devices, and so forth. In some examples, a message may be transmitted to the group of devices, for example using communication devices (such as communication modules 230, internal communication modules 440, external communication modules 450, etc.), and the message may be configured to cause the group of devices to utilize the second inference model. For example, the message may comprise at least part of the second inference model. In another example, the message may comprise an indication of the second inference model. In yet another example, the message may be further configured to cause the group of devices to delete at least part of another inference model (such as the first inference model of the comparison of Step 1030). In some examples, a message may be provided to another process (for example through a memory module, such as memory units 210, shared memory modules 410, etc.), and the message may be configured to cause the other process to utilize the second inference model and/or to delete other inference models (in a similar fashion to what described above).

In some examples, utilizing the second inference model may comprise applying input data associated with the group of data items to the second inference model to obtain at least one inferred value. For example, the input data may comprise information captured using at least one sensor, such as audio captured using audio sensors 250, images captured using image sensors 260, motion information captured using motion sensors 270, positioning information captured using positioning sensors 275, atmospheric pressure information captured using barometers, pressure information captured using pressure sensors, proximity information captured using proximity sensors, electrical impedance information captured using electrical impedance sensors, electrical voltage information captured using electrical voltage sensors, electrical current information captured using electrical current sensors, user input obtained using user input devices, and so forth.

In some embodiments, forgoing the usage of the second inference model (Step 1060) may comprise avoiding at least part of the usages of the second inference model in tasks associated with the group of data items and/or to a group of devices associated with the group of data items. In some examples, Step 1060 may be repeated for different inference models and/or for different groups of data items and/or different groups of devices. For example, Step 1060 may avoid at least part of the usages of one inference model in tasks associated with a first group of data items and/or a first group of devices, may avoid at least part of the usages of the one inference model in other tasks associated with a second group of data items and/or a second group of devices, may avoid at least part of the usages of another inference model in other tasks associated with the first group of data items and/or the first group of devices, and so forth. In some examples, Step 1060 may further comprise deleting at least part of an inference model (such as the second inference model). In some examples, a message may be transmitted to the group of devices, for example using communication devices (such as communication modules 230, internal communication modules 440, external communication modules 450, etc.), and the message may be configured to cause the group of devices to avoid at least part of the usages of the second inference model and/or to delete at least part of the second inference model. In some examples, a message may be provided to another process (for example through a memory module, such as memory units 210, shared memory modules 410, etc.), and the message may be configured to cause the other process to avoid at least part of the usages of the second inference model and/or to delete at least part of the second inference model.

Figure 11:
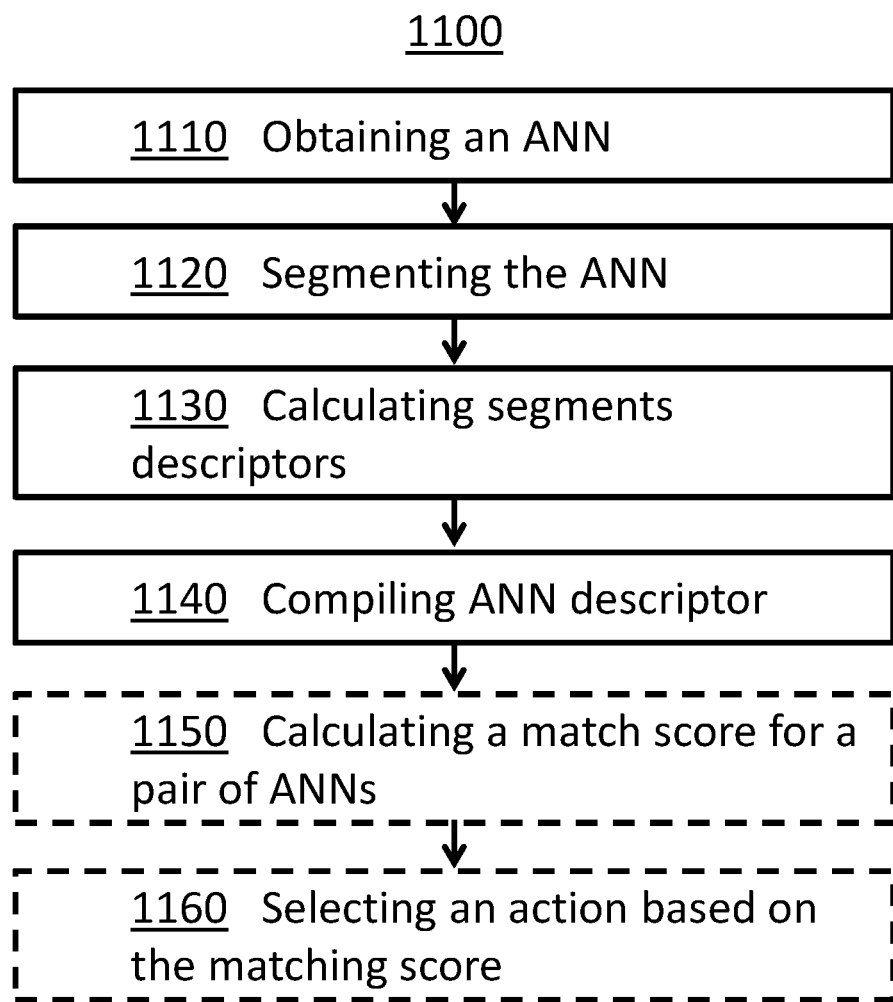
FIG. 11 illustrates an example of a process for generating and using descriptors of artificial neural networks.

FIG. 11 illustrates an example of a process 1100 for generating and using descriptors of artificial neural networks. In this example, process 1100 may comprise: obtaining an artificial neural network (Step 1110); segmenting the artificial neural network (Step 1120); calculating descriptors of the segments (Step 1130); compiling a descriptor of the artificial neural network (Step 1140); calculating a match score for a pair of artificial neural networks (Step 1150); and selecting an action based on the matching score (Step 1160). In some implementations, process 1100 may comprise one or more additional steps, while some of the steps listed above may be modified or excluded. For example, in some cases Step 1150 and/or Step 1160 may be excluded from process 1100. In another example, in some cases Step 1110 and/or Step 1120 and/or Step 1130 and/or Step 1140 may be excluded from process 1100. In some implementations, one or more steps illustrated in FIG. 11 may be executed in a different order and/or one or more groups of steps may be executed simultaneously and vice versa.

In some embodiments, obtaining an artificial neural network (Step 1110) may comprise obtaining information defining at least part of the artificial neural network, such as the arrangement of the artificial neurons in a network and/or information about the artificial neurons. In some examples, the artificial neurons may be arranged as a directional graph and/or hypergraph, where each node of the graph and/or hypergraph may correspond to an artificial neuron, and the directional edges and/or hyperedges may define the flow of information among the artificial neurons. In some examples, an artificial neuron may be described as a function that converts inputs into outputs. For example, such function may include parameters, where in some cases the parameters may define the function, and therefore an artificial neuron may be described as a function together with the function parameters. In another example, the function may include a non-linear part that operates on a linear combination of the inputs, where the weights of the linear combination are part of the function parameters, and where the non-linear part may also depend on one or more parameters. Some examples of such non-linear parts may include step functions (where the thresholds and values may depend on parameters), sigmoid, tanh, ReLu, leaky ReLu, PReLU, randomized Leaky ReLu, softmax, maxout, any combination of the above, and so forth.

Some examples of possible types of artificial neural networks may include feedforward neural network, recursive neural network, multilayer perceptron, radial basis function neural network, self-organizing neural network (such as Kohonen self-organizing neural network), recurrent neural network, long-short term memory neural network, convolutional neural network, modular neural network, sequence-to-sequence neural network, deep neural network, shallow neural network, and so forth. In some examples, an artificial neural network may be programmed manually. In other examples, an artificial neural network may comprise an output of a machine learning algorithm (and in some cases, deep learning algorithm) trained using training examples. In such case, some of the parameters of the artificial neural network may be set manually and are called hyper-parameters, while the other parameters are set by the machine learning algorithm according to the training examples. In some examples, parameters and/or hyper-parameters of the artificial neural network may be obtained by Step 1110. In some examples, the machine learning algorithm used to train the artificial neural network may also have some hyper-parameters, such as optimizer, loss function, weight decay function, learning rate, dropout, stopping condition, number of epochs, batch size, momentum, random seed, and so forth. In some cases, at least part of the hyper-parameters of the machine learning algorithm may also be obtained by Step 1110.

In some examples, at least part of the information defining the artificial neural network may be read from memory (such as memory units 210, shared memory modules 410, and so forth). In another example, at least part of the information defining the artificial neural network may be received from external devices, for example using communication devices (such as communication modules 230, internal communication modules 440, external communication modules 450, and so forth). In some examples, at least part of the information defining the artificial neural network may be obtained by training the artificial neural network using training examples, for example using a backpropagation algorithm, using stochastic gradient descent algorithm, using any deep learning training algorithm, and so forth. In some examples, at least part of the information defining the artificial neural network may be obtained from algorithms 640 and/or tasks 650. In some examples, the obtained artificial neural network may be an output of another process (such as process 700, process 900, process 1200, process 1300, process 1400, process 1500, and so forth).

In some embodiments, segmenting the artificial neural network (Step 1120) may comprise analyzing an artificial neural network (such as the artificial neural network obtained by Step 1110) to obtain a plurality of segments of the artificial neural network. In some examples, a segment may be defined by the artificial neurons included in the segment. In some examples, a segment may comprise at least one artificial neuron, at least two artificial neurons, at least ten artificial neurons, at least one layer of the artificial neural network, at least one per mill of the network's artificial neurons, at least one percent of the network's artificial neurons, at least ten percent of the network's artificial neurons, and so forth. In some examples, a segment may comprise at most half of the network's artificial neurons, at most ten percent of the network's artificial neurons, at most one percent of the network's artificial neurons, and so forth. In some examples, the segments may be mutually exclusive, while in other examples the segments may have one or more artificial neurons in common.

In some examples, the artificial neural network may be segmented using graph segmentation algorithm and/or hypergraph segmentation algorithm, such as graph and/or hypergraph cut algorithms. In some examples, an affinity matrix and/or affinity tensor may be constructed, for example based on similarities among artificial neurons based on distance between the artificial neurons within the network. Such similarities may be based on the similarities among the functions of the artificial neurons, the parameters and/or hyper-parameters of the artificial neurons, the layers of the artificial neurons, the graph and/or hypergraph distance between the artificial neurons, and so forth. Using the affinity matrix and/or affinity tensor, affinity based clustering algorithms (such as spectral clustering and its many extensions) may be used to extract segments of the artificial neural network. Additionally or alternatively, algorithms like kernel PCA may use the affinity matrix to embed the artificial neurons in a mathematical space, following by clustering algorithms that may use the embedding to cluster the artificial neurons.

In some embodiments, calculating descriptors of the segments (Step 1130) may comprise calculating descriptors of segments of an artificial neural network (such as the segments obtained by Step 1120 of the artificial neural network obtained by Step 1110), for example by using values associated with the one or more artificial neurons of a segment to calculate the descriptor of the segment. In some examples, the values associated with the one or more artificial neurons may comprise values based on the outputs of the artificial neurons for a selected group of inputs. For example, the selected inputs may be fed through the artificial neural network, and the values may be based on the outputs of the artificial neurons in the artificial neural network. In another example, the selected inputs may be fed directly to the artificial neurons, and the values may be based on the outputs of the artificial neurons. Some examples of the values associated with the artificial neuron may comprise some selected outputs, values describing the distribution of the outputs, a curve fitted to the mapping of inputs to outputs, a histogram of the outputs, and so forth. In some examples, the values associated with the one or more artificial neurons may comprise values based on parameters and/or hyper-parameters of the artificial neurons, such as selected parameters and/or hyper-parameters, a function of some parameters and/or hyper-parameters, and so forth.

In some examples, at least part of the values associated with the artificial neurons of a segment may be combined to generate the descriptor of the segment. For example, at least part of the values associated with the artificial neurons of a segment may be aggregated into a mathematical set of values, and the mathematical set may be used as at least part of the descriptor of the segment. In another example, an average or a weighted average of at least part of the values associated with the artificial neurons of a segment may be calculated, optionally according to weights assigned to the artificial neurons of the segment, and the calculated average and/or weighted average may be used as at least part of the descriptor of the segment. In another example, properties of the distribution of at least part of the values associated with the artificial neurons of a segment may be used as at least part of the descriptor of the segment. Some examples of such properties may include mean, mode, median, standard deviation, variance, and so forth. In yet another example, a histogram of at least part of the values associated with the artificial neurons of a segment may be used as at least part of the descriptor of the segment. In another example, some of the artificial neurons of the segment may be selected, for example based on the values associated with the artificial neurons (for example, selecting the artificial neurons associated with the highest and/or lowest values and/or median value and/or mode value), and at least part of the values associated with the selected artificial neurons may be used as at least part of the descriptor of the segment and/or in the calculation of the descriptor of the segment. In yet another example, a hash function of at least part of the values associated with the artificial neurons of a segment may be calculated, and the resulting hash value may be used as at least part of the descriptor of the segment.

In some embodiments, compiling a descriptor of an artificial neural network (Step 1140) may comprise compiling a descriptor for the artificial neural network obtained by Step 1110 using at least part of the descriptors calculated by Step 1130 for the segments obtained by Step 1120. For example, at least part of the descriptors of the segments of the artificial neural network may be aggregated into a mathematical set of values, and the mathematical set may be used as at least part of the descriptor of the artificial neural network. In another example, an average or a weighted average of at least part of the descriptors of the segments of the artificial neural network may be calculated, optionally according to weights assigned to the segments (for example according to a function of the number of artificial neurons in each segment, where examples of the function may include a polynomial function, a log function, an exponential function, and so forth), and the calculated average and/or weighted average may be used as at least part of the descriptor of the artificial neural network. In another example, the distribution of at least part of the descriptors of the segments of the artificial neural network and/or the properties of said distribution may be used as at least part of the descriptor of the artificial neural network. In yet another example, a histogram of at least part of the descriptors of the segments of the artificial neural network may be used as at least part of the descriptor of the artificial neural network. In another example, some of the segments of the artificial neural network may be selected, for example based on their descriptors, and at least part of the descriptors of the selected segments may be used as at least part of the descriptor of the artificial neural network and/or in the calculation of the descriptor of the artificial neural network. In yet another example, a hash value produced by a hash function of at least part of the descriptors of the segments of the artificial neural network may be used as at least part of the descriptor of the artificial neural network. Some examples of such properties may include mean, mode, median, standard deviation, variance, and so forth.

In some examples, a graph and/or a hypergraph of the segments of the artificial neural network may be constructed, for example where the nodes correspond to the segments, and where the edges and/or hyperedges are constructed according to the structure of the artificial neural network and the connections among the segments in the artificial neural network. For example, segments with common artificial neurons may be connected by an edge and/or a hyperedge. In another example, two segments may be connected with a directed edge if one of the two segments feeds input to the other segment. In some examples, nodes of the graph and/or hypergraph may be labeled with the descriptors of the corresponding segments. In some examples, edges and/or hyperedges of the graph and/or hypergraph may be labeled with the descriptors of the segments corresponding to the nodes connected by the edges and/or hyperedges. The graph and/or hypergraph, with or without labels associated with the nodes and/or edges and/or hyperedges, may be used as at least part of a descriptor of the artificial neural network.

In some embodiments, the descriptors of the segments of the artificial neural network may be constructed recursively. For example, denote a segment as a sub-segment of another segment if all the artificial neurons of the sub-segment are also in the other segment. In some examples, a single artificial neuron may be considered a segment, and the descriptor of a segment comprising a single artificial neuron may be calculated as described above in Step 1130. Further, some segments may include sub-segments, in the recursive step these segments may be treated as a complete artificial neural network, and the descriptors of these segments may be constructed as described above in Step 1140.

In some embodiments, calculating a match score for a pair of artificial neural networks (Step 1150) may comprise comparing the descriptor of a first artificial neural network with a descriptor of a second artificial neural network to obtain a matching score. For example, the descriptors of the first artificial neural network and/or the second artificial neural network may be constructed by Step 1140 as described above. In another example, at least part of the descriptors of the first artificial neural network and/or the second artificial neural network may be read from memory (such as memory units 210, shared memory modules 410, and so forth). In yet another example, at least part of the descriptors of the first artificial neural network and/or the second artificial neural network may be received from external devices, for example using communication devices (such as communication modules 230, internal communication modules 440, external communication modules 450, and so forth). In some examples, the second artificial neural network may comprise a result of using a machine learning algorithm to update the first artificial neural network using a plurality of training examples. In another example, the two artificial neural networks may be two different results of using machine learning algorithms to train identical or similar artificial neural networks (for example using the same deep learning algorithm and/or using different deep learning algorithms, using the same plurality of training examples and/or using different pluralities of training examples, using the same hyper-parameters and/or using different hyper-parameters, and so forth).

In some examples, a descriptor of an artificial neural network may comprise a mathematical set, and comparing the descriptors may comprise comparing the mathematical sets, for example by counting the number of common elements in the two sets and dividing that with the average number of elements in a set, by measuring the average (over all elements of the first set) of the maximal similarity between an element of the first set and any element in the second set, and so forth. In some examples, a descriptor of an artificial neural network may comprise an n-tuple of values (for example, a single value, a hash value, a list of histogram values, a list of selected values, a list of properties of a distribution, and so forth), and comparing the descriptors may comprise comparing the n-tuples, for example by calculating a distance and/or a divergence between the two n-tuples. Some examples of such distances and/or divergences may include mean absolute differences, mean squared differences, root mean squared differences, Kullback-Leibler divergence, Jensen-Tsallis divergence, and so forth. In some examples, a descriptor of an artificial neural network may comprise a distribution (for example, as described above), and comparing the descriptors may comprise calculating a statistical distance (such as f-divergence, Kullback-Leibler divergence, Hellinger distance, Total variation distance, Rényi's divergence, Jensen-Shannon divergence, Lévy-Prokhorov metric, Bhattacharyya distance, Kantorovich metric, Tsallis divergence, etc.) between the distributions.

In some examples, a descriptor of an artificial neural network may comprise a graph and/or a hypergraph, and comparing the descriptors may comprise using an inexact graph matching and/or an inexact hypergraph matching algorithms to obtain a matching score for the two artificial neural networks. In some examples, a descriptor of an artificial neural network may have a recursive structure, and comparing the descriptors may comprise a recursive comparison function that combines the results of the comparison of the immediate sub-descriptors of the two descriptors into a comparison of the two descriptors.

In some embodiments, selecting an action based on the matching score (Step 1160) may comprise selecting and/or performing one or more actions based on the matching score and/or comparison result of Step 1150. For example, the matching score and/or comparison result of Step 1150 may be compared with a selected threshold to determine whether the two artificial neural networks are similar or not. Further, some actions may be performed in response to the determination that the two artificial neural networks are similar, while some other actions may be performed in response to the determination that the two artificial neural networks are dissimilar. In another example, a rule (such as a lookup-table and/or a switch expression) that selects actions according to ranges of matching score values may be used to select actions according to the matching score and/or comparison result of Step 1150.

In some examples, one action that may be selected and/or performed by Step 1160 may comprise utilizing one of the artificial neural networks compared by Step 1150, for example as described in Step 1050. For example, Step 1160 may utilize the second artificial neural network of the comparison of Step 1150 when the two artificial neural networks are found to be similar, when the two artificial neural networks are found to be dissimilar, when the matching score of the two artificial neural networks is in a selected range of values, and so forth.

In some examples, one action that may be selected and/or performed by Step 1160 may comprise forgoing the usage of one of the artificial neural networks compared by Step 1150 in one or more tasks, for example as described in Step 1060. For example, Step 1160 may forgo the usage of the second artificial neural network of the comparison of Step 1150 in one or more tasks when the two artificial neural networks are found to be similar, when the two artificial neural networks are found to be dissimilar, when the matching score of the two artificial neural networks is in a selected range of values, and so forth.

In some examples, one action that may be selected and/or performed by Step 1160 may comprise informing a user, for example about the comparison result, about the matching score, and so forth. For example, Step 1160 may inform the user when the two artificial neural networks are found to be similar, when the two artificial neural networks are found to be dissimilar, when the matching score of the two artificial neural networks is in a selected range of values, and so forth. In some examples, the process may inform the user about the comparison result regardless of the matching score.

Figure 12:
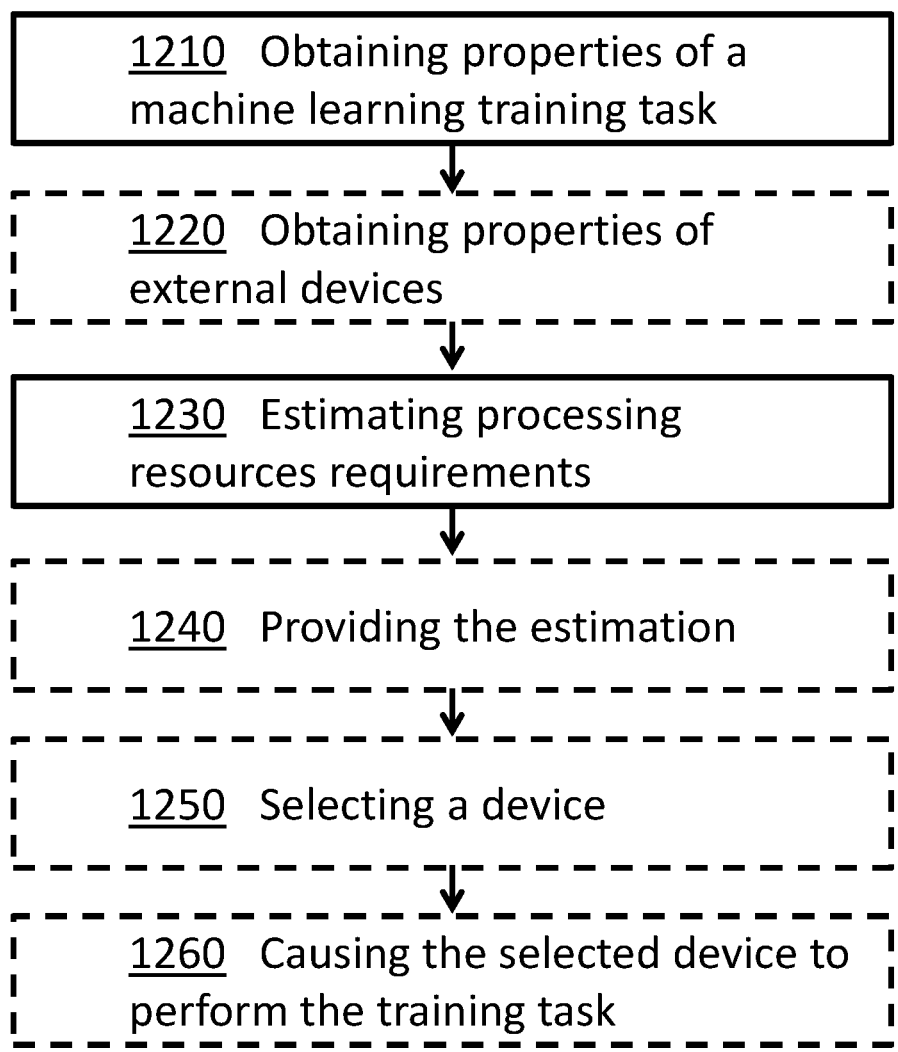
FIG. 12 illustrates an example of a process for estimating required processing resources for machine learning tasks.

FIG. 12 illustrates an example of a process 1200 for estimating required processing resources for machine learning tasks. In this example, process 1200 may comprise: obtaining properties of a machine learning training task (Step 1210); obtaining properties of external devices (Step 1220); estimating processing resources requirements (Step 1230); providing the estimation (Step 1240); selecting a device (Step 1250); and causing the selected device to perform the training task (Step 1260). In some implementations, process 1200 may comprise one or more additional steps, while some of the steps listed above may be modified or excluded. For example, in some cases Step 1220 may be excluded from process 1200. In another example, in some cases Step 1240 and/or Step 1250 and/or Step 1260 may be excluded from process 1200. In yet another example, in some cases Step 1210 and/or Step 1220 and/or Step 1230 and/or Step 1240 may be excluded from process 1200. In some implementations, one or more steps illustrated in FIG. 12 may be executed in a different order and/or one or more groups of steps may be executed simultaneously and vice versa.

In some embodiments, obtaining properties of a machine learning training task (Step 1210) may comprise obtaining one or more records describing one or more machine learning training tasks. In some examples, at least part of the properties of a machine learning training task may be read from memory (such as memory units 210, shared memory modules 410, and so forth). In another example, at least part of the properties of a machine learning training task may be received from external devices, for example using communication devices (such as communication modules 230, internal communication modules 440, external communication modules 450, and so forth). In some examples, at least part of the properties of a machine learning training task may be received from another process. In some examples, at least part of the properties of a machine learning training task may be obtained from datasets 610 and/or annotations 620 and/or views 630 and/or algorithms 640 and/or tasks 650. For example, the properties of a machine learning training task may include identifiers of a machine learning algorithm of algorithms 640 and/or an identifier of a machine learning training task of tasks 650, and in some cases additional properties of the machine learning training task may be obtained from the identified algorithm and/or task. In another example, the properties of a machine learning training task may include identifiers of a dataset of datasets 610 and/or an annotation of annotations 620 and/or a view of views 630. In some examples, the identified dataset and/or annotation and/or view may serve as at least part of the a training set and/or a validation set and/or a test set, and in some cases additional properties of the a training set and/or a validation set and/or a test set may be obtained from datasets 610 and/or annotations 620 and/or views 630. In some examples, the identified dataset and/or annotation and/or view may be split into a training set and/or a validation set and/or a test set according to a rule (which may also be specified in the properties of the machine learning training task). For example, such rule may specify the amount of examples in each set.

Some examples of properties of a machine learning training task may include a type of a machine learning algorithm, hyper-parameters of the machine learning algorithm, properties of the training set, properties of the validation set, properties of the test set, and so forth. The hyper-parameters of the machine learning algorithm may differ from one machine learning algorithm to another. For example, some examples of hyper-parameters of an artificial neural network may include the structure of the artificial neural network (such as the number of layers, the size of each layer, a graph defining the structure of the network, and so forth), optimizer, loss function, weight decay function, the types of the network's artificial neurons, hyper-parameters of the network's artificial neurons, initialization data, learning rate, dropout, stopping condition, number of epochs, batch size, momentum, random seed, and so forth. In another example, some examples of hyper-parameters of a support vector machine model may include kernel function, optimizer, penalty function, penalty weight, stopping condition, and so forth. In yet another example, some examples of hyper-parameters of an AdaBoost algorithm may include base classifier, maximum number of base classifiers in the model, learning rate, optimization algorithm, random seed, and so forth. In another example, some examples of hyper-parameters of a k-means model may include number of clusters, initial guess, and so forth. In yet another example, some examples of hyper-parameters of a kernel ridge regression model may include epsilon, kernel function, and so forth.

Some examples of properties of the training set may include samples of the training examples of the training set, the entire training set, the number of training examples in the training set, information about the size of the training examples, information about the structure of the training examples, information about the distribution of the training examples, and so forth. Similarly, some examples of properties of the validation set may include samples of the validation examples of the validation set, the entire validation set, the number of validation examples in the validation set, information about the size of the validation examples, information about the structure of the validation examples, information about the distribution of the validation examples, and so forth. Similarly, some examples of properties of the test set may include samples of the test examples of the test set, the entire test set, the number of test examples in the test set, information about the size of the test examples, information about the structure of the test examples, information about the distribution of the test examples, and so forth.

In some embodiments, obtaining properties of external devices (Step 1220) may comprise obtaining at least one property of one or more external devices. For example, Step 710 may be used to obtain information associated with the external devices, as described above. In another example, Step 910 may be used to obtain available processing resources information of the external devices, as described above.

In some embodiments, estimating processing resources requirements (Step 1230) may comprise estimating at least one processing resources requirement associated with a machine learning training task based on the at least one property of the machine learning training task obtained by Step 1210 and/or the at least one property of one or more external devices obtained by Step 1220. For example, the processing time and/or memory size and/or communication bandwidth and/or communication throughput required for performing a machine learning training task may be estimated. In some examples, Step 1230 may use a function that takes as input at least part of the properties of the machine learning training task and/or at least part of the properties of the external devices, and outputs estimated processing resources requirements in response. For example, the function may be defined and/or programmed manually. In another example, the function may use k-nearest neighbors approach, searching for the k most similar samples in a database that stores examples of processing resources requirements for different properties of the machine learning training tasks and/or different properties of devices (for example according to past experience), and combining the processing resources requirements of the k selected samples to obtain the estimated processing resources requirements. In yet another example, to obtain the function, a machine learning algorithm may be trained using a dataset of training example, each training example may comprise properties of the machine learning training tasks and/or properties of the devices (for example according to past experience), together with the corresponding processing resources requirements. In another example, the function may comprise an artificial neural network configured to predict the processing resources requirements from the properties of the machine learning training tasks and/or the properties of the devices. In some examples, the function may estimate the processing resources requirements based on properties of the machine learning training tasks for a baseline device, and may adjust the estimated processing resources requirements to a different device according to a correction function. The correction function may be configured to adjust the required processing resources of the baseline device to the required processing resources of a different device, for example according to past experience. For example, the correction function may multiply the processing time by a factor, where the factor is selected based on the number of instructions per a time unit that the baseline device can perform and that the different device can perform according to some benchmark. In some examples, the correction function may multiply the processing time by a factor, where the factor is selected based on the number of processing cores in the baseline device and the number of processing cores in the other device. For example, assuming that the baseline device has m processing cores, and that the other device has n processing cores, the correction factor may be selected to be (m/n) to the power of c, where c is a number between zero and one expressing the inefficiency of distributed processing, which may depend on the properties of the machine learning training tasks. In some examples, the estimated processing resources requirements may comprise a range of estimated processing resources requirements together with a distribution that assigns probabilities to the estimations. For example, the properties of the devices may comprise a distribution of properties, and a function of the distribution of properties may produce a distribution of estimated processing resources requirements. In another example, the machine learning training task may comprise a probabilistic component dictating the processing resources requirements, and the distribution of the probabilistic component may translate into a distribution of estimated processing resources requirements.

In some embodiments, providing the estimation (Step 1240) may comprise providing the estimated processing resources requirements of Step 1230 and/or information based on the estimated processing resources requirements to a user, to another process, to an external device, and so forth. In some examples, the information may be provided to a user visually, for example using a graphical user interface, using a web site, using a display system, using an augmented reality system, using a virtual reality system, in a printed form, and so forth. In some examples, the information may be provided audibly, for example through audio speakers, using headset, and so forth. In some examples, the information may be transmitted to an external device, for example using communication devices (such as communication modules 230, internal communication modules 440, external communication modules 450, and so forth). In some examples, the information may be provided to another process (for example through a memory module, such as memory units 210, shared memory modules 410, and so forth). In some examples, the information may be provided selectively, for example providing the information when the estimated processing resources requirements are in a selected range, and forgoing providing the information otherwise.

In some embodiments, selecting a device (Step 1250) may comprise selecting at least one device, for example based on the estimated processing resources requirements of Step 1230. In some examples, Step 1230 may be repeated to obtain a plurality of estimated processing resources requirements for a plurality of devices, and at least one device of the plurality of devices may be selected according to their corresponding estimated processing resources requirements. For example, some constraints on the estimated processing resources requirements may be obtained (for example from tasks 650, from a user, from an external device, from another process, from a memory unit, and so forth), and the selected at least one device may include devices that satisfy the constraints. Some examples of such constraints may include maximal processing time, maximal memory size, and so forth. In another example, using process 1600 it may be determined that process 1200 has no permission to use some devices, and as a result different devices may be selected. In yet another example, using process 1700 it may be determined that process 1200 has insufficient quota to use some devices, and as a result different devices may be selected. In another example, a cost function may be used to assign cost for each one of the plurality of devices according to their corresponding estimated processing resources requirements, and the device corresponding to the lowest cost (possibly out of the devices that satisfy the constraints as described above) may be selected. An example of such a cost function may include $c1*t+c2*s$, where $c1$ and $c2$ are positive constants which may represent cost per processing time and cost per memory size respectively, t may represent the estimated processing time, and s may represent the estimated memory size. In some examples, the estimated processing resources requirements may comprise an estimated range of processing resources requirements together with a distribution that assigns probabilities to the estimations. In such cases, the constraints may specify a required certainty that some other conditions hold. Further, the cost function may comprise a function that sums values over the different estimations according to the probabilities. In some examples, Step 1250 may determine that there is no available device that satisfies the constraints. In response to such determination, Step 1250 may forgo Step 1260, may provide a failure indication (for example, to a user, to process 1800, etc.), and so forth.

In some embodiments, causing the selected device to perform the training task (Step 1260) may comprise causing the devices selected by Step 1250 to perform the machine learning training task of Step 1210. In some examples, a message may be transmitted to the selected devices, for example using communication devices (such as communication modules 230, internal communication modules 440, external communication modules 450, etc.), and the message may be configured to cause the selected devices to perform the machine learning training task. For example, the message may comprise at least part of the machine learning training task information, an indication of the machine learning training task, and so forth. For example, the machine learning training task may comprise generating and/or updating an inference model by training a machine learning algorithm using training examples. In some examples, Step 1260 may provide a progress update to process 1800, comprising details of the dispatched training task.

In some embodiments, a decision whether or not to perform the machine learning training task may be made. For example, Step 1250 may find no device that satisfies the constraints, and as a result it may decide not to perform the machine learning training task. In another example, Step 1250 may find that the value of a cost function for all the devices is above some selected threshold, and as a result it may decide not to perform the machine learning training task. In yet another example, the estimated processing resources requirements for the machine learning training task calculated by Step 1230 may be compared to some estimated processing resources requirements of some alternative machine learning training tasks, and as a result it may be decided (for example, according to some rules) to perform one of the alternative machine learning training tasks instead of the machine learning training task of Step 1210. In another example, the estimated processing resources requirement of Step 1230 may comprise a distribution of estimated processing resources requirements, and the decision to perform the machine learning training task may be based on a probability that an estimated processing resources requirement is below a selected threshold according to the distribution. In some examples, it may be decided to perform the machine learning training task when the value of a cost function calculated by Step 1250 for at least one device is below the selected threshold. In some examples, in response to a decision to perform the machine learning training task, Step 1260 may be performed. In some examples, in response to a decision not to perform the machine learning training task, the system may forgo Step 1260.

Figure 13:
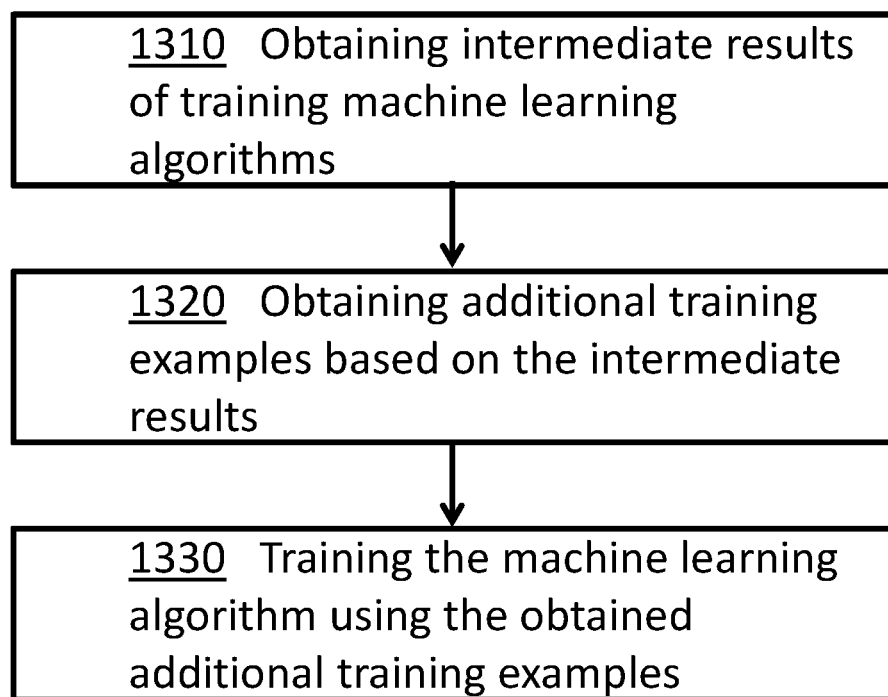
FIG. 13 illustrates an example of a process for enriching datasets while learning.

FIG. 13 illustrates an example of a process 1300 for enriching datasets while learning. In this example, process 1300 may comprise: obtaining intermediate results of training machine learning algorithms (Step 1310); obtaining additional training examples based on the intermediate results (Step 1320); and training the machine learning algorithms using the obtained additional training examples (Step 1330). In some implementations, process 1300 may comprise one or more additional steps, while some of the steps listed above may be modified or excluded. For example, in some cases Step 1310 may be excluded from process 1300. In another example, in some cases Step 1330 may be excluded from process 1300. In some implementations, one or more steps illustrated in FIG. 13 may be executed in a different order and/or one or more groups of steps may be executed simultaneously and vice versa.

In some embodiments, obtaining intermediate results of training machine learning algorithms (Step 1310) may comprise obtaining intermediate results of training at least one machine learning algorithm using a plurality of training examples. In some examples, at least part of the intermediate results may be read from memory (such as memory units 210, shared memory modules 410, and so forth). In another example, at least part of the intermediate results may be obtained from logs 660. In yet another example, at least part of the intermediate results may be received from external devices (for example from devices that trained the machine learning algorithms using the plurality of training examples), for example using communication devices (such as communication modules 230, internal communication modules 440, external communication modules 450, and so forth). In another example, at least part of the intermediate results may be obtained by training the machine learning algorithms using the plurality of training examples. For example, the machine learning algorithms may be read from memory (such as memory units 210, shared memory modules 410, and so forth), received from external devices (for example using communication devices, such as communication modules 230, internal communication modules 440, external communication modules 450, and so forth), obtained from algorithms 640, and so forth. Further, the plurality of training examples may be read from memory (such as memory units 210, shared memory modules 410, and so forth), received from external devices (for example using communication devices, such as communication modules 230, internal communication modules 440, external communication modules 450, and so forth), obtained from datasets 610 and/or annotations 620 and/or views 630, and so forth.

In some examples, the intermediate results may comprise values of parameters of the machine learning algorithm. In some examples, the intermediate results may comprise values measured using at least part of the training examples and/or using at least part of the validation examples and/or using at least part of the test examples, such as a value of a loss function, a value of a cost function, a value of an objective function, precision, recall, accuracy, specificity, F1 score, confusion matrices, number and/or ratio of true positives, number and/or ratio of false positives, number and/or ratio of false negative, number and/or ratio of true negatives, and so forth. For example, the machine learning algorithm may minimize an objective function and/or maximize an objective function, and the intermediate results may comprise an intermediate value of the objective function in the minimization and/or maximization process (for example using an optimization scheme, such as gradient descent, stochastic gradient descent, coordinate descent, and so forth). In some examples, the intermediate results may comprise intermediate states of the machine learning algorithms. In some examples, the intermediate results may comprise an intermediate inference model and/or information based on an intermediate inference model. For example, the machine learning algorithm may search an inference model in a mathematical space of inference model (for example using an optimization scheme, such as gradient descent, stochastic gradient descent, coordinate descent, and so forth), and an intermediate inference model may be an intermediate result of the search. In some examples, the intermediate results may comprise the results of applying data items (such as training examples, validation examples, test examples, and so forth) to the intermediate inference model.

In some embodiments, obtaining additional training examples based on intermediate results (Step 1320) may comprise obtaining at least one additional training example based on the intermediate results obtained by Step 1310. In some examples, the additional training examples may be read from memory (such as memory units 210, shared memory modules 410, and so forth). In some examples, the intermediate results may be provided to another process, and the additional training examples may be received in response. In some examples, the additional training examples may be obtained and/or selected from datasets 610 and/or annotations 620 and/or views 630, and so forth. In some examples, the intermediate results may be transmitted to external devices, and in response the additional training examples may be received from the external devices, for example using communication devices (such as communication modules 230, internal communication modules 440, external communication modules 450, and so forth). For example, the external devices may capture additional training examples, for example according to the intermediate results using at least one sensor (such as audio sensors 250, image sensors 260, motion sensors 270, positioning sensors 275, barometers, pressure sensors, proximity sensors, electrical impedance sensors, electrical voltage sensors, electrical current sensors, and so forth). For example, the intermediate results may indicate some conditions in which an intermediate inference model is more prone to errors, and the additional training examples may be captured in the indicated conditions.

In some examples, the additional training examples may be selected of a plurality of alternative training examples based on the intermediate results obtained by Step 1310. For example, the intermediate results may comprise a confusion matrix, and an analysis of the confusion matrix may indicate that one or more classes are more prone to error. In response, additional training examples may be selected for the classes that are more prone to errors. In another example, the intermediate results may comprise an intermediate inference model, and additional training examples for which the intermediate inference model provides wrong classification and/or regression results may be selected. In yet another example, the intermediate results may comprise training examples and/or a validation examples for which an intermediate inference model provides wrong classification and/or regression results, and additional training examples that are similar (for example, under some similarity measure) to those training examples and/or a validation examples may be selected.

In some examples, a dataset and/or an annotation and/or a view may be selected from datasets 610 and/or annotations 620 and/or views 630 based on the intermediate results obtained by Step 1310. The entire set of examples in the selected dataset and/or the selected annotation and/or the selected view may be used as additional training examples, or the additional training examples may be selected of the selected dataset and/or the selected annotation and/or the selected view (for example as described above). For example, the intermediate results may comprise a confusion matrix, and an analysis of the confusion matrix may indicate that one or more classes are more prone to error. In response, a dataset and/or an annotation and/or a view associated with the classes that are more prone to error may be selected.

In some examples, the additional training examples may be generated based on the intermediate results obtained by Step 1310. For example, the intermediate results may comprise a confusion matrix, and an analysis of the confusion matrix may indicate that one or more classes are more prone to error. In response, additional training examples may be generated for the classes that are more prone to errors, for example using the Synthetic Minority Over-sampling Technique (SMOTE) algorithm, using a generative model, and so forth. In another example, the intermediate results may comprise an intermediate inference model, and synthetic additional training examples for which the intermediate inference model provides wrong classification and/or regression results may be generated (for example, by generating an excess number of synthetic examples, and selecting the ones that correspond to wrong classification and/or regression results out of the generated examples).

In some embodiments, Step 1320 may obtain additional training examples based on the intermediate results obtained by Step 1310 and quota record. For example, at least some of a plurality of alternative training examples may be associated with a quota required for using them and/or a price. Step 1320 may select the additional training examples of the plurality of alternative training examples such that the quota usage and/or cost is minimized, the quota usage and/or cost is below a selected threshold, and so forth. For example, Step 1320 may select the additional training examples by solving an optimization problem that maximizes some objective function associated with the content of the selected training examples, while minimizing and/or bounding the quota usage and/or cost.

In some embodiments, training the machine learning algorithm using the obtained additional training examples (Step 1330) may comprise training the machine learning algorithms of Step 1310 using the additional training examples obtained by Step 1320. For example, a message may be transmitted to external devices, for example using communication devices (such as communication modules 230, internal communication modules 440, external communication modules 450, etc.), and the message may be configured to cause the external devices to train the machine learning algorithms using the additional training examples. For example, the message may comprise at least part of the machine learning algorithms information, an indication of the machine learning algorithms, an intermediate state of the machine learning algorithms (for example, as obtained by Step 1310), an intermediate inference model, at least part of the additional training examples, indication of the additional training examples, and so forth. In another example, a similar message may be provided to another process (for example through a memory module, such as memory units 210, shared memory modules 410, etc.), and may be configured to cause the other process to train the machine learning algorithms using the additional training examples.

In some examples, Step 1310 may obtain intermediate results of training the machine learning algorithms using a first group of training examples, and Step 1330 may comprise training the machine learning algorithms using the additional training examples without the first group of training examples, or training the machine learning algorithms using the additional training examples and at least part of the first group of training examples. In some examples, training the machine learning algorithms using the additional training examples may comprise updating an intermediate inference model obtained by Step 1310 using the machine learning algorithms, the additional training examples (in some cases together with at least part of the first group of training examples used to produce the intermediate inference model). In some examples, training the machine learning algorithms using the additional training examples may comprise initializing the machine learning algorithms according to an intermediate state of the machine learning algorithms obtained by Step 1310, and providing to the initialized machine learning algorithms the additional training examples (in some cases together with at least part of the first group of training examples used to produce the intermediate state) as input to be used for training.

In some embodiments, process 1300 may determine that external intervention is required. As a result, process 1300 may provide a request to provide new training examples, for example, to another process, to an external device, to a user (for example, through a user interface, through another process, through an external device, etc.), and so forth. In response, process 1300 may obtain the requested new training examples, for example from the other process, from the external device, from the user (for example, through a user interface, through another process, through an external device, etc.), and so forth. Further, process 1300 may train a machine learning algorithm using the new training examples, for example using Step 1330. In some examples, process 1300 may determine that external intervention is required based on a determination that the quality of the additional training examples obtained by Step 1320 is below a selected threshold. For example, Step 1320 may further obtain confidence levels corresponding to the additional training examples (to be used as a quality measure), for example from a process used to generate the additional training examples, from a process used to select the additional training examples, from an inference model trained to assign confidence levels to additional training examples, and so forth. In another example, the similarity of the additional training examples to a plurality of training examples used to produce the intermediate results of Step 1310 may be calculated, and the quality of the additional training examples may be based on the calculated similarity (for example, the quality may be a monotonically decreasing function of the calculated similarity, denoted s, such as $-s$, $-s*s*s$, $\exp(-s/c)$ for some constant c, and so forth). In some examples, process 1300 may determine that external intervention is required based on the intermediate results obtained by Step 1310. For example, the intermediate results may be compared with previous intermediate results, and when there are too similar according to some selected threshold process 1300 may determine that the external intervention is required. In another example, the intermediate results may comprise an intermediate inference model, and a measurement of the quality of the intermediate inference model (such as precision, recall, accuracy, specificity, F1 score, confusion matrix, number and/or ratio of true positives, number and/or ratio of false positives, number and/or ratio of false negative, number and/or ratio of true negatives, and so forth) may be obtained (for example, calculated, obtained from the intermediate results, obtained using process 1000, and so forth), and the process may determine that external intervention is required when the quality of the intermediate inference model is below a selected threshold. In some examples, process 1300 may select a user of a plurality of alternative users, for example based on the intermediate results, and provide the request for new training examples to the selected user. For example, the intermediate results may comprise an intermediate inference model, a measurement of the quality of the intermediate inference model may be obtained as described above, and a user may be selected based on the range of values that the measurement of the quality is in.

Figure 14:
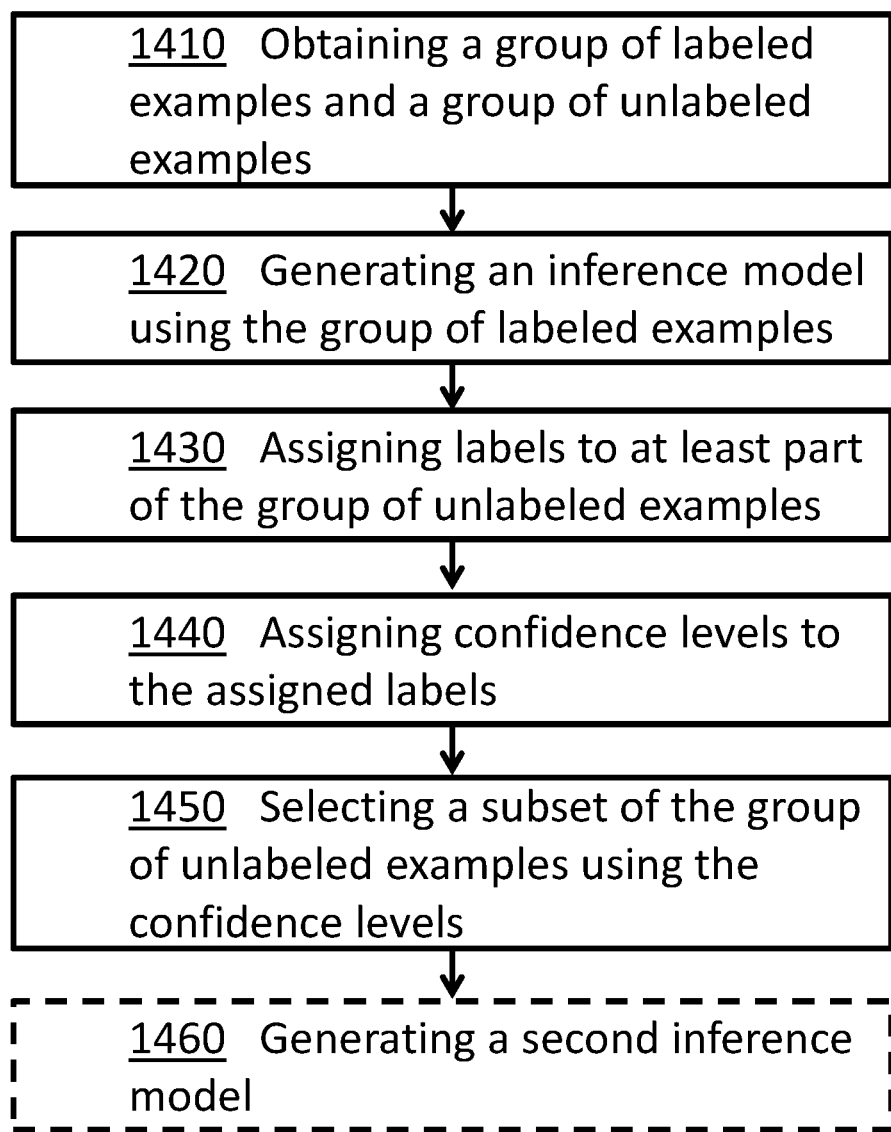
FIG. 14 illustrates an example of a process for incremental annotation of datasets.

FIG. 14 illustrates an example of a process 1400 for incremental annotation of datasets. In this example, process 1400 may comprise: obtaining a group of labeled examples and a group of unlabeled examples (Step 1410); generating an inference model using the group of labeled examples (Step 1420); assigning labels to at least part of the group of unlabeled examples (Step 1430); assigning confidence levels to the assigned labels (Step 1440); selecting a subset of the group of unlabeled examples using the confidence levels (Step 1450); and generating a second inference model (Step 1460). In some implementations, process 1400 may comprise one or more additional steps, while some of the steps listed above may be modified or excluded. For example, in some cases Step 1460 may be excluded from process 1400. In some implementations, one or more steps illustrated in FIG. 14 may be executed in a different order and/or one or more groups of steps may be executed simultaneously and vice versa.

In some embodiments, obtaining a group of labeled examples and a group of unlabeled examples (Step 1410) may comprise obtaining a group of a plurality of labeled examples and a group of a plurality of unlabeled examples. For example, at least part of the labeled examples and/or at least part of the unlabeled examples may be read from memory (such as memory units 210, shared memory modules 410, and so forth). In another example, at least part of the labeled examples and/or at least part of the unlabeled examples may be obtained from datasets 610 and/or annotations 620 and/or views 630. In yet another example, at least part of the labeled examples and/or at least part of the unlabeled examples may be received from external devices, for example using communication devices (such as communication modules 230, internal communication modules 440, external communication modules 450, and so forth). For example, at least part of the labeled examples and/or at least part of the unlabeled examples received from the external devices may be based on and/or comprised of information captured by the external devices (for example using at least one sensor, such as audio sensors 250, image sensors 260, motion sensors 270, positioning sensors 275, barometers, pressure sensors, proximity sensors, electrical impedance sensors, electrical voltage sensors, electrical current sensors, and so forth). In some examples, at least part of the labeled examples and/or at least part of the unlabeled examples may be generated, for example using a generative model. In some examples, at least part of the group of labeled examples may be obtained using process 1500 and/or Step 1510.

In some embodiments, generating an inference model using the group of labeled examples (Step 1420) may comprise generating the inference model using at least part of the group of labeled examples obtained by Step 1410. In some examples, the inference model may comprise a classification model and/or a regression model. In some examples, a machine learning algorithm (such as a classification machine learning algorithm, a regression machine learning algorithm) may be trained using at least part of the group of labeled examples to produce the inference model. For example, at least part of the group of labeled examples may be used as a training set and/or a validation set and/or a test set. In another example, at least part of the group of labeled examples may be split into at least two of the following sets: training set, validation set, and test set. In some examples, a message may be transmitted to external devices, for example using communication devices (such as communication modules 230, internal communication modules 440, external communication modules 450, etc.), the message may be configured to cause the external devices to train the machine learning algorithm using at least part of the group of labeled examples, and in response the inference model may be received from the external devices. For example, the message may comprise at least part of the machine learning algorithm information, an indication of the machine learning algorithm, at least part of the group of labeled examples, indication of the labeled examples, indication of the group of labeled examples, and so forth. In another example, such message may be provided to another process (for example through a memory module, such as memory units 210, shared memory modules 410, etc.), the message may be configured to cause the other process to train the machine learning algorithm using at least part of the group of labeled examples, and in response the inference model may be received from the other process.

In some embodiments, assigning labels to at least part of the group of unlabeled examples (Step 1430) may comprise using the inference model generated by Step 1420 to assign labels to at least part of the unlabeled examples of the group of unlabeled examples obtained by Step 1410. For example, the unlabeled examples may be applied to the inference model, and the output of the inference model for the unlabeled examples may be used as labels of the unlabeled examples. In some examples, the unlabeled examples may be applied to a plurality of inference models, and the labels for the unlabeled examples may be selected through a voting process using the results obtained from the plurality of inference models. In some examples, a message may be transmitted to external devices, for example using communication devices (such as communication modules 230, internal communication modules 440, external communication modules 450, etc.), the message may be configured to cause the external devices to assign labels to at least part of the unlabeled examples of the group of unlabeled examples obtained by Step 1410 (for example using the inference model generated by Step 1420), and in response labels for the unlabeled examples may be received from the external devices. For example, the message may comprise at least part of the inference model information, an indication of the inference model, at least part of the group of unlabeled examples, an indication of the unlabeled examples, an indication of the group of unlabeled examples, and so forth. In another example, such message may be provided to another process (for example through a memory module, such as memory units 210, shared memory modules 410, etc.), the message may be configured to cause the other process to assign labels to at least part of the unlabeled examples of the group of unlabeled examples obtained by Step 1410 (for example using the inference model generated by Step 1420), and in response labels for the unlabeled examples may be received from the other process.

In some examples, at least some of the labeled examples of the group of labeled examples and/or at least some of the unlabeled examples of the group of unlabeled examples may comprise image data (for example, images captured using image sensors 260). In some cases, the inference model generated by Step 1420 may comprise a detector configured to detect items in images (such as faces, people, objects, text, and so forth), and the labels assigned to the image by Step 1430 may comprise an indicator whether an item was detected in the image, a list of items detected in the image, locations of the items detected in the image, and so forth. In some cases, the inference model generated by Step 1420 may comprise a recognition model, and the labels assigned to the image by Step 1430 may comprise identifying information of people depicted in the image. In some cases, the inference model generated by Step 1420 may comprise a segmentation model, and the labels assigned to the image may comprise a segmentation of the image. In some cases, the inference model generated by Step 1420 may comprise an image regression model, and the labels assigned to the image may comprise another image (for example, a transformed version of the image obtained by applying the original image to the image regression model). For example, the image regression model may comprise a super resolution model, and the label may comprise an enlarged version of the original image. In another example, the image regression model may comprise an image enhancement model, and the label may comprise an enhanced version of the original image. In yet another example, the image regression model may comprise an image filter, and the label may comprise a filtered version of the original image.

In some embodiments, assigning confidence levels to the assigned labels (Step 1440) may comprise calculating confidence levels corresponding to the labels assigned by Step 1430 to at least part of the unlabeled examples of the group of unlabeled examples obtained by Step 1410. For example, Step 1430 may assign labels by applying the unlabeled examples to an inference model, and the inference model may be configured to output labels together with confidence levels. In another example, Step 1430 may assign labels by applying the unlabeled examples to a plurality of inference models, selecting the labels to be assigned to the unlabeled examples through voting, and calculating the confidence level according to the distribution of the results obtained from the plurality of inference models, for example by taking the ratio of the selected label out of the total number of results as the confidence level, by taking a function of the number of repetitions of the selected label and the total number of results as the confidence level, and so forth. In some examples, Step 1430 may obtain the labels for the unlabeled examples from external devices and/or from another process, and the confidence levels may also be obtained from the external devices and/or from the other process. In some examples, at least part of the confidence levels may be obtained using Step 1520.

In some embodiments, selecting a subset of the group of unlabeled examples using the confidence levels (Step 1450) may comprise selecting a subset of the group of unlabeled examples obtained by Step 1410 and/or that were assigned with labels by Step 1430 based on the confidence levels assigned by Step 1440 and/or the labels assigned by Step 1430 and/or the content of the unlabeled examples. For example, a single example, two examples, three examples, four examples, or more than four examples, may be selected. In some examples, the number of selected examples may be calculated according to the number of labeled examples (for example, in the group of labeled examples of Step 1410, that were used by step 1420, and so forth) and/or the number of unlabeled examples (for example, in the group of unlabeled examples of Step 1410, that were assigned with a label by Step 1430, and so forth). For example, the number of selected examples may be a function of the number of labeled examples, denoted n1, and the number of unlabeled examples, denoted n2. For a positive constant c (such as 1.4, 2, 4, 10, 20, 100, and so forth), some examples of such function may include, round(n1/c), round(n2/c), round(min (n1,n2)/c), and so forth.

In some examples, the unlabeled examples corresponding to the highest confidence levels may be selected. In some examples, the labels may include assignment of examples to a finite number of classes. For each class, a desired number of examples for a class may be determined (which may also be zero), and the desired number of examples that correspond to the highest confidence levels of the examples that were assigned to that class by Step 1430 may be selected. For example, the desired number of examples for a class may be calculated as a function of the number of examples that were assigned to the class by Step 1430, the number of examples assigned to the class in the group of labeled examples, the total number of examples that were assigned with any label by Step 1430, the total number of examples in the group of labeled examples of Step 1410, the total number of examples in the group of unlabeled examples of Step 1410, and so forth.

In some examples, the labels may include assignment of numbers from a range of possible values (for example by a regression model) to examples. Some sub-ranges of values may be selected, for each sub-range a desired number of examples may be determined (which may also be zero), and the desired number of examples that correspond to the highest confidence levels of the examples that were assigned with values in that sub-range by Step 1430 may be selected. For example, the desired number of examples for a sub-range may be calculated as a function of the number of examples that were assigned to values in that sub-range by Step 1430, the number of examples assigned to values in that sub-range in the group of labeled examples, the total number of examples that were assigned with any value by Step 1430, the total number of examples in the group of labeled examples of Step 1410, the total number of examples in the group of unlabeled examples of Step 1410, and so forth.

In some examples, the unlabeled examples may be assigned to clusters (for example according to the content of the unlabeled examples, as determined by a clustering algorithm applied to the unlabeled examples), for each cluster, a desired number of examples per cluster may be determined (which may also be zero), and the desired number of examples that correspond to the highest confidence levels of the examples that were assigned to that cluster may be selected. For example, the desired number of examples per cluster may be calculated as a function of the number of examples that were assigned to the cluster, the number of examples assigned to the cluster in the group of labeled examples, the total number of examples that were assigned with any value by Step 1430, the total number of examples in the group of labeled examples of Step 1410, the total number of examples in the group of unlabeled examples of Step 1410, and so forth.

In some examples, some examples of the group of labeled examples of Step 1410 that are wrongly treated by the inference model generated by Step 1420 (for example, assigned with the wrong class by a classification model, assigned with a value that is beyond a selected threshold of difference from a ground truth value by a regression model, and so forth) may be selected. Further, for each selected wrongly treated example, unlabeled examples that correspond to the highest confidence levels may be selected of a group of unlabeled examples that are the most similar (under some similarity measure) to the wrongly treated example (for example, of the unlabeled examples that were assigned with values by Step 1430, of the group of unlabeled examples of Step 1410, and so forth).

In some embodiments, generating a second inference model (Step 1460) may comprise generating a second inference model using at least part of the group of labeled examples obtained by Step 1410 and/or the subset of the group of unlabeled examples selected by Step 1450 and/or the labels assigned by Step 1430 to the examples in the selected subset of the group of unlabeled examples. In some examples, the second inference model may comprise a classification model and/or a regression model. In some examples, a machine learning algorithm (such as a classification machine learning algorithm, a regression machine learning algorithm, and so forth) may be trained and produce the second inference model using at least part of the group of labeled examples obtained by Step 1410 and/or the subset of the group of unlabeled examples selected by Step 1450 and/or the labels assigned by Step 1430 to the examples in the selected subset of the group of unlabeled examples. For example, at least part of the examples (and possibly the corresponding labels) may be used as a training set and/or a validation set and/or a test set. In another example, at least part of the examples (and possibly the corresponding labels) may be split into at least two of the following sets: training set, validation set, and test set. In some examples, the inference model generated by Step 1420 may be updated according to the subset of the group of unlabeled examples selected by Step 1450 (and possibly the labels assigned by Step 1430 to the examples in the selected subset), for example using an online and/or incremental machine learning algorithm, by changing the lost function of the machine learning algorithm according to the new training examples and using the inference model and/or an intermediate state from Step 1420 in the initialization of the machine learning algorithm, by changing the batches of examples to include the new examples in a batch based machine learning algorithm, and so forth. In some examples, a message may be transmitted to external devices, for example using communication devices (such as communication modules 230, internal communication modules 440, external communication modules 450, etc.), the message may be configured to cause the external devices to train the machine learning algorithm using at least part of the examples (and possibly the corresponding labels), and in response the second inference model may be received from the external devices. For example, the message may comprise at least part of the machine learning algorithm information, an indication of the machine learning algorithm, at least part of the examples (and possibly the corresponding labels), indication of the examples (and possibly of the corresponding labels), and so forth. In another example, such message may be provided to another process (for example through a memory module, such as memory units 210, shared memory modules 410, etc.), the message may be configured to cause the other process to train the machine learning algorithm using at least part of the examples (and possibly the corresponding labels), and in response the second inference model may be received from the other process. In some examples, the inference model generated by Step 1420 and the second inference model generated by Step 1460 may be compared, for example using Process 1000, and in some cases the second inference model may be utilized according to the result of the comparison, for example using Step 1050 and/or Step 1060.

In some embodiments, the group of labeled examples and/or the group of unlabeled examples obtained by Step 1410 (and possibly updated along the process) may be updated according to the subset of the group of unlabeled examples selected by Step 1450, and process 1400 may repeat with the updated groups (for example, from Step 1410 or from Step 1420, possibly without the optional Step 1460). In some examples, this process may be performed once, twice, repeated until some stopping condition is met, and so forth. For example, the process may be repeated until at least a selected number of examples of the original group of unlabeled examples of Step 1410 are selected by some repetition of Step 1450. Some examples of such selected number may include a function of the original number of examples in the original group of unlabeled examples (denoted o1) and/or the original number of examples in the original group of labeled examples (denoted o2), such as o1, o1−c1, o1/c1, log(o1), min(o1, o2/c2), min(o1, o2−c2), min(o1−c1, o2−c2), min(o1/c1, o2/c2), min(o1−c1, o2/c2), min(o1/c1, o2−c2), and so forth (for some positive constants c1 and c2). Some other examples of such selected number may include a constant number (such as a number below one hundred, one hundred, a number between one hundred and one thousand, one thousand, a number between one thousand and one million, one million, a number greater than one million, and so forth). In some examples, updating the group of labeled examples and/or the group of unlabeled examples may comprise removing at least part of the examples of the selected subset from the group of unlabeled examples, adding at least part of the examples of the selected subset to the group of labeled examples, and so forth.

In some embodiments, process 1400 may determine that external intervention is required. As a result, process 1400 may provide a request to assign labels (for example, to at least part of the group of unlabeled examples of Step 1410), to another process, to an external device, to a user (for example, through a user interface, through another process, through an external device, etc.), and so forth. In response, process 1400 may obtain the requested assignment of labels, for example from the other process, from the external device, from the user (for example, through a user interface, through another process, through an external device, etc.), and so forth. Further, process 1400 may generate an inference model using the obtained assignment of labels (possibly together with additional information, such as the group of labeled examples of Step 1410), for example using Step 1460. In some examples, process 1400 may determine that external intervention is required based on a determination that the quality of the labels assigned by Step 1430 is below a selected threshold. For example, confidence levels assigned by Step 1440 may be compared with a first selected threshold, and when at least a selected number of the confidence levels are below the first selected threshold process 1400 may determine that the quality of the labels assigned by Step 1430 is below a selected threshold. In some examples, process 1400 may select a user of a plurality of alternative users, for example based on the confidence levels assigned by Step 1440, and provide the request to assign labels to the selected user. For example, a statistical measure of the confidence levels (such as mean, median, mode, etc.) may be computed, and a user may be selected based on the range of values that the statistical measure is in.

Figure 15:
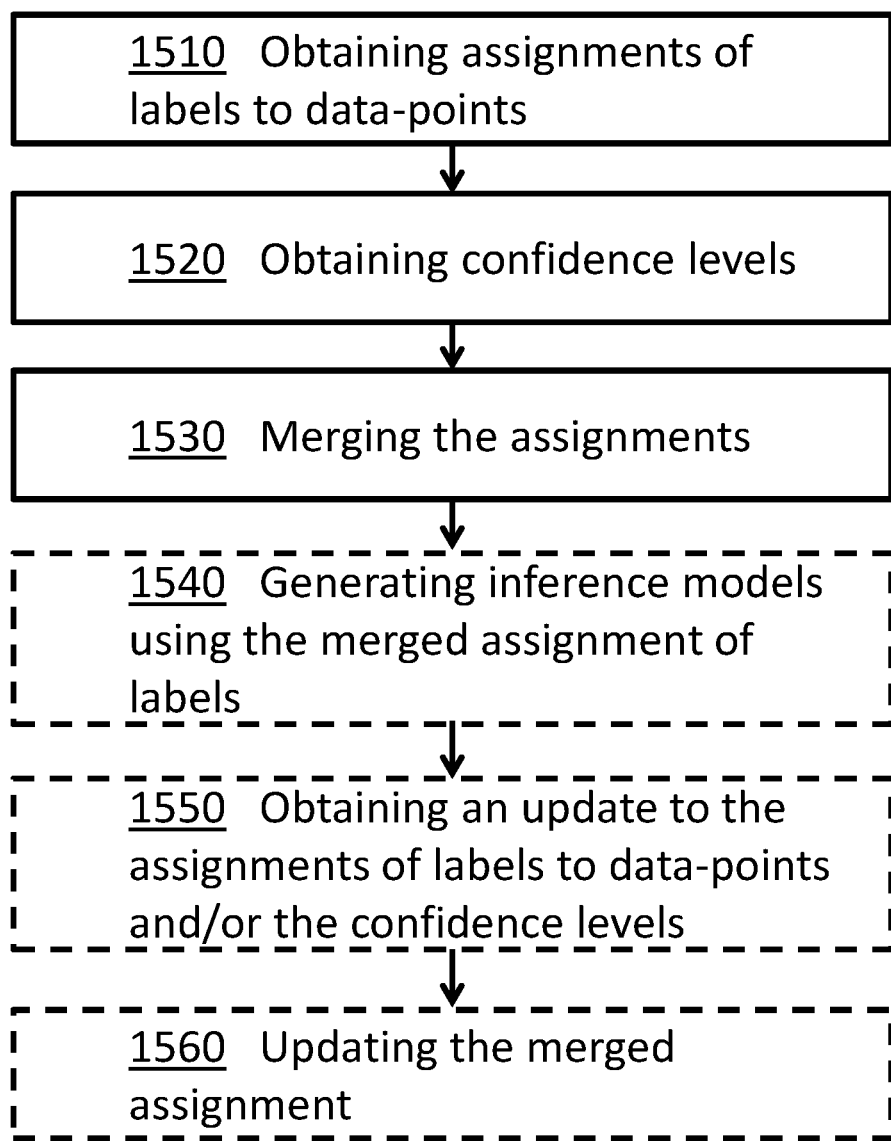
FIG. 15 illustrates an example of a process for merging annotations of datasets.

FIG. 15 illustrates an example of a process 1500 for merging annotations of datasets. In this example, process 1500 may comprise: obtaining assignments of labels to data-points (Step 1510); obtaining confidence levels (Step 1520); merging the assignments (Step 1530); generating inference models using the merged assignment of labels (Step 1540); obtaining an update to the assignments of labels to data-points and/or the confidence levels (Step 1550); and updating the merged assignment (Step 1560). In some implementations, process 1500 may comprise one or more additional steps, while some of the steps listed above may be modified or excluded. For example, in some cases Step 1540 and/or Step 1550 and/or Step 1560 may be excluded from process 1500. In some implementations, one or more steps illustrated in FIG. 15 may be executed in a different order and/or one or more groups of steps may be executed simultaneously and vice versa. While process 1500 is described with reference to labels, it will be understood by those skilled in the art that it may be applied to other types of annotations, including tags, desired outputs, and so forth.

In some embodiments, obtaining assignments of labels to data-points (Step 1510) may comprise obtaining an assignment of labels to a plurality of data-points, for example to data-points of datasets 610 and/or views 630. In some examples, Step 1510 may be repeated, for example obtaining a first assignment of labels to the plurality of data-points, a second assignment of labels to the plurality of data-points, a third assignment of labels to the plurality of data-points, and so forth. In some examples, at least part of the obtained assignment of labels to data-points may be read from memory (such as memory units 210, shared memory modules 410, and so forth). In another example, at least part of the obtained assignment of labels to data-points may be obtained from annotations 620 and/or views 630. In yet another example, at least part of the obtained assignment of labels to data-points may be received from external devices, for example using communication devices (such as communication modules 230, internal communication modules 440, external communication modules 450, and so forth). In another example, at least part of the obtained assignment of labels to data-points may be generated. For example, labels may be generated for data-points by an automatic label generation method, for example of algorithms 640. One example of such automatic label generation method may include process 1400. Another example of such automatic label generation method may include Step 1530 and/or other instances of process 1500. Yet another of automatic label generation method may include applying the data-points to an inference model, and using the output of the inference model for the data-points as the assigned labels. In yet another example of automatic label generation method, at least part of the obtained assignment of labels to data-points may be interpolated and/or extrapolated from labels assigned to other data-points (for example to neighboring data-points). In some examples, at least part of the obtained assignment of labels to data-points may be obtained from one or more users (such as human labelers, for example through a data annotation tool). In some examples, at least part of the obtained assignment of labels to data-points may be based, at least in part, on information captured using at least one sensor (such as audio sensors 250, image sensors 260, motion sensors 270, positioning sensors 275, barometers, pressure sensors, proximity sensors, electrical impedance sensors, electrical voltage sensors, electrical current sensors, and so forth), where in some cases the at least one sensor may be part of one or more external devices. For example, a data-point may comprise information captured using one or more sensors, and a label may comprise associated information captured using other sensors, for example from the same environment and/or at the same time.

In some examples, at least part of the obtained assignment of labels to data-points may comprise assignments of labels to data-points by a human labeler. For example, the human labeler may assign labels to data-points using a data annotation tool. In another example, the human labeler may select assignment of labels to data-points of a plurality of alternative assignments. In some examples, at least part of the obtained assignment of labels to data-points may comprise assignments of labels to data-points by an automated process, for example as described above. In some examples, at least part of the obtained assignment of labels to data-points may comprise assignment of distributions of labels to data-points. For example, a distribution of labels may comprise a plurality of labels, where each label is accompanied with the probability that this label is the label of the data-point. In some cases, the probabilities of all the labels for a data-point may sum to one, while in other cases, some scaled and/or estimated probabilities that do not sum to one may be used. For example, a plurality of labelers (which may include human labelers, automated labeling processes, and so forth) may suggest labels to a data-point, and the assigned label may comprise the distribution of the suggested labels. In some cases, a plurality of labelers (which may include human labelers, automated labeling processes, and so forth) may suggest labels to a data-point, and the assigned label may be selected through a voting mechanism.

In some examples, past performances of labelers (such as human labelers, automated labeling processes, and so forth) may be analyzed, and the above voting mechanism may give weights to labels according to the labelers past performances. For example, the analysis may determine that the past performances of a first labeler are better than the past performances of a second labeler, and therefore give higher weight to the suggested labels of the first labeler in the voting process and/or in the aggregation of the suggested labels into a distribution of labels. In another example, the analysis may determine that the past performances of a first labeler are better than the past performances of a second labeler when dealing with a first type of data-points and/or a first type of labels, but that the past performances of the second labeler are better than the past performances of the first labeler when dealing with a second type of data-points and/or a second type of labels, and therefore give higher weight to the suggested labels of the first labeler in the voting process and/or in the aggregation of the suggested labels into a distribution of labels when dealing with the first type of data-points and/or suggested labels of the first type of labels, but give higher weight to the suggested labels of the second labeler in the voting process and/or in the aggregation of the suggested labels into a distribution of labels when dealing with the second type of data-points and/or suggested labels of the second type of labels.

In some embodiments, obtaining confidence levels (Step 1520) may comprise obtaining confidence levels associated with the assignment of labels to data-points of Step 1510. In some examples, Step 1520 may be repeated, for example obtaining a first group of confidence levels associated with a first assignment of labels to data-points, obtaining a second group of confidence levels associated with a second assignment of labels to data-points, obtaining a third group of confidence levels associated with a third assignment of labels to data-points, obtaining a fourth group of confidence levels associated with the first assignment of labels to data-points, and so forth. In some examples, at least part of the confidence levels may be obtained using Step 1440. In another example, at least part of the confidence levels may be read from memory (such as memory units 210, shared memory modules 410, and so forth). In yet another example, at least part of the confidence levels may be received from external devices, for example using communication devices (such as communication modules 230, internal communication modules 440, external communication modules 450, and so forth). In another example, at least part of the confidence levels may be generated. In some examples, at least part of the confidence levels may be generated by an algorithm of algorithms 640. For example, Step 1510 may generate at least part of the labels by applying the data-points to an inference model, and using the output of the inference model for the data-points as the assigned labels, and in some cases the inference model may further output confidence levels corresponding to the labels. In another example, at least part of the confidence levels may be interpolated and/or extrapolated from confidence levels corresponding to other data-points and/or labels.

In some examples, at least part of the confidence levels associated with an assignment of labels may comprise an assignment of confidence levels to data-points, a function that maps data-points to confidence levels, and so forth. In some examples, at least part of the confidence levels may comprise information and/or be based on information obtained from one or more users. For example, human labelers may provide labels to Step 1510, and may further provide confidence levels for the labels they provide. In another example, supervisors of human labelers may assign confidence levels to the assignment of labels. In yet another example, manual quality assurance process may assign confidence levels to an assignment of labels. In some examples, at least part of the confidence levels may comprise information and/or be based on information obtained from automated processes, for example as described above. In some examples, past performances of labelers (such as human labelers, automated labeling processes, and so forth) may be analyzed, and the confidence levels may be selected based on the past performances of the labeler that produced at least part of the assignment of labels to data-points. For example, the analysis may determine that the past performances of a first labeler are better than the past performances of a second labeler, and therefore give higher confidence level to assignment of labels produced by the first labeler than to assignment of labels produced by the second labeler. In another example, the analysis may determine that the past performances of a first labeler are better than the past performances of a second labeler when dealing with a first type of data-points and/or a first type of labels, but that the past performances of the second labeler are better than the past performances of the first labeler when dealing with a second type of data-points and/or a second type of labels, and therefore give higher confidence level to assignment of labels produced by the first labeler than to assignment of labels produced by the second labeler when dealing with the first type of data-points and/or the first type of labels, but give higher confidence level to assignment of labels produced by the second labeler than to assignment of labels produced by the first labeler when dealing with the second type of data-points and/or the second type of labels. In some cases, a plurality of labelers (which may include human labelers, automated labeling processes, and so forth) may suggest labels to a data-point, the assigned label may be selected through a voting mechanism, and the confidence level may be calculated according to the distribution of the suggested labels, for example by taking the ratio of the selected label out of the total number of suggested labels as the confidence level, by taking the weighted ratio (for example, weighted according to the past performances of the labelers, as described above) of the selected label out of the total group of suggested labels as the confidence level, by taking a function of the number of repetitions of the selected label and the total number of suggested labels as the confidence level, and so forth. In some examples, the confidence levels associated with an assignment of labels may comprise a function that maps types of data-points and/or labels to confidence levels. For example, the confidence level associated with a type of data-points and/or a label may be selected based on the past performances of the labeler that created the assignment of labels when dealing with the type of data-points and/or the label.

In some embodiments, merging the assignments (Step 1530) may comprise generating a merged assignment of labels to the plurality of data-points, for example by merging two or more assignments of labels to the plurality of data-points obtained by Step 1510, for example using the confidence levels associated with the two or more assignments of labels obtained by Step 1520 and/or the content of the data-points. In some examples, each assignment of labels to the plurality of data-points may be associated with a confidence level, and the assignment of labels that corresponds to the highest confidence level may be selected. In some examples, each assignment of labels to the plurality of data-points may be associated with an assignment of confidence levels to data-points, and for each data-point the label assigned to the data-point that corresponds to the highest confidence level of the confidence levels assigned to the data-point may be selected. In some examples, the confidence levels associated with an assignment of labels may comprise a function that maps types of data-points and/or labels to confidence levels, and generating the merged assignment of labels to the plurality of data-points may be further based on an association of types with data-points and/or on the assigned labels and/or on the function, for example by assigning confidence level to each data-point using the type of the data-point and/or the assigned label and/or the function.

In some examples, the merged assignment of labels may be a result of maximizing (or minimizing) an objective function. Denote the confidence level assigned by the i-th assignment of labels to the j-th data-point, $conf(i, j)$, and denote the content of the j-th data-point, $d(j)$. For example, the objective function may be a function of the confidence levels and the content of the data-points, $f\_1(label(1), \ldots, label(J), d(1), \ldots, d(J), conf(1, 1), \ldots, conf(I, J))$, where I is the number of assignments of labels, J is the number of data-points, and $label(j)$ is the unknown label assigned to data-point j by the merged assignment of labels. In another example, the objective function may comprise an additively separable function comprising a continuity part and a confidence part, $f\_2(\text{label}(1), \ldots, \text{label}(J), d(1), \ldots, d(J))+f\_3(\text{label}(1), \ldots, \text{label}(J), \text{conf}(1, 1), \ldots, \text{conf}(I, J))$. For example, $f\_2$ may include a penalty for assigning different labels to nearby data-points, and $f\_3$ may include a penalty for assigning labels corresponding to lower confidence levels to data-points. In another example, $f\_3$ may comprise an additively separable function comprising a term for each data-point, $g\_i(\text{label}(i), \text{conf}(i, 1), \ldots, \text{conf}(i, J))$, and $f\_3 = g\_1 + \ldots + g\_I$. For example, $g\_i$ may be equal to a function $h\_i(\text{conf}(i, \text{label}(i)), \text{conf}(i, 1), \ldots, \text{conf}(i, J))$. For example, $h\_i$ may be equal to $J*\text{conf}(i, \text{label}(i))-\text{conf}(i, 1)- \ldots -\text{conf}(i, J)$. In another example, $h\_i$ may be equal to $J*z(\text{conf}(i, \text{label}(i)))-z(\text{conf}(i, 1))- \ldots -z(\text{conf}(i, J))$, for some monotonically increasing function $z$, such as $z(x)=x*x*x$, $z(x)=\text{sign}(x)*x*x$, and so forth.

In some embodiments, obtaining and/or using assignment of labels to data-points may require usage of quota. In some examples, process 1500 may obtain the confidence levels associated with an assignment of labels using Step 1520 first, select which assignments of labels to data-points to use based on the on the confidence levels and/or the content of the data-points and/or the remaining quota (for example, as described for Step 1530, using process 1700, etc.), and then use Step 1510 to obtain the assignments of labels to data-points that were selected. In some examples, process 1500 may obtain assignments of labels to data-points using Step 1510, obtain confidence levels associated with the assignment of labels using Step 1520, and select which assignments of labels to data-points to use based on the on the confidence levels and/or the content of the data-points and/or the assigned labels and/or the remaining quota (for example, as described for Step 1530, using process 1700, etc.). For example, a term may be added to an objective function (for example, to one of the objective functions described above) to minimize the usage of quota. In another example, a constraint that limits the quota used may be added to a minimization and/or maximization problems (for example, to the minimization and/or maximization problems described above).

In some examples, Step 1530 may determine that one or more of the plurality of data-points correspond to low quality merged assignment of labels. In response to said determination, process 1530 may provide a notification. For example, the notification may identify the data-points corresponding to low quality merged assignment of labels, may include a suggestion to improve at least one of the assignment of labels obtained by Step 1510 to the data-points corresponding to low quality merged assignment of labels, and so forth. For example, the notification may be provided to a user, to a system manager, to an external device, to a different process, through logs 660, and so forth. In some examples, the determination that a data-point corresponds to low quality merged assignment of labels may be based on the assignments of labels to the data-point of Step 1510 and/or to the confidence levels associated with the data-point of Step 1520. For example, a data-point may be identified as corresponding to low quality merged assignment of labels when two conflicting labels are assigned to the data-point with similarly high confidence levels, when the highest confidence level associated with the data-point is below a selected threshold, and so forth. In some examples, the determination that a data-point corresponds to low quality merged assignment of labels may be based on a value of a term in an objective function corresponding to the data-point, such as $g\_i$ and $h\_i$ described above. For example, a data-point may be identified as corresponding to low quality merged assignment of labels when the corresponding term is below a selected threshold, above a selected threshold, low in comparison to other terms of the objective function, high in comparison to other terms of the objective function, and so forth.

In some embodiments, generating inference models using the merged assignment of labels (Step 1540) may comprise applying the merged assignment of labels generated by Step 1530 to a machine learning algorithm to obtain an inference model, for example in a similar way to what described above (for example to what described above for Step 1420).

In some embodiments, obtaining an update to the assignments of labels to data-points and/or the confidence levels (Step 1550) may comprise obtaining an update to one or more assignments of labels to data-points obtained by Step 1510 and/or to one or more confidence levels associated with assignments of labels obtained by Step 1520. For example, Step 1550 may use Step 1510 to obtain one or more updated assignment of labels to data-points and/or use Step 1520 to obtain one or more updated confidence levels. In another example, modified parts of the assignments of labels and/or confidence levels may be obtained. For example, at least part of the modified parts may be read from memory (such as memory units 210, shared memory modules 410, and so forth). In another example, at least part of the modified parts may be received from external devices, for example using communication devices (such as communication modules 230, internal communication modules 440, external communication modules 450, and so forth). In some examples, at least part of the modified parts may be generated, for example in a similar way to what described above for Step 1510 and Step 1520.

In some embodiments, updating the merged assignment (Step 1560) may comprise updating the merged assignment of labels generated by Step 1530 according to the updated assignment of labels to data-points and/or updated confidence levels obtained by Step 1550. For example, Step 1530 may be used with the updated assignment of labels to data-points and/or updated confidence levels obtained by Step 1550 to generate the updated merged assignment of labels. In some examples, Step 1560 may compare the updated assignments of labels to data-points and/or updated confidence levels obtained by Step 1550 with the original assignments of labels to data-points obtained by Step 1510 and/or the original confidence levels obtained by Step 1520 to determine if the magnitude of the update is above some selected threshold. Further, in response to a magnitude of update that is above the selected threshold, Step 1560 may update the merged assignment of labels, and in response to a magnitude of update that is below the selected threshold, Step 1560 may withhold and/or forgo updating the merged assignment of labels.

In some examples, the updated merged assignment of labels generated by Step 1560 may be applied to a machine learning algorithm to obtain an updated inference model, for example by using Step 1540 with the updated merged assignment of labels. In some examples, the inference model generated by Step 1540 and/or the updated inference model generated by Step 1560 may be utilized, for example in a similar way to what described for Step 1050. In another example, the inference model and the updated inference model may be compared, for example using process 1000 and/or process 1100. In some cases, based on the result of the comparison, the updated inference model may be utilized (for example, using Step 1050), while in other cases the process may withhold and/or forgo the utilization of the updated inference model (for example, using Step 1060).

Figure 16:
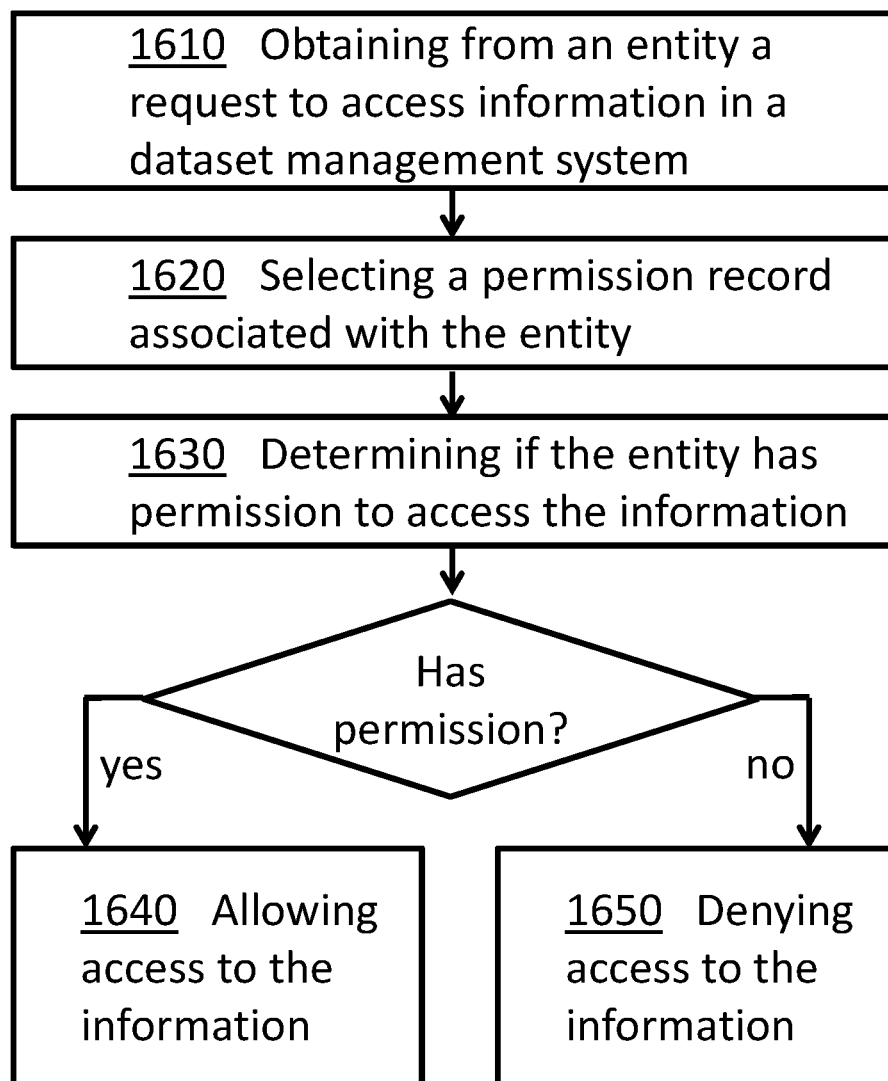
FIG. 16 illustrates an example of a process for controlling access in a dataset management system using permission records.

FIG. 16 illustrates an example of a process 1600 for controlling access in a dataset management system using permission records. In this example, process 1600 may comprise: obtaining from an entity a request to access information in a dataset management system (Step 1610); selecting a permission record associated with the entity (Step 1620); and determining if the entity has permission to access the information (Step 1630). Optionally, based on the determination, process 1600 may continue. In some examples, when the entity has permission to access the information, process 1600 may allow access to the information (Step 1640). In some examples, when the entity has no permission to access the information, process 1600 may deny access to the information (Step 1650). In some implementations, process 1600 may comprise one or more additional steps, while some of the steps listed above may be modified or excluded. In some implementations, one or more steps illustrated in FIG. 16 may be executed in a different order and/or one or more groups of steps may be executed simultaneously and vice versa.

In some embodiments, Step 1610 may comprise obtaining from an entity a request to access information in a dataset management system, such as a request to access at least part of datasets 610, annotations 620, views 630, and so forth. For example, at least part of the request may be read from memory (such as memory units 210, shared memory modules 410, and so forth). In another example, at least part of the request may be received from external devices, for example using communication devices (such as communication modules 230, internal communication modules 440, external communication modules 450, and so forth). In some examples, the entity may comprise an internal entity, an external entity, a user of the dataset management system, an automated process (such as one or more of processes 700, 800, 900, 1000, 1100, 1200, 1300, 1400, 1500, 1700 and 1800), an external device, and so forth. In some examples, the request to access information may comprise a request to read the information, a request to modify the information, a request to delete the information, and so forth. In some examples, the request to access information may comprise a request to train a machine learning algorithm using the information and/or a request to access the information for training a machine learning algorithm using the information, a request to apply the information to an inference model and/or a request to access the information for the evaluation of an inference model using the information, and so forth.

In some embodiments, Step 1610 may further comprise verifying the identity of the entity. In some examples, the request may be digitally signed (for example, cryptographically) by the entity, and the digital signature of the entity may be authenticated. In some examples, the identity of the entity may be authenticated by a third party. In some examples, a secure communication line to the entity may be used, and the communication line may be verified. In some cases, when the verification of the identity of the entity fails, process 1600 may forgo the performance of one or more steps, such as Step 1620 and/or Step 1630 and/or Step 1640. In some cases, when the verification of the identity of the entity fails, process 1600 may deny the access to the information, for example using Step 1650. In some cases, when the verification of the identity of the entity fails, process 1600 may provide a notification, for example in a response to the request, to the entity, to a user, to a system manager, through logs 660, and so forth.

In some embodiments, selecting a permission record associated with the entity (Step 1620) may comprise selecting a permission record associated with the entity of Step 1610 of a plurality of permission records (such as permission records of permissions 680). For example, at least part of the plurality of permission records may be stored in memory (such as memory units 210, shared memory modules 410, and so forth). In another example, at least part of the plurality of permission records may be maintained by an external device and accessed using communication devices (such as communication modules 230, internal communication modules 440, external communication modules 450, and so forth). In some examples, the plurality of permission records may be associated with a plurality of entities (for example through a data structure, in a database, etc.), and the permission record associated with the entity of Step 1610 may be selected (for example by retrieving the record from the data structure, the database, etc.). For example, each permission record may be associated with a group of entities, and the permission record that corresponds to the smallest group of entities and contains the entity of Step 1610 may be selected. In some examples, a permission record associated with the entity of Step 1610 and the information of Step 1610 may be selected. For example, each permission record may be associated with an entity (as described above) and/or a record of the dataset management system, and a permission record associated with the entity and the record of the dataset management system containing the information may be selected. In another example, each permission record may be associated with a group of entities (as described above) and/or a group of records of the dataset management system, and a the permission record that corresponds to a group of entities that contains the entity of Step 1610 and/or a group of records that contains the information may be selected. In some examples, the request to access information of Step 1610 may be associated with a machine learning algorithm (as described above), and a permission record associated with the entity and the machine learning algorithm may be selected. For example, each permission record may be associated with an entity (as described above) and/or a machine learning algorithm, and the permission record associated with the entity of Step 1610 and/or the machine learning algorithm associated with the request may be selected. In some examples, the request to access information of Step 1610 may be associated with a second entity (such as an owner and/or a creator of the information of Step 1610), and a permission record associated with the entity of Step 1610 and the second entity may be selected.

In some embodiments, Step 1620 may further comprise verifying the selected permission record. In some examples, the selected permission record may be digitally signed (for example, cryptographically) by a permissions authenticator, and the digital signature of the permissions authenticator may be verified. In some examples, a secure communication line to a permissions authenticator may be used to inquire the permissions authenticator about the permission record, and the permissions authenticator may confirm or decline the permission record. In some cases, when the verification of the permission record fails, process 1600 may forgo the performance of one or more steps (such as Step 1630 and/or Step 1640), may deny access to the information (for example using Step 1650), may provide a notification (for example in a response to the request, to the entity, to a user, to a system manager, through logs 660, etc.), and so forth.

In some embodiments, determining if the entity has permission to access the information (Step 1630) may comprise using the permission record selected by Step 1620 to determine if the entity of Step 1610 has permission to access the information. For example, the selected permission record may be analyzed to determine if the entity has permission to access the information, has permission for the requested type of access to the information, has permission to access records of the dataset management system that contains the information, has permission to use the information with a selected machine learning algorithm, has permission to use the information with a selected inference model, has permission to use the information with a selected computer function, has permission to access information associated with a second entity, and so forth. In some examples, Step 1630 may further determine if the entity has sufficient quota to access the information, for example using process 1700, using Step 1730, and so forth.

In some examples, when Step 1630 determines that the entity has permission to access the information, the flow of process 1600 may continue to allow access to the information (Step 1640). In some examples, when Step 1630 determines that the entity has no permission to access the information, the flow of process 1600 may continue to deny access to the information (Step 1650). In some examples, when Step 1630 determines that the entity has permission to access the information and has sufficient quota to access the information, the flow of process 1600 may continue to allow access to the information (Step 1640). In some examples, when Step 1630 determines that the entity has no permission to access the information and/or has insufficient quota to access the information, the flow of process 1600 may continue to deny access to the information (Step 1650) and/or to deny the request (Step 1750).

In some examples, allowing access to the information (Step 1640) may comprise allowing access to the information of Step 1610 to the entity of Step 1610. For example, according to the access request and/or the permission, at least part of the information may be provided, for example by providing a memory address of a location in a memory unit holding the at least part of the information, by transmitting the at least part of the information to the entity (for example using communication devices, over a computer network, etc.), and so forth. In another example, according to the access request and/or the permission, at least part of the information may be modified, for example according to instructions received from the entity. In yet another example, according to the access request and/or the permission, at least part of the information may be deleted. In another example, according to the access request and/or the permission, at least part of the information may be applied to a selected machine learning algorithm, to a selected inference model, to a selected computer function, and so forth. Further, the resulting outputs may be provided to the entity, for example through a memory unit, transmitted using communication devices, transmitted over a computer network, and so forth. In yet another example, according to the access request and/or the permission, at least part of the information may be used by process 700, process 800, process 900, process 1000, process 1100, process 1200, process 1300, process 1400, process 1500, process 1700, process 1800, and so forth. In some examples, Step 1640 may logging the allowed access and/or the actual access in logs 660.

In some embodiments, denying access to the information (Step 1650) may comprise withholding and/or forgoing allowing the access to the information of Step 1610 to the entity of Step 1610. In some examples, Step 1650 may log the denied access in logs 660. In some examples, Step 1650 may provide an indication associated with the denied access, for example to the entity of Step 1610, to a user, to a system manager, and so forth. For example, the provided indication may comprise a suggestion to acquire permission to access the information, possibly together with information on how to acquire the permission, together with a tool for acquiring the permission, and so forth. In another example, the provided indication may comprise a suggestion to contact an owner of the information, possibly together with the contact information of the owner (such as name, email, phone number, address, etc.), together with a tool for contacting the owner, and so forth.

In some examples, the information of Step 1610 may comprise a dataset, and the indication provided by Step 1650 may comprise a suggestion of at least one substitute dataset (for example, one substitute dataset may be suggested, a plurality of possible substitute datasets may be suggested, and so forth). In some examples, the at least one substitute dataset may be selected of a plurality of alternative datasets (for example, from datasets 610), for example based on similarity between the dataset of the information of Step 1610 and the alternative datasets. For example, a selected number of the most similar datasets of the plurality of alternative datasets may be selected as the at least one substitute dataset. In another example, all datasets with a similarity score higher than a selected threshold may be selected as the at least one substitute dataset. For example, the similarity between the dataset and an alternative dataset may be based on a statistical distance (such as f-divergence, Kullback-Leibler divergence, Hellinger distance, Total variation distance, Rényi's divergence, Jensen-Shannon divergence, Lévy-Prokhorov metric, Bhattacharyya distance, Kantorovich metric, Tsallis divergence, etc.) between the distribution of elements in the dataset and the distribution of elements in the alternative dataset. In another example, the similarity between the dataset and an alternative dataset may be based on similarity between annotations associated with the dataset and annotations associated with the alternative dataset.

In some examples, the information of Step 1610 may comprise a record of annotations, and the provided indication may comprise a suggestion of at least one substitute record of annotations (for example, one substitute record of annotations may be suggested, a plurality of possible substitute records of annotations may be suggested, and so forth). In some examples, the at least one substitute record of annotations may be selected of a plurality of alternative records of annotations (for example, from annotations 620), for example based on similarity between the record of annotations of the information of Step 1610 and the alternative records of annotations. For example, a selected number of the most similar records of annotations of the plurality of alternative records of annotations may be selected as the at least one substitute record of annotations. In another example, all records of annotations with a similarity score higher than a selected threshold may be selected as the at least one substitute record of annotations. In another example, the similarity between the record of annotations and an alternative record of annotations may be based on a statistical distance (such as f-divergence, Kullback-Leibler divergence, Hellinger distance, Total variation distance, Rényi's divergence, Jensen-Shannon divergence, Lévy-Prokhorov metric, Bhattacharyya distance, Kantorovich metric, Tsallis divergence, etc.) between the distribution of labels in the record of annotations and the distribution of labels in the alternative record of annotations. In another example, records of annotations with similar and/or identical label names and/or tag names to the label names and/or tag names of the requested record of annotations may be selected as the at least one substitute record of annotations.

Figure 17:
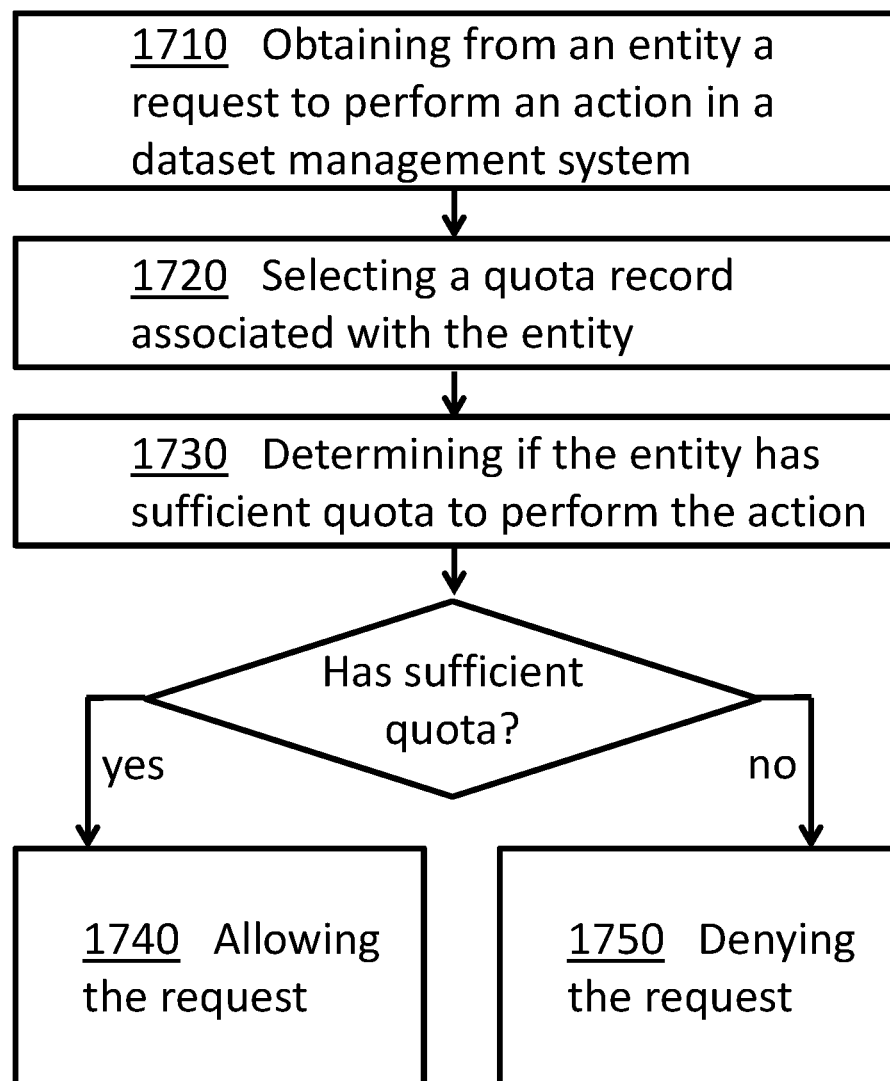
FIG. 17 illustrates an example of a process for controlling access in a dataset management system using quotas.

FIG. 17 illustrates an example of a process for controlling access in a dataset management system using quotas. In this example, process 1700 may comprise: obtaining from an entity a request to perform an action in a dataset management system (Step 1710); selecting a quota record associated with the entity (Step 1720); and determining if the entity has sufficient quota to perform the action (Step 1730). Optionally, based on the determination, process 1700 may continue. In some examples, when the entity has sufficient quota to perform the action, process 1700 may allow the request (Step 1740). In some examples, when the entity has insufficient quota to perform the action, process 1700 may deny the request (Step 1750). In some implementations, process 1700 may comprise one or more additional steps, while some of the steps listed above may be modified or excluded. In some implementations, one or more steps illustrated in FIG. 17 may be executed in a different order and/or one or more groups of steps may be executed simultaneously and vice versa.

In some embodiments, Step 1710 may comprise obtaining from an entity a request to perform an action in a dataset management system, such as a request to perform an action using information from the dataset management system (for example, using at least part of datasets 610, annotations 620, views 630, and so forth). For example, at least part of the request may be read from memory (such as memory units 210, shared memory modules 410, and so forth). In another example, at least part of the request may be received from external devices, for example using communication devices (such as communication modules 230, internal communication modules 440, external communication modules 450, and so forth). In some examples, the entity may comprise an internal entity, an external entity, a user of the dataset management system, an automated process (such as one or more of processes 700, 800, 900, 1000, 1100, 1200, 1300, 1400, 1500, 1600 and 1800), an external device, and so forth. In some examples, the requested action may comprise training a machine learning algorithm using information from the dataset management system, applying information from the dataset management system to an inference model, calculating statistics about information from the dataset management system, obtaining information from the dataset management system, modifying information in the dataset management system, storing information in the dataset management system, and so forth.

In some embodiments, Step 1710 may further comprise verifying the identity of the entity. In some examples, the request may be digitally signed (for example, cryptographically) by the entity, and the digital signature of the entity may be authenticated. In some examples, the identity of the entity may be authenticated by a third party. In some examples, a secure communication line to the entity may be used, and the communication line may be verified. In some cases, when the verification of the identity of the entity fails, process 1700 may forgo the performance of one or more steps, such as Step 1720 and/or Step 1730 and/or Step 1740. In some cases, when the verification of the identity of the entity fails, process 1700 may deny the request, for example using Step 1750. In some cases, when the verification of the identity of the entity fails, process 1700 may provide a notification, for example in a response to the request, to the entity, to a user, to a system manager, through logs 660, and so forth.

In some embodiments, selecting a quota record associated with the entity (Step 1720) may comprise selecting a quota record associated with the entity of Step 1710 of a plurality of quota records. In some examples, a quota record may comprise amounts of remaining quota, obligated quota, remaining budget, obligated budget, and so forth. In some examples, at least part of the plurality of quota records may be stored in memory (such as memory units 210, shared memory modules 410, and so forth). In another example, at least part of the plurality of quota records may be maintained by an external device and accessed using communication devices (such as communication modules 230, internal communication modules 440, external communication modules 450, and so forth). In some examples, the plurality of quota records may be associated with a plurality of entities (for example through a data structure, in a database, etc.), and the quota record associated with the entity of Step 1710 may be selected (for example, by retrieving the record from the data structure, the database, etc.). In some examples, an entity may be associated with more than one quota records in the plurality of quota records, and Step 1720 may select one of the quota records associated with the entity, select the quota record with the highest quota of the quota records associated with the entity, combine the quota records associated with the entity into one quota record, and so forth. In some examples, a quota record associated with the entity of Step 1710 and the action of Step 1710 may be selected. In some examples, a quota record associated with the entity of Step 1710 and information associated with the action of Step 1710 may be selected. For example, each quota record may be associated with an entity and/or an action, and a quota record associated with the entity and the action may be selected. In another example, the requested action may comprise training a machine learning algorithm using information from the dataset management system, and the selected quota record may be associated with the entity of Step 1710 and/or the machine learning algorithm and/or the information. In yet another example, the requested action may comprise applying information from the dataset management system to an inference model, and the selected quota record may be associated with the entity of Step 1710 and/or the inference model and/or the information. In another example, the requested action may comprise calculating statistics about information from the dataset management system, and the selected quota record may be associated with the entity of Step 1710 and/or the statistical tool and/or the information. In yet another example, the requested action may comprise accessing information in the dataset management system, and the selected quota record may be associated with the entity of Step 1710 and/or the type of access (for example, obtaining information, modifying information, deleting information, storing information, etc.) and/or the information and/or the type of information. In another example, the requested action may be associated with a second entity (such as an owner and/or a creator of information to be used, of an algorithm to be used, etc.), and the selected quota record may be associated with the entity of Step 1710 and/or the second entity.

In some embodiments, Step 1720 may further comprise verifying the selected quota record. In some examples, the selected quota record may be digitally signed (for example, cryptographically) by a quota records authenticator, and the digital signature of the quota records authenticator may be verified. In some examples, a secure communication line to a quota records authenticator may be used to inquire the quota records authenticator about the quota record, and the quota records authenticator may confirm or decline the quota record. In some cases, when the verification of the quota record fails, process 1700 may forgo the performance of one or more steps (such as Step 1730 and/or Step 1740), may deny the request (for example using Step 1750), may provide a notification (for example in a response to the request, to the entity, to a user, to a system manager, through logs 660, etc.), and so forth.

In some embodiments, determining if the entity has sufficient quota to perform the action (Step 1730) may comprise using the quota record selected by Step 1720 to determine if the entity of Step 1710 has sufficient quota to perform the requested action. In some examples, the selected quota record may be analyzed to determine if the entity has sufficient quota to perform the requested action. In some examples, a quota requirement and/or a price associated with the requested action may be obtained, and the quota requirement and/or price may be compared with the remaining quota and/or remaining budget in the quota record to determine if the entity has sufficient quota to perform the action. For example, the quota requirement and/or price associated with the requested action may be calculated according to a function that estimates quota requirements and/or prices, according to a table and/or a data structure that associate actions with quota requirements and/or prices, and so forth. In another example, the requested action may comprise performing a machine learning training task, an estimation of the processing resources requirements required for the machine learning training task may be obtained (for example, using process 1200 and/or Step 1230), and the quota requirement and/or a price associated with the requested action may be calculated using the estimated processing resources requirements. In yet another example, the requested action may comprise a usage of an inference model, quota requirement and/or a price associated with the requested action may be calculated, for example based on the identity of the inference model (for example according to a price list, through a bidding process, etc.) and/or the information required to evaluate the inference model. In another example, the requested action may comprise accessing information in the dataset management system, quota requirement and/or a price associated with the requested action may be calculated, for example based on the type of requested access (such as obtaining information, modifying information, deleting information, storing information, buying information), the type of information (data samples, annotations, datasets, etc.), the amount of information to be accessed (for example, in bytes, megabytes, gigabytes, number of examples, number of annotations, etc.), and so forth. The quota requirement and/or a price associated with the access to the information may be calculated using a price list, through a bidding process, by requesting a quote from an external entity (for example, from an entity associated with the information, such as an owner and/or creator of the information), and so forth. In some examples, the quota requirement and/or price may comprise a distribution of estimated quota requirements and/or a distribution of estimated prices, a probability that the remaining quota and/or the remaining budget in the quota record is sufficient for the action may be calculated according to the distributions, the calculated probability may be compared with a selected threshold, and Step 1730 may determine that the entity has sufficient quota to perform the action when the calculated probability is higher than the selected threshold. In some examples, Step 1730 may further determine if the entity has permission to perform the action and/or to access the information required for performing the action, for example using process 1600, using Step 1630, and so forth.

In some examples, when Step 1730 determines that the entity has sufficient quota to access the information, the flow of process 1700 may continue to allow the request (Step 1740). In some examples, when Step 1730 determines that the entity has insufficient quota to access the information, the flow of process 1700 may continue to deny the request (Step 1750). In some examples, when Step 1730 determines that the entity has sufficient quota to access the information and has permission to access the information, the flow of process 1700 may continue to allow access to the information (Step 1740). In some examples, when Step 1730 determines that the entity has insufficient quota to access the information and/or has no permission to access the information, the flow of process 1700 may continue to deny the request (Step 1750) and/or to deny access to the information (Step 1650).

In some embodiments, allowing the request (Step 1740) may comprise allowing the performance of the action of the request of Step 1710. For example, the action may be performed, for example using information from the dataset management system (such as datasets 610, annotations 620, views 630, and so forth). In another example, access to information required for the performance of the action may be provided (for example, using Step 1640). In yet another example, according to the request, information from the dataset management system (for example, from datasets 610, annotations 620, views 630, etc.) may be applied to a selected machine learning algorithm, to a selected inference model, to a selected computer function, and so forth. Further, the resulting outputs may be provided to the entity, for example through a memory unit, transmitted using communication devices, transmitted over a computer network, and so forth. In another example, according to the request, an algorithm of algorithms 640 may be used. In yet another example, according to the request, a task of tasks 650 may be performed. In another example, according to the request, a process may be executed (such as process 700, process 800, process 900, process 1000, process 1100, process 1200, process 1300, process 1400, process 1500, process 1800, and so forth). In some examples, Step 1740 may comprise logging the allowed request and/or the performance of the requested action in logs 660. In some examples, Step 1740 may update the quota record selected by Step 1720. For example, the obligated quota and/or the obligated budget of the quota record may be updated according to a quota requirement and/or a price associated with the allowed action (for example, according to the quota requirement and/or price determined by Step 1730), according to an estimated quota requirement and/or an estimated price of the allowed action (for example, as estimated by Step 1730), and so forth. In some examples, the remaining quota and/or remaining budget of the quota record may be updated according to a quota requirement and/or a price associated with the allowed action, for example after the performance of the action. For example, the actual resources used in the performance of the action may be measured, an actual quota requirement and/or an actual price may be calculated for the action according to the actual resources used, and the remaining quota and/or the remaining price may be updated according to the actual quota requirement and/or the actual price. In another example, the remaining quota and/or the remaining price may be updated according to an estimated quota requirement and/or an estimated price of the performed action (for example, as estimated by Step 1730). In some examples, once the remaining quota and/or the remaining price are updated with respect to a performed action, the obligated quota and/or the obligated budget may be updated to free the obligation associated with the performed action.

In some embodiments, denying the request (Step 1750) may comprise denying the request to perform an action of Step 1710. For example, Step 1750 may withhold and/or forgo the performance of the action. In another example, Step 1750 may withhold and/or forgo allowing access to information required for the performance of the action (for example, using Step 1650). In yet another example, Step 1750 may remove the requested action from a project schedule record, may delete a task associated with the requested action from tasks 650, and so forth. In some examples, Step 1750 may log the denied request in logs 660. In some examples, Step 1750 may provide an indication associated with the denied request, for example to the entity of Step 1710, to a user, to a system manager, and so forth. For example, the provided indication may comprise a suggestion to acquire additional quota and/or to increase the budget, possibly together with a tool for acquiring the quota and/or for increasing the budget. In another example, the provided indication may comprise a suggestion to contact an account manager, possibly together with the contact information of the account manager (such as name, email, phone number, address, etc.), together with a tool for contacting the account manager, and so forth.

In some examples, the provided indication may comprise a suggestion of at least one substitute action. In some examples, the at least one substitute action may be selected of a plurality of alternative actions (for example, from algorithm 640 and/or tasks 650), for example based on similarity between the requested action of Step 1710 and the alternative actions. For example, the most similar action of the plurality of alternative actions may be selected as the at least one substitute action. In another example, all actions with a similarity score higher than a selected threshold may be selected as the at least one substitute action.

In some examples, the action of Step 1710 may comprise access to a dataset, and the indication provided by Step 1750 may comprise a suggestion of at least one substitute dataset (for example, one substitute dataset may be suggested, a plurality of possible substitute datasets may be suggested, and so forth). In some examples, the at least one substitute dataset may be selected of a plurality of alternative datasets (for example, from datasets 610), for example based on similarity between the dataset associated with the action and the alternative datasets. For example, a selected number of the most similar datasets of the plurality of alternative datasets may be selected as the at least one substitute dataset. In another example, all datasets with a similarity score higher than a selected threshold may be selected as the at least one substitute dataset. For example, the similarity between the dataset associated with the action and an alternative dataset may be based on a statistical distance (such as f-divergence, Kullback-Leibler divergence, Hellinger distance, Total variation distance, Rényi's divergence, Jensen-Shannon divergence, Lévy-Prokhorov metric, Bhattacharyya distance, Kantorovich metric, Tsallis divergence, etc.) between the distribution of elements in the dataset associated with the action and the distribution of elements in the alternative dataset. In another example, the similarity between the dataset and an alternative dataset may be based on similarity between annotations associated with the dataset associated with the action and annotations associated with the alternative dataset.

In some examples, the action of Step 1710 may comprise access to a record of annotations, and the provided indication may comprise a suggestion of at least one substitute record of annotations (for example, one substitute record of annotations may be suggested, a plurality of possible substitute records of annotations may be suggested, and so forth). In some examples, the at least one substitute record of annotations may be selected of a plurality of alternative records of annotations (for example, from annotations 620), for example based on similarity between the record of annotations associated with the action and the alternative records of annotations. For example, a selected number of the most similar records of annotations of the plurality of alternative records of annotations may be selected as the at least one substitute record of annotations. In another example, all records of annotations with a similarity score higher than a selected threshold may be selected as the at least one substitute record of annotations. In another example, the similarity between the record of annotations associated with the action and an alternative record of annotations may be based on a statistical distance (such as f-divergence, Kullback-Leibler divergence, Hellinger distance, Total variation distance, Rényi's divergence, Jensen-Shannon divergence, Lévy-Prokhorov metric, Bhattacharyya distance, Kantorovich metric, Tsallis divergence, etc.) between the distribution of labels in the record of annotations associated with the action and the distribution of labels in the alternative record of annotations. In another example, records of annotations with similar and/or identical label names and/or tag names to the label names and/or tag names of the requested record of annotations may be selected as the at least one substitute record of annotations.

Figure 18:
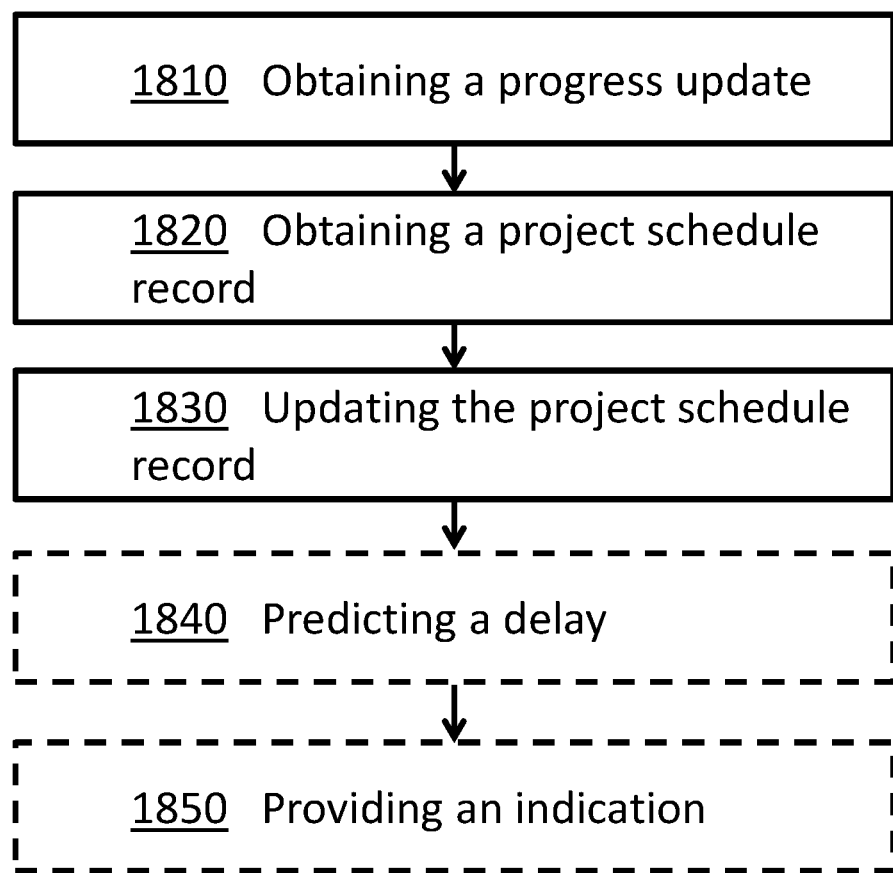
FIG. 18 illustrates an example of a process for maintaining a project schedule in a dataset management system.

FIG. 18 illustrates an example of a process 1800 for maintaining a project schedule in a dataset management system. In this example, process 1800 may comprise: obtaining a progress update (Step 1810); obtaining a project schedule record (Step 1820); updating the project schedule record (Step 1830); predicting a delay (Step 1840); and providing an indication (Step 1850). In some implementations, process 1800 may comprise one or more additional steps, while some of the steps listed above may be modified or excluded. For example, in some cases Step 1840 and/or Step 1850 may be excluded from process 1800. In another example, in some cases Step 1810 and/or Step 1820 and/or Step 1830 may be excluded from process 1800. In some implementations, one or more steps illustrated in FIG. 18 may be executed in a different order and/or one or more groups of steps may be executed simultaneously and vice versa.

In some embodiments, obtaining a progress update (Step 1810) may comprise obtaining a progress update related to an action, for example related to an action involving data maintained by a dataset management system. For example, such action may comprise performing an algorithm of algorithms 640 and/or a task of tasks 650, for example using data from datasets 610 and/or annotations 620 and/or views 630. In some examples, at least part of the progress update may be read from memory (such as memory units 210, shared memory modules 410, and so forth). In another example, at least part of the progress update may be received from external devices (for example, from an external device performing the action and/or involved in performing the action), for example using communication devices (such as communication modules 230, internal communication modules 440, external communication modules 450, and so forth). In yet another example, the action may comprise performing a process (such as one or more of processes 700, 800, 900, 1000, 1100, 1200, 1300, 1400, 1500, 1600 and 1700), and in some cases the progress update may be obtained from the process and/or from a device performing the process. In another example, the progress update may be obtained by analyzing log 660 to determine a status of an action. In yet another example, logs 660 may be updated according to the progress update.

In some examples, the progress update may be related to an action comprising training of a machine learning algorithm (for example with selected hyper-parameters), and the progress update may comprise indications of the status of the training. For example, the progress update may comprise intermediate results and/or intermediate status of the training task, for example as obtained by Step 1310. In some examples, the progress update may be related to an action comprising usage of an inference model, for example comprising applying information to the inference model, and the progress update may comprise indications of the status of the action. For example, the information to be applied to the inference model may comprise a plurality of data-points, and the status may comprise the number and/or ratio of data-points already applied to the inference model, the number and/or ratio of data-points waiting to be applied to the inference model, the outputs (and/or statistics about the outputs) of the inference model for the data-points already applied, and so forth. In some examples, the progress update may be related to an action comprising minimizing and/or maximizing an objective function (for example, an objective function based on data from datasets 610 and/or annotations 620 and/or views 630), and the progress update may comprise indications of the status of the minimization and/or maximization. For example, the progress update may comprise intermediate results and/or intermediate status of minimization and/or maximization, such as objective value, iteration number, gradient at the intermediate result, last step size, rate of convergence, and so forth.

In some examples, the progress update may comprise indications of failures. For example, the progress update may comprise error codes and/or logs associated with the failure. For example, the failure may be due to a missing and/or incompatible software (for example, missing software license, old software version, etc.), incompatible hardware (for example, insufficient memory, missing GPU, etc.), insufficient available processing resources for a machine learning training task (for example, insufficient for the estimated processing resources requirement determined by process 1230), and so forth. In another example, the failure may be due to missing and/or incompatible and/or insufficient permission and/or quota, for example as determined by process 1600 and/or process 1700. In yet another example, the failure may be due to missing and/or incompatible and/or insufficient data (for example, dataset with too few examples for a selected machine learning algorithm, dataset with no or insufficient annotations, annotations that are incompatible with a training task, and so forth). In another example, the failure may be due to a failure of a machine learning algorithm and/or of an optimization tool to converge. In yet another example, the failure may be due to a bug. In another example, the failure may be due to bad scaling of information. In yet another example, the failure may be due to a matrix that is singular or close to singular.

In some embodiments, Step 1810 may determine that an amount associated with the progress update is below a selected threshold, and in response may withhold and/or forgo Step 1820 and/or Step 1830 and/or Step 1840 and/or Step 1850. For example, the progress update may be related to training of a machine learning algorithm, and the amount associated with the progress update may include an amount of change in a value of a loss function, an amount of change in the results, a number of iterations of the machine learning algorithm, and so forth. In another example, the progress update may be related to applying data-points to an inference model, and the amount associated with the progress update may include an amount of data-points applied, a number and/or a ration of results of a certain category obtained, and so forth. In yet another example, the progress update may be related to minimizing and/or maximizing an objective function, and the amount associated with the progress update may include an amount of change in a value of an objective function, an amount of iterations performed, sizes of last steps, and so forth.

In some embodiments, Step 1820 may comprise obtaining a project schedule record. For example, at least part of the project schedule record may be read from memory (such as memory units 210, shared memory modules 410, and so forth). In another example, at least part of the project schedule record may be received from an external device, for example using communication devices (such as communication modules 230, internal communication modules 440, external communication modules 450, and so forth). In some examples, Step 1820 may select the project schedule record of a plurality of alternative project schedule records, for example based on the progress update of Step 1810, based on an action and/or a task associated with the progress update, based on a type of action and/or a type of task associated with the progress update, based on an entity associated with the progress update, based on a device and/or an entity that provided the progress update, and so forth. In some examples, the project schedule record may comprise one or more tasks, for example of tasks 650. In some cases, the project schedule record may further detail preferred and/required execution details of the tasks, such as devices and/or an entities to perform the tasks. In some cases, the project schedule record may further comprise relations among the tasks. Some examples of relations between two tasks may include a task that must finish before the other task begins, a task that can start only after the other task is completed, a task that must start before the other task begins, a task that can only start after the other task starts, a task that can finish only after the other task starts, a task that must start before the other task can finish, a task that can only finish after the other task is completed, a task that must finish before the other task in complete, and so forth. In some examples, a task may depend on results and/or intermediate results of another task. For example using the results and/or intermediate results as input to the task. In another example, the execution of the task may be controlled based on the results and/or intermediate results (for example, forgoing the performance of the task in response to some results and/or intermediate results, selecting a device to perform the task based on the results and/or intermediate results, modifying parameters and/or hyper-parameters of the task based on the results and/or intermediate results, etc.), and so forth.

In some examples, the project schedule record may comprise one or more tasks of training machine learning algorithms (for example of algorithms 640), for example using some selected hyper-parameters and/or using data from datasets 610 and/or annotations 620 and/or views 630. In some examples, the project schedule record may comprise one or more tasks of using inference models, for example of applying data from datasets 610 and/or annotations 620 and/or views 630 to the inference model. In some examples, the project schedule record may comprise one or more tasks of performing a process (such as one or more of processes 700, 800, 900, 1000, 1100, 1200, 1300, 1400, 1500, 1600 and 1700). In some examples, the project schedule record may comprise one or more tasks of minimizing and/or maximizing an objective function, for example using some selected optimization method and/or selected hyper-parameters for the optimization method. For example, the objective function may be based on data from datasets 610 and/or annotations 620 and/or views 630.

In some embodiments, updating the project schedule record (Step 1830) may comprise updating the project schedule record obtained by Step 1820 based on the progress update obtained by Step 1810. In some examples, the updated project schedule record may be stored in memory (such as memory units 210, shared memory modules 410, and so forth) in addition to or instead of the project schedule record obtained by Step 1820. In some examples, the updated project schedule record may be provided to external devices, for example using communication devices (such as communication modules 230, internal communication modules 440, external communication modules 450, and so forth).

In some examples, the progress update may comprise an indication of a completion of a task, and in response Step 1830 may mark the task as completed in the project schedule record and/or logs 660, mark other tasks as ready to be started in the project schedule record and/or cause the other tasks to be started (for example, the other tasks may comprise tasks that can start only after the task of the progress update is completed), signal to some active tasks that they may finish (for example, to active tasks that can finish only after the task of the progress update is completed), and so forth. In some examples, the progress update may comprise an indication of a beginning of a task, and in response Step 1830 may mark the task as started in the project schedule record and/or logs 660, mark other tasks as ready to be started in the project schedule record and/or cause the other tasks to be started (for example, the other tasks may comprise tasks that can start only after the task of the progress update starts), signal to some active tasks that they may finish (for example, to active tasks that can finish only after the task of the progress update starts), and so forth.

In some examples, the progress update may comprise results and/or intermediate results of a task, and in response Step 1830 may cause the results and/or the intermediate results and/or information based on the results and/or information based on the intermediate results to be provided to another task (for example, to be used as input data). In some examples, the progress update may comprise results and/or intermediate results of a task, and Step 1830 may use the results and/or the intermediate results to control the execution of another task (for example, by updating the project schedule record accordingly), for example forgoing the performance of the other task in response to some results and/or the intermediate results, selecting a device to perform the other task based on the results and/or the intermediate results, setting and/or modifying parameters and/or hyper-parameters of the other task based on the results and/or the intermediate results (for example, setting hyper-parameters of a machine learning algorithm associated with the other task), and so forth.

In some examples, the progress update may be related to an action involving a dataset and/or an annotation, such as creating the dataset and/or annotation, modifying the dataset and/or annotation, deleting the dataset and/or annotation, using information from the dataset and/or annotation, and so forth. Further, project schedule record and/or elements of a project schedule record that correspond to said dataset and/or annotation may be selected by Step 1820 and/or updated by Step 1830. For example, an element of a project schedule record may be selected of a plurality of alternative elements of the project schedule record corresponding to different datasets and/or annotations based on the identity of the dataset and/or annotation related to the action, and the selected element may be updated according to the type of the action, properties of the action, the results of the action, and so forth. For example, the action may involve addition of elements to the dataset and/or annotation, and the update of the project schedule record and/or the element of the project schedule record may be based on the number of elements added, the types of added elements, the content of the added elements, and so forth. In another example, the action may involve deletion of elements from the dataset and/or annotation, and the update may be based on the number of elements deleted, the types of deleted elements, the content of the deleted elements, and so forth. In yet another example, the action may involve modifying elements in the dataset and/or annotation, and the update may be based on the number of elements modified, the types of modified elements, the content of the modified elements, the modified information, and so forth. In another example, the action may involve obtaining information from elements in the dataset and/or annotation, and the update may be based on the number of elements accessed, the types of accessed elements, the content of the accessed elements, and so forth.

In some examples, the progress update may be related to an action involving training machine learning algorithm, possibly training a machine learning algorithm using one or more hyper-parameters, for example using data from datasets 610 and/or annotations 620 and/or views 630. Further, a project schedule record and/or elements of a project schedule record that correspond to said machine learning algorithm and/or said hyper-parameters may be selected by Step 1820 and/or updated by Step 1830. For example, an element of a project schedule record may be selected of a plurality of alternative elements of the project schedule record corresponding to different machine learning algorithms and/or different hyper-parameters based on the identity of the machine learning algorithm and/or the values of the hyper-parameters related to the action, and the selected element may be updated according to the type of the action, properties of the action, the result of the action, and so forth. For example, the progress update may comprise intermediate results and/or intermediate status of the training task, for example as obtained by Step 1310, and the update of the of the project schedule record and/or the element of the project schedule record may be based on the intermediate results and/or intermediate status, for example updating the expected run time of the machine learning training task, creating new machine learning training tasks with different hyper-parameters, modifying the hyper-parameters of machine learning training tasks, ending the machine learning training task related to the action (for example, in response to a progress update that indicates a failure to converge of the machine learning training, to a progress update that indicates that the machine learning training task is inferior to another machine learning training task, and so forth), canceling future tasks, and so forth. In another example, the progress update may comprise results of the training task, for example as obtained by Step 1020, and the update of the of the project schedule record and/or the element of the project schedule record may be based on the results, for example creating new machine learning training tasks with different hyper-parameters, modifying the hyper-parameters of machine learning training tasks, canceling future tasks, and so forth.

In some examples, the progress update may be related to an action involving minimizing and/or maximizing an objective function (for example, an objective function based on data from datasets 610 and/or annotations 620 and/or views 630). Further, a project schedule record and/or elements of a project schedule record that correspond to said objective function and/or the optimization method used and/or hyper-parameters of the optimization method used may be selected by Step 1820 and/or updated by Step 1830. For example, an element of a project schedule record may be selected of a plurality of alternative elements of the project schedule record corresponding to different objective functions and/or different optimization methods and/or different hyper-parameters based on the identity of the objective function and/or the optimization method used and/or hyper-parameters related to the action, and the selected element may be updated according to the type of the action, properties of the action, the result of the action, and so forth. For example, the progress update may comprise intermediate results and/or intermediate status of the optimization (such as objective value, iteration number, gradient at the intermediate result, last step size, rate of convergence), and the update of the of the project schedule record and/or the element of the project schedule record may be based on the intermediate results and/or intermediate status, for example updating the expected run time, creating new optimization tasks with different objective functions and/or optimization methods and/or hyper-parameters, modifying the hyper-parameters, ending the task related to the action (for example, in response to a progress update that indicates a failure to converge of the minimization and/or maximization, to a progress update that indicates that the minimization and/or maximization task is inferior to another minimization and/or maximization task, and so forth), canceling future tasks, and so forth.

In some examples, the progress update may comprise results and/or intermediate results related to an action involving some hyper-parameters. Step 1830 may evaluate the results and/or intermediate results, possibly in view of other results and/or intermediate results involving other actions and/or other hyper-parameters. Based on the evaluation, Step 1830 may create new tasks related to other hyper-parameters (for example, in a hyper-parameters search scheme), delete tasks related to other hyper-parameters (for example, in response to concluding that the results and/or intermediate results are satisfying, are a failure, etc.), and so forth.

In some examples, the progress update may comprise indications of failures, and Step 1830 may comprise modifying the project schedule record in response to the failures. Additionally or alternatively, Step 1830 may provide a suggestion to correct the cause to the failure, for example to a user, to a system manager, to an external device, to a different process, and so forth. For example, the failure may be due to a missing and/or incompatible software (for example, missing software license, old software version, etc.), and Step 1830 may modify the project schedule record to use different software, may provide a suggestion to upgrade the software, may provide a suggestion to purchase a software license, may provide a suggestion to install the software, and so forth. In another example, the failure may be due to an incompatible hardware (for example, insufficient memory, missing GPU, etc.), and Step 1830 may modify the project schedule record to use alternative device (for example, choosing the alternative device using process 1200), may modify the project schedule record to use an algorithm and/or hyper-parameters compatible with the available hardware (for example, using process 900), may provide a suggestion to upgrade the hardware, and so forth. In yet another example, the failure may be due to incompatible and/or insufficient permission, and Step 1830 may modify the project schedule record to use alternative resources, may provide suggestions using Step 1650, and so forth. In another example, the failure may be due to insufficient quota, and Step 1830 may modify the project schedule record to use alternative resources, may provide suggestions using Step 1750, and so forth. In yet another example, the failure may be due to missing and/or incompatible and/or insufficient data (for example, dataset with too few examples for a selected machine learning algorithm, dataset with no or insufficient annotations, annotations that are incompatible with a training task, and so forth), and Step 1830 may modify the project schedule record to use alternative datasets and/or annotations, may suggest alternative datasets and/or annotations (for example using Step 1650 and/or Step 1750), and so forth. In another example, the failure may be due to a failure to converge of a machine learning algorithm and/or optimization tool, and Step 1830 may modify the project schedule record and/or provide suggestion to use different machine learning algorithm, different optimization tool, different initialization, different hyper-parameters, and so forth. In yet another example, the failure may be due to a bug, and Step 1830 may modify the project schedule record and/or provide suggestion to use a different software package and/or a different software routine. In another example, the failure may be due to a bad scaling of information, and Step 1830 may modify the project schedule record and/or provide suggestion to use different scaling. In yet another example, the failure may be due to a matrix that is singular or close to singular, and Step 1830 may modify the project schedule record and/or provide suggestion to use different information and/or different method.

In some embodiments, predicting a delay (Step 1840) may comprise analyzing project schedule records to predict delays, for example in response to modification of the project schedule records by Step 1830, periodically, and so forth. For example, project schedule records may comprise a machine learning training task and a corresponding desired finish time for the task, and Step 1840 may predict that the running time of the machine learning training task will cause a change in the finish time (compared to the desired finish time, such as a delay, advance, etc.), for example using estimated processing time obtained using process 1200. In another example, process 1200 may provide a distribution of estimated processing times, and a probability of delay and/or a probability of a delay longer than a selected threshold may be calculated according to the distribution. In yet another example, project schedule records may comprise two tasks, where the start and/or finish of the second task depends on the start and/or finish time of the first task, and Step 1840 may predict a delay in the second task in response to a progress update obtained by Step 1810 that indicates a delay in the first task. In some examples, Step 1840 may determine that the predicted delay is shorter than a selected threshold and/or that the probability of delay is below a selected threshold and/or that the probability of a delay longer than a first select threshold is below a second selected threshold, and in response withhold and/or forgo Step 1850.

In some embodiments, providing an indication (Step 1850) may comprise providing an indication in response to a delay predicted by Step 1840. For example, the indication may be provided to a user, to a system manager, to an external device, to a different process, and so forth. In some examples, the indication may comprise identifying information of the delayed task, a description of the cause to the delay, an estimated length of delay, a suggestion to modify one or more aspects of the project schedule records in response to the delay (for example, to avoid the delay), and so forth. For example, the indication may comprise a suggestion to modify a task by replacing a first machine learning algorithm and/or a first set of hyper-parameters with a second machine learning algorithm and/or a second set of hyper-parameters, for example by selecting machine learning algorithm and/or set of hyper-parameters that is predicted to take shorter processing time. In another example, the indication may comprise a suggestion to replace a usage of a first device with a usage of a second device, for example with a more powerful device that is predicted to finish the task faster. In yet another example, the indication may comprise a suggestion to replace a usage of a first inference model with a second inference model, for example using process 900. In another example, the indication may comprise a suggestion to replace the usage of one dataset with another dataset, replace the usage of a first set of annotations with a second set, and so forth, for example with smaller datasets and/or annotations that are predicted to shorten the processing time.

What is claimed is:

1. A dataset management system, the system comprising: at least one processor configured to:
   detect a change to data maintained by the dataset management system, the data includes data-points and the change to the data includes at least a removal of one or more data-points from the data and a modification of one or more data-points in the data;
   compare a selected threshold with a function of a number of the one or more data-points removed from the data and a number of the one or more data-points modified in the data;
   access at least one rule associated with the data and with an action;
   based on a result of the comparison of the function with the selected threshold, determine that the change is a trigger according to the at least one rule; and
   based on said determination, perform the action.

2. The system of claim 1, wherein the function is a non-linear function of the number of the one or more data-points removed from the data.

3. The system of claim 1, wherein the at least one rule specifies a family of distributions of annotations.

4. The system of claim 1, wherein the at least one processor is further configured to:
   determine that time elapsed since a previous performance of the action is below a selected threshold; and
   withhold performing the action based on said determination.

5. A method for automatically causing actions in dataset management systems, the method comprising:
   detecting a change to data maintained by a dataset management system, the data includes data-points and the change to the data includes at least a removal of one or more data-points from the data and a modification of one or more data-points in the data;
   comparing a selected threshold with a function of a number of the one or more data-points removed from the data and a number of the one or more data-points modified in the data;
   accessing at least one rule associated with the data and with an action;
   based on a result of the comparison of the function with the selected threshold, determining that the change is a trigger according to the at least one rule; and
   based on said determination, performing the action.

6. The method of claim 5, wherein the function is based on a maximum of the number of the one or more data-points removed from the data and at least one additional value.

7. The method of claim 5, wherein the at least one rule specifies at least one of a minimal number of annotations added to the data, a minimal number of annotations modified in the data, and a minimal number of annotations removed from the data.

8. The method of claim 5, wherein the at least one rule specifies a family of distributions of annotations.

9. The method of claim 5, further comprising:
   determining that time elapsed since a previous performance of the action is below a selected threshold; and
   withholding performing the action based on said determination.

10. The method of claim 5, wherein the action comprises at least one of providing a notification, transmitting information to an external device, and executing a selected automated process.

11. The method of claim 5, wherein the action comprises updating an inference model by applying at least part of the changed data to a machine learning algorithm.

12. The method of claim 5, wherein the action comprises updating in the dataset management system at least one of a dataset and an annotation.

13. The method of claim 5, wherein the action comprises updating a project schedule record.

14. The method of claim 5, wherein the action comprises updating a quota record.

15. The method of claim 5, wherein the change comprises a change to at least one of a dataset and an annotation, and the action comprises providing a suggestion to train a machine learning algorithm using at the changed data.

16. The method of claim 5, wherein the change comprises addition of annotations to the data, the added annotations associated with a dataset, and the action comprises comparing the added annotations with a group of existing annotations associated with the dataset.

17. The method of claim 16, further comprising providing a suggestion to merge the added annotations and the group of existing annotations based on a result of the comparison.

18. The method of claim 5, wherein the change comprises addition of annotations to the data, the added annotations associated with a dataset, and the action comprises merging the added annotations with a group of existing annotations associated with the dataset to obtain a merged group of annotations associated with the dataset.

19. A non-transitory computer readable medium storing data and computer implementable instructions for carrying out a method for automatically causing actions in dataset management systems, the method comprising:
   detecting a change to data maintained by a dataset management system, the data includes data-points and the change to the data includes at least a removal of one or more data-points from the data and a modification of one or more data-points in the data;
   comparing a selected threshold with a function of a number of the one or more data-points removed from the data and a number of the one or more data-points modified in the data;
   accessing at least one rule associated with the data and with an action;
   based on a result of the comparison of the function with the selected threshold, determining that the change is a trigger according to the at least one rule; and
   based on said determination, performing the action.

20. The non-transitory computer readable medium of claim 19, wherein the method further comprising:
   determining that time elapsed since a previous performance of the action is below a selected threshold; and
   withholding performing the action based on said determination.

* * * * *